US005720036A

United States Patent [19]

Garfinkle et al.

[11] Patent Number: 5,720,036

[45] Date of Patent: Feb. 17, 1998

[54] ENTERPRISE MULTIMEDIA DATA PROCESSING SYSTEM AND METHOD USING SCALABLE OBJECT-BASED ARCHITECTURE

[75] Inventors: Philip N. Garfinkle, Herndon; Sawat Hansirisawat, Fairfax; Michael McDonald, Herndon, all of Va.; James W. Winter, Waldorf, Md.

[73] Assignee: Network Imaging Corporation, Herndon, Va.

[21] Appl. No.: 583,520

[22] Filed: Jan. 5, 1996

[51] Int. Cl.[6] .......... G06F 12/14

[52] U.S. Cl. .......... 395/200.06; 395/187.01; 395/188.01

[58] Field of Search .......... 395/200.06, 700, 395/62, 365, 186, 187.01, 188.01, 427, 412, 848, 856, 200.18; 380/49, 23

[56] References Cited

U.S. PATENT DOCUMENTS

| | | | |
|---|---|---|---|
| 5,073,933 | 12/1991 | Rosenthal | 380/25 |
| 5,301,316 | 4/1994 | Hamilton et al. | 395/600 |
| 5,475,717 | 12/1995 | Waldo et al. | 395/650 |
| 5,592,553 | 1/1997 | Guski et al | 380/23 |
| 5,604,490 | 2/1997 | Blakley, III et al. | 340/825.31 |

*Primary Examiner*—Mehmet B. Geckil
*Attorney, Agent, or Firm*—Fenwick & West LLP

[57] ABSTRACT

A data processing system includes client workstations, mass storage devices, input-output peripherals, and a server subsystem. The server subsystem includes a security server that accepts user information from a workstation and grants a security ticket to the workstation in response to the user's authorization level. The server subsystem also includes a volume manager that controls object storage to, and retrieval from, the mass storage subsystem. The volume manager caches objects related to a requested object. A domain server maintains a server map relating server names to physical network addresses, a volume map relating volume names to a corresponding volume manager, and a family map relating volume family names to a corresponding volume manager.

5 Claims, 2 Drawing Sheets

ENTERPRISE MULTIMEDIA DATA PROCESSING SYSTEM AND METHOD USING SCALABLE OBJECT-BASED ARCHITECTURE

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to computer systems for processing diverse types of information, and specifically to systems and methods for the acquisition, storage, and manipulation of multimedia data on an enterprise-wide basis.

As businesses and other organizations grow in size, they find increasingly difficult the task of managing information generated by the organization and received from third parties. In recent years, computers have become more adept at collecting and handling much of this information, but this has led to another troubling phenomenon: There is now so much information available to an organization, in so many forms and from such diverse sources, that the challenge has evolved from acquiring information to organizing the available information. Notwithstanding this hurdle, competition and the desire for increased efficiency have continued to drive professionals to discover and utilize ever greater amounts of data as a part of their derision process. By one estimate, the amount of scientific, corporate and technical information available to an organization more than doubles every 2 years.

Unfortunately, data often cannot be used in connection with routine tasks unless it is readily available. The data must be captured, assimilated and presented in a cohesive fashion. Few organizations have succeeded at harnessing the increasing amounts and types of information available throughout the organization. Thus, computers have not been used to their full potential in making organizations more efficient, and the early visions of highly efficient "paperless" offices have not materialized to any significant degree.

The need for automated information organization is particularly apparent in situations where groups of people, rather than individuals, are working on the task to which the information is pertinent. The terms "workgroup management" and "groupware" have come to be used in connection with such automation. A more general term, "workflow automation," describes the use of networked computers to route documents, schedule tasks, and perform other routine processes.

The enhancement of applications with imaging and multimedia information has become a driving force behind creating an infrastructure that can deliver the performance and organizational structure to accommodate large amounts of data used in connection with workgroup management.

In the organizations most in need of a system and method of organizing data, many large data applications still reside on mainframe computers. Mainframes are expensive in direct monthly costs, yet are often inexpensive to continue operating considering the existing investment in application development. Each application currently on a mainframe computer may take months to migrate to a new platform with major risk to the overall operation.

It is common for modern organizations to seek ways to migrate an application from a mainframe environment to a client/server environment. In many such situations, a client/server application is integrated with the mainframe and uses the mainframe's application services, operating in a hybrid environment. In implementing such a transition, organizations sometimes find that a client/server architecture offers a lower cost hardware and software solution, but presents a large administrative expense over the mainframe. The cause is due to the paradigm change from centralized control to a distributive server and client environment. Classically, every server requires security, application administration, routine administration and other functions to keep the server and network running efficiently.

Although numerous mainframe applications will continue to migrate to the newer distributive environments, many may never fully migrate from their legacy system origins. Thus, there is a need among developers and integrators for tools to facilitate the integration into hybrid environments. These environments must insure data integrity and provide efficient application, data, and resource management.

Known approaches to providing multimedia (images, auditory and video) data embedded within new or legacy (i.e., existing) information systems generally revolve around proprietary vendor methods that link multimedia data to a specific application platform or a loosely coupled link to an existing application. These approaches are typically image-centric and application specific. Many tools are available to scan and display images. Known approaches have relied on Application Programming Interfaces (APIs) linked to specific application environments that generally require a great deal of custom programming to create the desired solution.

Thus, known systems for managing multimedia data are somewhat constrained in the manner that they may be altered to meet new requirements and the benefits they can provide.

It would be desirable to have a means to take advantage of the tremendous progress made in available tools that allow developers to quickly generate applications, associate data, and object-orient the solution for maintainability, while not requiring that time-tested legacy systems be discarded.

None of the known solutions adequately addresses the need for such a simple, flexible, inexpensive system and method.

SUMMARY OF THE INVENTION

In accordance with the present invention, a client-server data processing system includes at least one client workstation, at least one mass storage device, at least one input-output peripheral (e.g., printer), and a server subsystem. The server subsystem is connected to the client workstation(s), mass storage device(s) and input-output peripheral(s). The server subsystem includes a security server that accepts user information from a workstation and grants a security ticket to the workstation in response to the user's authorization level. The server subsystem also includes a volume manager that controls object storage to, and retrieval from, one or more volume portions of the mass storage subsystem, when presented with an appropriate security ticket and request from a workstation. The volume manager caches objects related to a requested object to decrease the time required to store or retrieve objects that are likely to be called for next by the user. A queue manager processes input-output requests. A domain server maintains a server map relating server names to physical network addresses, a volume map relating volume names to a corresponding volume manager, and a family map relating volume family names to a corresponding volume manager.

In another aspect of the invention, a mainframe computer provides an application program with information elements to the workstation, and the workstation associates objects with each of the information elements. The workstation also provides an interface permitting user manipulation of the objects in response to user selection of one of the information elements.

In still another aspect of the invention, each object includes an object handle that uniquely identifies each object and provides correspondences among objects.

Also in accordance with the present invention, a method of storing and accessing information on a number of storage devices includes creating an object by combining a first element of information with an object handle and identifying the object by assigning a unique object identifier to the object handle. A family identifier is also assigned to the object handle to establish a correspondence between the object and other objects. A map of correspondences between objects and storage devices is provided based on the object handle. The first element of information is stored and accessed by storing and accessing the object through reference to the object handle.

In still another aspect of the invention, the method includes caching other objects having object handles including the family identifier of a particular object being stored or accessed.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
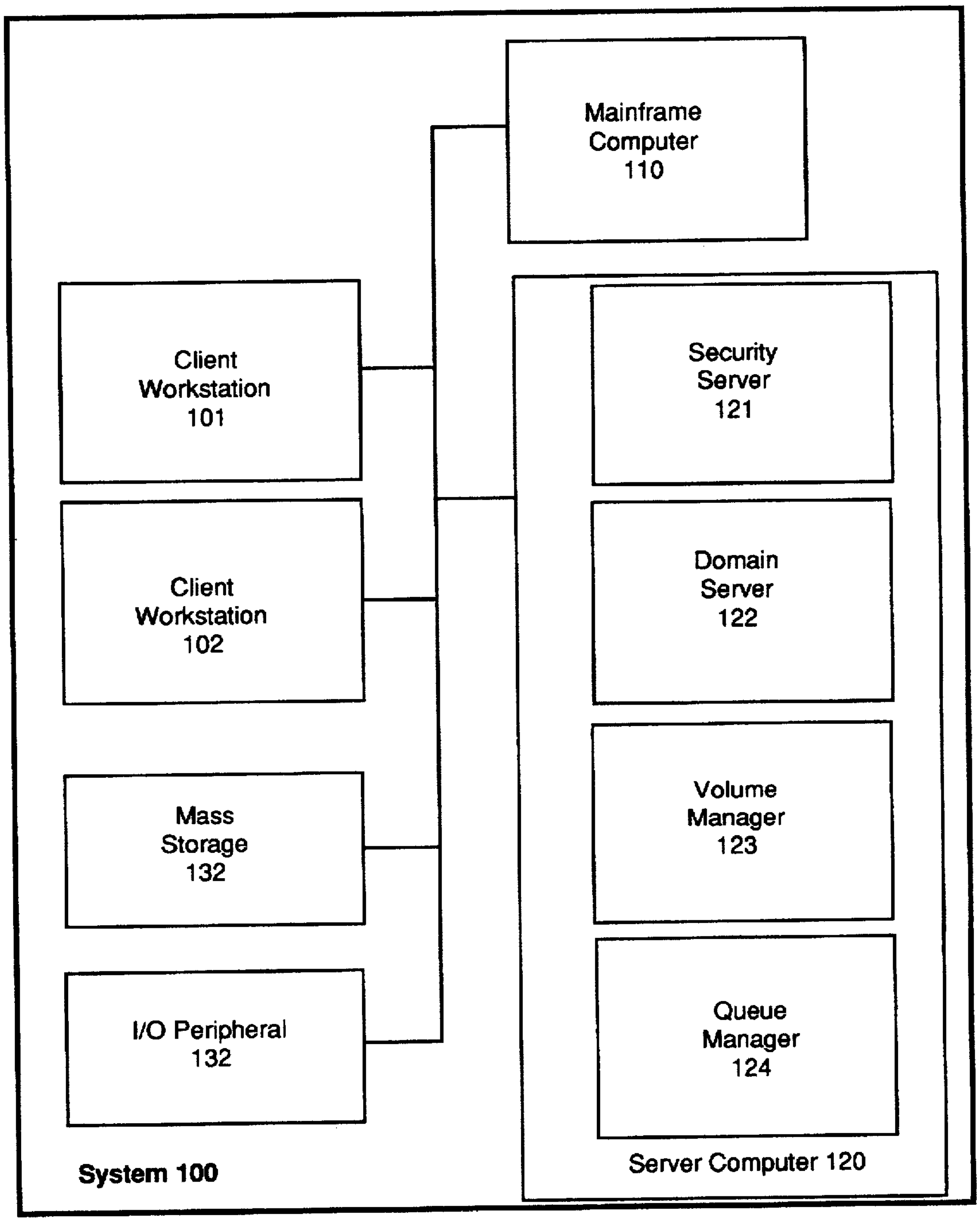
FIG. 1 is a structural block diagram of the components of a data processing system, in accordance with the present invention.

Referring now to FIG. 1, there is shown a system 100 for multimedia data processing in accordance with the present invention. The major components of system 100 include client workstations 101 and 102, server computer 120, mainframe computer 110, mass storage subsystem 112, and input/output peripheral subsystem 132. In the embodiment shown in FIG. 1, server computer 120 includes a security server 121, a domain server 122, a volume manager 123, and a queue manager 124. In overview, system 100 is used to call upon a variety of application processes to operate with various objects, appropriately using resources from client computers 101, 102, server computer 120, and mainframe computer 110.

An object is a single unit of information. Simple objects are individual electronic files, such as a word processing document, a scanned image file, or a digitized video clip. Group objects are sets of related objects, much like a paper file folder that contains several related documents. Group objects may contain an arbitrary number of simple and group objects, thus allowing hierarchical nesting of objects.

It should be recognized that although FIG. 1 illustrates two client workstations, one mainframe computer, and one server computer, system 100 is completely scalable in that it may be implemented using any number of workstations, mainframe computers, and server computers, as described in greater detail below.

In a preferred embodiment, client workstations 101, 102 are implemented by a conventional microcomputer operating in a graphical environment, specifically an 80386 or greater microprocessor-based computer operating in a windows-based user environment. In a preferred embodiment, server computer 120 is implemented using one or more programmed conventional UNIX-based server-class computers. In a preferred embodiment for installation at an organization already having a mainframe computer, mainframe computer 110 is implemented using the organization's existing mainframe computer. In a preferred embodiment, mass storage device 112 is a conventional magnetic/optical disk storage device. It should be recognized that other mass storage devices, e.g., tape drives and optical jukeboxes, could also be used for mass storage device 112. In a preferred embodiment, i/o peripheral device 132 is a conventional laser printer. It should be recognized that other i/o peripheral devices, e.g., optical scanners and light pens, could also be used for i/o peripheral device 132.

Security server 121 is, in a preferred embodiment, implemented as a software server process on server computer 120. Security server 121 provides authentication for users of system 100. Before a user at a client workstation, e.g., 101, can access any of the services provided by system 100, the user provides the workstation 101 with a username and password. Conventional software causes the username and password to be sent from workstation 101 to security sever 121. Upon verification of the username and password, security server 121 provides the user of workstation 101 with a data packet that may be thought of as a security ticket. The security ticket, in one embodiment, contains a profile of the user including the user's name, phone number, access rights, and the set of groups to which the user belongs. The client workstation 101 uses the security ticket to obtain access to the other services, (e.g., domain server 122, volume manager 123, queue manager 124) of the system 100.

Domain server 122 is, in a preferred embodiment, implemented as a software server process on server computer 120. Domain server 122 maintains three types of maps used in system 100. First, domain server 122 provides a server map that relates each server name to an associated physical network address. Second, domain server 122 provides a volume map that maps each volume name to the name of the volume manager, e.g., 123, that is responsible for managing that volume. A volume is a single unit of storage media, such as a magnetic disk partition or one side of an optical platter, as may be found in mass storage subsystem 132, used to store objects in system 100. Third, domain server 122 provides a family map that maps each volume family name to the name of the volume manager responsible for managing that family. A volume family is a set of related volumes that are treated like a unit in order to keep related data together and facilitate management, storage, and security of the data.

Volume manager 123 is, in a preferred embodiment, implemented as a software server process on server computer 120. Volume manager 123 manages a set of volumes residing on mass storage device 132. Volume manager 123 arbitrates access to the volume from multiple client workstations 101, 102; controls storage and retrieval of objects on those volumes; optimizes the performance of mass storage device 132 through caching, where appropriate; and provides backup and recovery mechanisms to avoid loss of critical data.

Queue manager 124 is, in a preferred embodiment, implemented as a software server process on server computer 120. Queue manager 124 manages input/output requests that have been placed in a queue to be processed by an input/output peripheral 132. In an embodiment where input/output peripheral 132 is a conventional laser printer, queue manager 124 manages a queue of print jobs submitted for printing on that device.

Although FIG. 1 illustrates security server 121, domain server 122, volume manager 123 and queue manager 124 as being implemented on a single server computer 120, any number of computers could be used to implement these services. In one implementation, for instance, a dedicated print server computer may be used to implement queue manager 124. It should also be noted that although FIG. 1 illustrates a single volume manager 123 and a single queue manager 124, there is no limit to the number of managers that may be included in system 100, depending on the particular application. For instance, if large amounts of diverse data are to be accessed, there many volumes, each with its own volume manager, may be used in system 100. Similarly, multiple i/o peripherals and queue managers may be employed where printers, scanners, optical character recognition devices, barcode recognition devices, and facsimile devices are desired. Because of the maps maintained by domain server 122, system 100 is scalable over a wide range of implementations without the need for architectural change.

Client workstations, e.g., 101, also include software to implement a number of service processes. In a preferred embodiment client workstation 101 includes dynamic link libraries (DLLs) for basic communications and for services required by users in connection with the operation of system 100. The former are referred to collectively as the basic communication library; the latter are referred to collectively as the workstation manager library.

In a preferred embodiment, the basic communications library includes a security server library, or SSLIB; a domain server library, or DSLIB; a volume manager library, or VMLIB, and a queue (print) manager library, or PMLIB.

SSLIB provides an interface to the security server 121 from the client workstation 101. SSLIB, by communicating with security server 121, provides log in and log out functions, enumerates all users currently logged in, gets the profile of the current user, and extracts the security ticket for the current user.

DSLIB provides an interface to the domain server 122 from the client workstation 101. DSLIB, by communicating with domain server 122, creates and deletes domains, and fetches, inserts, updates, and deletes records in an existing domain.

VMLIB provides an interface to volume manager 123 from the client workstation 101. VMLIB, by communicating with volume manager 123, creates, opens, reads, writes, doses, deletes, checks in/out, and gets/sets various attributes of an object residing on a volume. VMLIB also performs various system administration operations such as creating, deleting, exporting, importing, backing up, and restoring volumes.

PMLIB provides an interface to the queue manager 124 from the client workstation 101. PMLIB, by communicating with queue manager 124, enumerates print names, submits print jobs to a particular print queue, queries the status of a previously submitted job, and cancels previously submitted jobs.

In a preferred embodiment, the workstation manager library includes a security services library, or WMSECURE; an object services library, or WMOBI; a view services library, or WMVIEW; a print services library, or WMPRINT; a scan services library, or WMSCAN; a batch scanning services library, or WMBATCH; an optical character recognition (OCR) services library, or WMOCR; an intelligent character recognition (ICR) services library, or WMICR; an optical mark recognition (OMR) services library, or WMOMR; an image registration services library, or WMREGSTR; an image cleanup services library, or WMCLEAN; a form recognition services library, or WMFORM; a barcode recognition services library, or WMBARCOD; and a templated recognition services library, or WMTEMPLT.

WMSECURE provides a high level interface, through SSLIB, to the security services provided by security server 121, and facilitates log in, log out, and security validation for workstation 101.

WMOBI provides, through VMLIB, low-level functions for the creation and manipulation of objects.

WMVIEW provides, through WMOBJ, high level functions that allow a user to view and edit objects. WIVIVIEW maintains an association between an objects internal format, or datatype, and the external application used to view that datatype.

WMPRINT provides, through WMOBI, SSLIB, and PMLIB, high level functions that allow a user to print objects to a print server via a conventional UNIX print manager or to print objects locally. WMPRINT provides a user dialog for selection of a print server or local printer, for checking the status of print jobs, and for canceling queued jobs.

WMSCAN provides low-level functions to support image scanning using conventional scanners.

WMBATCH, through WMSCAN and WMOBJ, provides high level functions for high volume image scanning applications to create objects corresponding to scanned documents.

WMOCR provides low-level functions to support OCR of scanned images using conventional OCR engines, such as the WORDSCAN software package provided by a company known as Calera Systems (now Caere).

WMICR provides low-level functions to support intelligent character recognition of handwriting using conventional ICR engines.

WMOMR provides low-level functions to support optical mark recognition (e.g., of checkmarks in boxes on scanned forms) using conventional OMR engines.

WMREGSTR provides low-level functions to support alignment of scanned documents to a predefined position to enhance the accuracy of OCR, ICR, and OMR, using conventional image registration engines.

WMCLEAN provides low-level functions to fix skewed or speckled scanned images using conventional image recognition engines.

WMFORM provides low-level functions to automate matching data in scanned images to predefined forms in a database using conventional form recognition engines.

WMBARCOD provides low level functions to support barcode recognition of scanned images using conventional barcode recognition engines, such as the POWERTOOLS software package provided by Xionics Document Technologies, Inc.

WMTEMPLT provides high level functions to support templated recognition services, using appropriate low level libraries, e.g., WMOCR and WMBARCOD. The WMTEMPLT library is used when a template is applied to a document such that different portions of the document are processed in different ways, e.g., partially with an OCR engine and partially with a barcode engine.

Program instructions implementing the libraries discussed herein are stored in conventional storage devices, e.g., hard disks and random access memory chips, of the respective computers, e.g., workstations 101, 102 and server computer 120, corresponding to each library. What follows is a detailed description of the implementation, in a preferred embodiment, of the libraries discussed above. The detailed description that follows provides a standard set of information about functions and their uses. The entries are organized into the following sections, although not all sections appear for all functions:

Function Name The function's callout name, followed by a short description.

Include Files One or more header files such as dslib.h that declare the function's prototype, related symbolic constants, structures, and so on. Insert a directive such as #include "dslib.h" to use the function.

Syntax The function's prototype as declared in a library header file.

Parameters If the function declares parameters, each is listed here in declaration order. Consult this section for information about the types of arguments you must pass to a function.

Usage Notes An explanation of the function's purpose, use, restrictions, and possible errors, if applicable.

Callback Procedure If the function uses a callback procedure to supply information, this entry lists these callbacks.

Structures If the function uses structures as parameters, each one is listed here as declared in the library header.

Return Values A list of the return values that the function generates directly. (A return value of 0 indicates success for all functions.)

Related Functions A list of functions that can be used with the current function or that offer a related or more appropriate service.

DOMAIN SERVER LIBRARY FUNCTIONS

The Domain Server Library (DSLIB) provides a set of functions that manage the domain server 122. The Domain Server Library functions can be grouped by their use as follows: general operations; working with domains; working with domain records. The tables that follow list each of the Domain Server Library functions by group along with its description.

*General Operations*

| Function Name and Description |
|---|
| Return Values<br>Initializes the DSLIB module. |
| DS_Terminate<br>Terminates the DSLIB module. |
| DS_GetErrorText<br>Retrieves the error text associated with the specified error code and returns it to the caller. |

*Working with Domains*

| Function Name and Description |
|---|
| DS_EnumDomains<br>Lists the domains and invokes the specified callback procedure for each domain. |
| DS_DomainCreate<br>Creates a domain with the specified name. |
| DS_DomainDelete<br>Deletes a domain of the specified name. |
| DS_EnumKeys<br>Lists the keys in a domain and invokes a specified callback procedure for each key. |

*Working with Domain Records*

| Function Name and Description |
|---|
| DS_EnumRecords<br>Lists the records in a domain and invokes a specified callback procedure for each record. |
| DS_RecordInsert<br>Inserts a record having a specified key and value into a domain. |
| DS_RecordFetch<br>Retrieves a record having a specified key from the domain. |

| |
|---|
| DS_RecordUpdate<br>Updates the record in the domain having a specified key with a specified value. |
| DS_RecordDelete<br>Deletes a record having a specified key from a domain. |

*Technical Specifications*

DS_DomainCreate

Creates a domain with the specified name.

Include Files

#include "dslib.h"

Syntax int FAR PASCAL DS_DomainCreate(LPCSTR lpszDomain);

Parameters

*lpszDomain* Domain name of up to L_DOMAIN characters, where L_DOMAIN is the constant defined in the dstypes.h header file.

Return Values

DS_OK
DS_DUPLICATE_DOMAIN
DS_NETWORK_ERROR
DS_UNKNOWN

Related Functions

DS_DomainDelete
DS_EnumDomains

---

DS_DomainDelete

Deletes a domain of the specified name.

Include Files

#include "dslib.h"

Syntax int FAR PASCAL DS_DomainDelete(LPCSTR lpszDomain);

Parameters

*lpszDomain* Domain name.

Return Values

DS_OK
DS_NO_SUCH_DOMAIN
DS_NETWORK_ERROR
DS_UNKNOWN

Related Functions

DS_DomainCreate
DS_EnumDomains

---------

DS_EnumDomains

Lists the domains and invokes the specified callback procedure for each domain.

Include Files

```
#include "dslib.h"
```

Syntax

```
int FAR PASCAL DS_EnumDomains(
    FARPROC        lpEnumProc,
    LPVOID         lpData);
```

Parameters

*lpEnumProc* Callback function.

*lpData* Points to the application-supplied data to be passed to the callback function along with the domain name.

Usage Notes

Invoke the callback as follows:

```
int FAR PASCAL EnumProc(LPVOID lpData, LPCSTR lpszDomain)
```

*lpData* Callback parameter specified in the DS_Enum_Domain.

*lpszDomain* Domain name.

EnumProc is a placeholder for the application-supplied procedure name. The actual name must be exported by including it in an EXPORTS statement in the application's module definition file.

Return Values

DS_OK
DS_NETWORK_ERROR
DS_UNKNOWN

Related Functions
DS_DomainCreate
DS_DomainDelete

---

DS_EnumKeys

Lists the keys in a domain and invokes a specified callback procedure for each key.

Include Files

```
#include "dslib.h"
```

Syntax

```
int FAR PASCAL DS_EnumKeys(
    LPCSTR      lpszDomain,
    FARPROC     lpEnumProc,
    LPVOID      lpData);
```

Parameters

| | |
|---|---|
| *lpszDomain* | Domain name. |
| *lpEnumProc* | Callback function. |
| *lpData* | Points to the application-supplied data to be passed to the callback function along with the key. |

Usage Notes

Invoke the callback as follows:

```
int FAR PASCAL EnumProc(LPVOID lpData, LPCSTR lpszKey)
```

| | |
|---|---|
| *lpData* | Callback parameter specified in the DS_Enum_Keys. |
| *lpszKey* | Record key. |

EnumProc is a placeholder for the application-supplied procedure name. The actual name must be exported by including it in an EXPORTS statement in the application's module definition file.

Return Values

DS_OK
DS_NO_SUCH_DOMAIN
DS_NETWORK_ERROR
DS_UNKNOWN

Related Functions

DS_EnumDomains
DS_EnumRecords

DS_EnumRecords

Lists the records in a domain and invokes a specified callback procedure for each record.

Include Files

```
#include "dslib.h"
```

Syntax

```
int FAR PASCAL DS_EnumRecords(
    LPCSTR        lpszDomain,
    FARPROC       lpEnumProc,
    LPVOID        lpData);
```

Parameters

*lpszDomain* Domain name.

*lpEnumProc* Callback function.

*lpData* Points to the application-supplied data to be passed to the callback function along with the key and value from the record.

Usage Notes

Invoke the callback as follows:

```
int FAR PASCAL EnumProc(
    LPVOID        lpData,
    LPCSTR        lpszKey,
    LPCSTR        lpszValue);
```

*lpData* Callback parameter specified in the DS_Enum_Records.

*lpszKey* Record key.

*lpszValue* Record value.

EnumProc is a placeholder for the application-supplied procedure name. The actual name must be exported by including it in an EXPORTS statement in the application's module definition file.

Return Values

DS_OK
DS_NO_SUCH_DOMAIN
DS_NETWORK_ERROR
DS_UNKNOWN

Related Functions

DS_RecordInsert
DS_RecordDelete

---

DS_GetErrorText

Retrieves the error text associated with the specified error code and returns it to the caller.

Include Files

```
#include "dslib.h"
```

Syntax

```
int FAR PASCAL DS_GetErrorText(
    int nErrorCode,
    LPSTR           lpszErrorText,
    int cbErrorText);
```

Parameters

| | |
|---|---|
| *nErrorCode* | Error code. |
| *lpszErrorText* | Error text buffer. |
| *cbErrorText* | Size of error text buffer. |

Return Values

DS_OK

---

DS_Initialize

Initializes the DSLIB module.

Include Files

```
#include "dslib.h"
```

Syntax

```
int FAR PASCAL DS_Initialize(void);
```

Parameters

None.

Return Values

DS_OK
DS_NETWORK_ERROR
DS_UNKNOWN

Related Functions

DS_Terminate

----------

DS_RecordDelete

Deletes a record having a specified key from a domain.

Include Files

```
#include "dslib.h"
```

Syntax

```
int FAR PASCAL DS_RecordDelete(
    LPCSTR          lpszDomain,
    LPCSTR          lpszKey);
```

Parameters

*lpszDomain* Domain name.

*lpszKey* Record key.

Return Values

DS_OK
DS_NO_SUCH_DOMAIN
DS_NO_SUCH_RECORD
DS_NETWORK_ERROR
DS_UNKNOWN

Related Functions

DS_EnumRecords
DS_RecordInsert

----------

DS_RecordFetch

Retrieves a record having a specified key from the domain.

Include Files

```
#include "dslib.h"
```

Syntax

```
int FAR PASCAL DS_RecordFetch(
    LPCSTR          lpszDomain,
    LPCSTR          lpszKey,
    LPSTR           lpszValue);
```

Parameters

*lpszDomain* Domain name.

*lpszKey* Record key.

*lpszValue* Record value.

Return Values

DS_OK

DS_NO_SUCH_DOMAIN
DS_NO_SUCH_RECORD
DS_NETWORK_ERROR
DS_UNKNOWN

Related Functions
DS_EnumKeys
DS_EnumRecords

---------

DS_RecordInsert

Inserts a record having a specified key and value into a domain.

Include Files
#include "dslib.h"

Syntax
```
int FAR PASCAL DS_RecordInsert(
    LPCSTR         lpszDomain,
    LPCSTR         lpszKey,
    LPCSTR         lpszValue);
```

Parameters

*lpszDomain* Domain name.

*lpszKey* Record key of up to L_KEY characters, where L_KEY is the constant defined in the dstypes.h header file.

*lpszValue* Record value of up to L_VALUE characters, where L_VALUE is the constant defined in the dstypes.h header file.

Return Values
DS_OK
DS_NO_SUCH_DOMAIN
DS_DUPLICATE_KEY
DS_NETWORK_ERROR
DS_UNKNOWN Related Functions
DS_RecordUpdate
DS_RecordDelete

---------

DS_RecordUpdate

Updates the record in the domain having a specified key with a specified value.

Include Files

#include "dslib.h"

Syntax

```
int FAR PASCAL DS_RecordUpdate(
    LPCSTR      lpszDomain,
    LPCSTR      lpszKey,
    LPCSTR      lpszValue);
```

Parameters

| | |
|---|---|
| *lpszDomain* | Domain name. |
| *lpszKey* | Record key. |
| *lpszValue* | Record value. |

Return Values

DS_OK
DS_NO_SUCH_DOMAIN
DS_NO_SUCH_RECORD
DS_NETWORK_ERROR
DS_UNKNOWN

Related Functions

DS_RecordInsert
DS_RecordDelete

---

DS_Terminate

Terminates the DSLIB module.

Include Files

#include "dslib.h"

Syntax

```
int FAR PASCAL DS_Terminate(void);
```

Parameters

None.

Return Values

DS_OK
DS_NETWORK_ERROR
DS_UNKNOWN

Related Functions

Return Values

PRINT MANAGER LIBRARY FUNCTIONS

The Print Manager Library (PMLIB) provides a set of functions that manage the queue manager 124. The set consists of three groups: server host functions for managing print servers and print jobs; client workstation functions for managing print servers running on workstations and managing print jobs; and common functions related to both server hosts and client workstations. The tables that follow list each of the Print Manager Library functions by group along with its description.

*Server Host Functions*

*Managing Print Servers*

| Function Name and Description |
| --- |
| PM_RegisterPrintServer<br>Tells the Print Manager that a print server is running and available for print services. |
| PM_UnregisterPrintServer<br>Tells the Print Manager that the print server is not available. |
| PM_SetServerStatus<br>Sets the specified server to the specified status. |

*Managing Queues*

| Function Name and Description |
| --- |
| PM_AttachQueue<br>Attaches a server to a specified queue. |
| PM_DetachQueue<br>Detaches a specified server from the currently attached queue. |
| PM_CreateQueue<br>Creates a new queue. |
| PM_DestroyQueue<br>Destroys an existing queue. |
| PM_EnumQueue<br>Enumerates all queues known to the print manager. |

| |
|---|
| PM_GetQueueInfo<br>Gets information about a specified queue. |

*Managing Print Jobs*

| Function Name and Description |
|---|
| PM_GetNextJob<br>Requests the next print job from the Print Manager. |
| PM_GetNextFaxJob<br>Requests the next fax job from the Print Manager. |
| PM_SetJobStatus<br>Sets the job specified by the job ID to the specified status. |
| PM_SuspendJob<br>Suspends a print job. |

*Client Workstation Functions*

*Managing Print Servers*

| Function Name and Description |
|---|
| PM_EnumAttachedServer<br>Enumerates all servers attached to a specified queue. |
| PM_EnumPrintServer<br>Enumerates all running print servers known to the Print Manager. |
| PM_GetServerInfo<br>Gets information, including status, about a specified server. |

*Managing Print Jobs*

| Function Name and Description |
|---|
| PM_EnumJob<br>Lists print jobs in the print queue. |
| PM_SubmitJob<br>Submits a simple object or a group object to the Print Manager for printing to the specified queue. |

| |
|---|
| PM_SubmitFaxJob<br>Submits a simple object or a group object to the Print Manager to send from the specified fax server. |
| PM_CancelJob<br>Cancels a print job. |
| PM_SuspendJob<br>Suspends a print job. |
| PM_ResumeJob<br>Resumes a suspended print job. |

*Common Functions*

| Function Name and Description |
|---|
| PM_GetDefaultPrintMgr<br>Gets the default Print Manager name. |
| PM_SetDefaultPrintMgr<br>Sets the default Print Manager. |
| PM_GetJobInfo<br>Gets information about a specified print job. |
| PM_GetFaxJobInfo<br>Gets information about a specified fax job. |
| PM_GetJobStatus<br>Gets the status of a print job. |

*Technical Specifications*

PM_AttachQueue

Attaches a server to a specified queue.

Include Files

```
#include "pmlib.h"
```

Syntax

```
int WINAPI PM_AttachQueue(
    LPCSTR        lpszServerName,
    LPCSTR        lpszQueueName);
```

Parameters

| | |
|---|---|
| *lpszServerName* | Name of existing server. |
| *lpszQueueName* | Name of existing queue. |

Usage Notes

Users must have system administrator privileges to call this function.

Return Values

PM_SUCCESS
PM_ERR_INVALID_QUEUE
PM_ERR_INVALID_SERVER_NAME
PM_ERR_NO_PERMISSION

Related Functions

PM_DetachQueue

---

PM_CancelJob

Cancels a print job.

Include Files

#include "pmlib.h"

Syntax

```
int WINAPI PM_CancelJob(
    LPCSTR        lpszServerName,
    JOBID         jobID);
```

Parameters

| | |
|---|---|
| *lpszServerName* | Name of queue to cancel the print job. |
| *jobID* | Job ID returned from PM_SubmitJob. |

Usage Notes

Cancels a print job pending in the Print Manager queue. Only the submitter or the system administrator can cancel a print job.

Return Values

PM_SUCCESS
PM_ERR_INVALID_JOB_ID
PM_ERR_NETWORK_ERROR
PM_ERR_PRINT_MGR_ERROR
PM_ERR_PRINT_MGR_NOT_RESPONSE
PM_ERR_UNKNOWN_SERVER_NAME

Related Functions
PM_SubmitJob

---------

PM_CreateQueue
Creates a new queue.

Include Files
#include "pmlib.h"

Syntax
```
int WINAPI PM_CreateQueue(
    LPCSTR      lpszQueueName,
    LPCSTR      lpszDescription,
    int nQueueType);
```

Parameters

| | |
|---|---|
| *lpszQueueName* | Name of the queue. |
| *lpszDescription* | Description of the queue. |
| *nQueueType* | The types are: PRINT_QUEUE |

Usage Notes
Users must have system administrator privileges to call this function.

Return Values
PM_SUCCESS
PM_ERR_DUPLICATE_SERVER_NAME
PM_ERR_INVALID_DESCRIPTION
PM_ERR_INVALID_QUEUE_TYPE
PM_ERR_INVALID_SERVER_NAME
PM_ERR_NO_PERMISSION Related Functions
PM_DestroyQueue

---------

PM_DestroyQueue
Destroys an existing queue.

Include Files
#include "pmlib.h"

Syntax

```
int WINAPI PM_DestroyQueue(
    LPCSTR          lpszQueueName);
```

Parameters

*lpszQueueName* Name of the queue.

Usage Notes

Users must have system administrator privileges to call this function.

Return Values

PM_SUCCESS
PM_ERR_INVALID_SERVER_NAME
PM_ERR_NO_PERMISSION

Related Functions

PM_CreateQueue

---

PM_DetachQueue

Detaches a specified server from the currently attached queue.

Include Files

#include "pmlib.h"

Syntax

```
int WINAPI PM_DetachQueue(
    LPCSTR          lpszServerName);
```

Parameters

*lpszServerName* Name of the server.

Usage Notes

Users must have system administrator privileges to call this function.

Return Values

PM_SUCCESS
PM_ERR_INVALID_SERVER_NAME
PM_ERR_NO_PERMISSION

Related Functions

PM_AttachQueue

---

PM_EnumAttachedServer

Enumerates all servers attached to a specified queue.

Include Files

#include "pmlib.h"

Syntax

```
int WINAPI PM_EnumAttachedServer(
    LPCSTR        lpszQueueName,
    FARPROC       lpfnCallback,
    ULONG         UserData);
```

Callback Procedure

Invoke the callback as follows:

```
BOOL CALLBACK MyEnumCallback(
    LPSTR         lpszServerName,
    ULONG         UserData);
```

Where lpszServerName is the name of the print server. UserData is the application-defined value specified in the PM_EnumAttachedServer function. The callback function must return True to continue enumeration. It must return False to stop the enumeration.

Parameters

| | |
|---|---|
| *lpszQueueName* | Name of the queue. |
| *lpfnCallback* | Pointer to callback function that will be called by the Print Manager library during enumeration. If the caller is an application, this function must be a pointer returned from MakeProcInstance. If the caller is a DLL, it must be an export function. |
| *UserData* | Specified application-defined value to pass to the callback function. |

Return Values

PM_SUCCESS
PM_ERR_INVALID_SERVER_NAME
PM_ERR_NETWORK_ERROR
PM_ERR_PRINT_MGR_ERROR
PM_ERR_PRINT_MGR_NOT_RESPONSE

Related Functions

PM_EnumQueue

----------

PM_EnumJob

Lists print jobs in the print queue.

Include Files

#include "pmlib.h"

Syntax

```
int WINAPI PM_EnumJob(
    LPCSTR        lpszQueueName,
```

```
        FARPROC         lpfnCallback,
        ULONG           UserData);
```

Parameters

| | |
|---|---|
| *lpszQueueName* | Name of the queue for which to enumerate all print jobs. |
| *lpfnCallback* | Pointer to the callback function that the Print Manager library calls during enumeration. The callback function must be as follows:<br>Application caller — Pointer returned from MakeProcInstance.<br>DLL caller — Export function. |
| *UserData* | Specified application-defined value to pass to the callback function. |

Callback Procedure

Invoke the callback as follows:

```
    BOOL CALLBACK MyEnumCallback(
        LPJOBINFO       lpJobInfo,
        ULONG           UserData);
```

| | |
|---|---|
| *lpJobInfo* | Pointer to JOBINFO structure. |
| *UserData* | Application-defined value specified in PM_EnumJob. |

The callback function must return True to continue enumeration. It must return False to stop the enumeration.

Return Values

PM_SUCCESS
PM_ERR_EMPTY_PRINT_QUEUE
PM_ERR_NETWORK_ERROR
PM_ERR_PRINT_MGR_ERROR
PM_ERR_PRINT_MGR_NOT_RESPONSE
PM_ERR_UNKNOWN_SERVER_NAME

Related Functions

PM_GetJobInfo

---------

PM_EnumPrintServer

Enumerates all running print servers known to the Print Manager.

Include Files

#include "pmlib.h"

Syntax

```
    int WINAPI PM_EnumPrintServer(
        FARPROC         lpfnCallback,
        ULONG           UserData);
```

Parameters

| | |
|---|---|
| *lpfnCallback* | Pointer to the callback function that the Print Manager library will call during enumeration. The callback function must be as follows: |
| | Application caller — Pointer returned from MakeProcInstance. |
| | DLL caller — Export function. |
| *UserData* | Specified application-defined value to pass to the callback function. |

Callback Procedure

Invoke the callback as follows:

```
BOOL CALLBACK MyEnumCallback(
    LPSTR          lpszServerName,
    ULONG          UserData);
```

| | |
|---|---|
| *lpszServerName* | Print server name. |
| *UserData* | Application-defined value specified in PM_EnumJob. |

The callback function must return True to continue enumeration. It must return False to stop the enumeration.

Return Values

PM_SUCCESS
PM_ERR_NETWORK_ERROR
PM_ERR_NO_PRINT_SERVER
PM_ERR_PRINT_MGR_ERROR
PM_ERR_PRINT_MGR_NOT_RESPONSE

Related Functions

PM_RegisterPrintServer
PM_UnregisterPrintServer

---

PM_EnumQueue

Enumerates all queues known to the print manager.

Include Files

#include "pmlib.h"

Syntax

```
int WINAPI PM_EnumQueue(
    FARPROC        lpfnCallback,
    ULONG          UserData);
```

Callback Procedure

Invoke the callback as follows:

```
BOOL CALLBACK MyEnumCallback(
    LPSTR          lpszQueueName,
    ULONG          UserData);
```

Where lpszQueueName is the name of the queue. UserData is the application-defined value specified in the PM_EnumQueue function. The callback function must return True to continue enumeration. It must return False to stop the enumeration.

Parameters

| | |
|---|---|
| *lpszQueueName* | Name of the queue. |
| *lpfnCallback* | Pointer to callback function that will be called by the Print Manager library during enumeration. If the caller is an application, this function must be a pointer returned from MakeProcInstance. If the caller is a DLL, it must be an export function. |
| *UserData* | Specified application-defined value to pass to the callback function. |

Return Values

PM_SUCCESS
PM_ERR_BAD_CALLBCK_PTR
PM_ERR_INVALID_SERVER_NAME
PM_ERR_NETWORK_ERROR
PM_ERR_PRINT_MGR_ERROR
PM_ERR_PRINT_MGR_NOT_RESPONSE

Related Functions

PM_EnumAttachedServer

---

PM_GetDefaultPrintMgr

Gets the default Print Manager name.

Include Files

#include "pmlib.h"

Syntax

```
int WINAPI PM_GetDefaultPrintMgr(
    int nBufLen,
    LPSTR          lpszResultBuf);
```

Parameters

| | |
|---|---|
| *nBufLen* | Length of the buffer pointed to by *lpszResultBuf*. |
| *lpszResultBuf* | Location to store the default Print Manager name. |

Return Values

PM_SUCCESS
PM_ERR_INVALID_RESULT_BUFFER
PM_ERR_TOO_SMALL_RESULT_BUFFER

Related Functions
PM_SetDefaultPrintMgr

---

PM_GetJobInfo

Gets information about a specified print job.

Include Files

```
#include "pmlib.h"
```

Syntax

```
int WINAPI PM_GetJobInfo(
    LPCSTR        lpszQueueName,
    JOBID         JobID,
    LPJOBINFO     lpnJobInfo);
```

Parameters

| | |
|---|---|
| *lpszQueueName* | Name of the queue that holds the print job. |
| *JobID* | Print job ID. |
| *lpnJobInfo* | Location to store the information about the print job. |

Return Values
PM_SUCCESS
PM_ERR_INVALID_JOB_ID
PM_ERR_NETWORK_ERROR
PM_ERR_PRINT_MGR_ERROR
PM_ERR_PRINT_MGR_NOT_RESPONSE Related Functions
PM_GetJobStatus

---

PM_GetJobStatus

Gets the status of a print job.

Include Files

```
#include "pmlib.h"
```

Syntax

```
int WINAPI PM_GetJobStatus(
    LPCSTR        lpszQueueName,
    JOBID         JobID,
    LPINT         lpnStatus);
```

Parameters

| | |
|---|---|
| *lpszQueueName* | Name of the queue that holds the print job. |

*JobID* Print job ID.

*lpnStatus* Location to store the print job status.

Return Values
PM_SUCCESS
PM_ERR_INVALID_JOB_ID
PM_ERR_NETWORK_ERROR
PM_ERR_PRINT_MGR_ERROR
PM_ERR_PRINT_MGR_NOT_RESPONSE Related Functions
PM_SetJobStatus
PM_GetJobInfo

---

PM_GetNextJob

Requests the next print job from the Print Manager.

Include Files
#include "pmlib.h"

Syntax
```
int WINAPI PM_GetNextJob(
    LPCSTR              lpszServerName,
    LPJOBDEFINITION         lpResultBuf);
```

Parameters

*lpszServerName* Name of print server to get the next print job.

*lpResultBuf* Location to store a next print job definition.

Usage Notes
Upon request, the Print Manager returns a print job definition describing the next print job. This definition contains the job ID, the object handle of an object to be printed, and the recursion level.

Return Values
PM_SUCCESS
PM_ERR_EMPTY_PRINT_QUEUE
PM_ERR_INVALID_RESULT_BUFFER
PM_ERR_INVALID_SERVER_NAME
PM_ERR_JOB_NOT_FINISHED
PM_ERR_NETWORK_ERROR
PM_ERR_PRINT_MGR_ERROR
PM_ERR_PRINT_MGR_NOT_RESPONSE
PM_ERR_TOO_SMALL_RESULT_BUFFER

----------

PM_GetQueueInfo

Gets information about a specified queue.

Include Files

#include "pmlib.h"

Syntax

```
int WINAPI PM_CreateQueue(
    LPCSTR          lpszQueueName,
    LPQUEUEINFO     lpQueueInfo);
```

Parameters

*lpszQueueName* Name of the queue.

*lpQueueInfo* Pointer to the resulting QUEUEINFO structure.

Return Values

PM_SUCCESS
PM_ERR_INVALID_RESULT_BUFFER
PM_ERR_INVALID_SERVER_NAME
PM_ERR_TOO_SMALL_RESULT_BUFFER

Related Functions

PM_AttachQueue
PM_CreateQueue
PM_DestroyQueue
PM_DetachQueue

----------

PM_GetServerInfo

Gets information, including status, about a specified server.

Include Files

#include "pmlib.h"

Syntax

```
int WINAPI PM_GetServerInfo(
    LPCSTR          lpszServerName,
    LPSERVERINFO    lpResultBuffer);
```

Parameters lpszServerName Name of the server for which information will be retrieved.

lpResultBuffer Location to store the information about the server.

Return Values

PM_SUCCESS
PM_ERR_INVALID_RESULT_BUFFER

PM_ERR_NETWORK_ERROR
PM_ERR_PRINT_MGR_ERROR
PM_ERR_PRINT_MGR_NOT_RESPONSE
PM_ERR_TOO_SMALL_RESULT_BUFFER
PM_ERR_UNKNOWN_SERVER_NAME

Related Functions
PM_EnumPrintServer

---

PM_RegisterPrintServer

Tells the Print Manager that a print server is running and available for print services.

Include Files

```
#include "pmlib.h"
```

Syntax

```
int WINAPI PM_RegisterPrintServer(
    LPCSTR          lpszServerName,
    LPCSTR          lpszDescription);
```

Parameters

*lpszServerName* Name of the print server to register for print service.

*lpszDescription* Text description of the print server.

Usage Notes

When the print server is starting up, it must call this function to tell the Print Manager that it is ready for print services. Also, when a print server has lost contact with the print manager during its operation, it must periodically call this function until the function returns a success value. Once registered with print manager, any pending print jobs for the print server in the print manager queue will be assigned to the print server. When the print server is shutting down, it must call PM_UnregisterPrintServer to tell the Print Manager that it is no longer available for print services.

Return Values

PM_SUCCESS
PM_ERR_DUPLICATE_SERVER_NAME
PM_ERR_NETWORK_ERROR
PM_ERR_INVALID_SERVER_NAME
PM_ERR_PRINT_MGR_ERROR
PM_ERR_PRINT_MGR_NOT_RESPONSE

Related Functions
PM_UnregisterPrintServer

---

PM_RegisterPrintServerEx

This function is the same as PM_RegisterPrintServer except the server has more control over the queue creation.

Include Files

```
#include "pmlib.h"
```

Syntax

```
int WINAPI PM_RegisterPrintServerEx(
    LPCSTR        lpszServerName,
    LPCSTR        lpszDescription,
    BOOL          bCreateQueue);
```

Parameters

| | |
|---|---|
| *pszServerName* | Name of the print server. |
| *lpszDescription* | Text description of the print server. |
| *bCreateQueue* | TRUE to create the associated queue and name the associated queue with the same name as specified in lpszServerName. |

Return Values

PM_SUCCESS
PM_ERR_DUPLICATE_SERVER_NAME
PM_ERR_NETWORK_ERROR
PM_ERR_INVALID_SERVER_NAME
PM_ERR_PRINT_MGR_ERROR
PM_ERR_PRINT_MGR_NOT_RESPONSE

Related Functions

PM_RegisterPrintServer

---

PM_ResumeJob

Resumes a suspended print job.

Include Files

```
#include "pmlib.h"
```

Syntax

```
int WINAPI PM_ResumeJob(
    LPCSTR        lpszServerName,
    JOBID         JobID);
```

Parameters

| | |
|---|---|
| *lpszServerName* | Name of the queue to resume the print job. |
| *JobID* | Job ID returned from PM_SubmitJob. |

Usage Notes

Only the submitter or the system administrator can resume a print job. Attempting to resume a normal job produces the error code PM_ERR_JOB_NOT_SUSPENDED.

Return Values

PM_SUCCESS
PM_ERR_JOB_NOT_SUSPENDED
PM_ERR_NETWORK_ERROR
PM_ERR_INVALID_JOB_ID
PM_ERR_PRINT_MGR_ERROR
PM_ERR_PRINT_MGR_NOT_RESPONSE

Related Functions

PM_SuspendJob

---

PM_SetDefaultPrintMgr

Sets the default Print Manager.

Include Files

#include "pmlib.h"

Syntax

```
int WINAPI PM_SetDefaultPrintMgr(LPCSTR      lpszPrintMgr);
```

Parameters lpszPrintMgr Name of the Print Manager to be set as the default.

Return Values

PM_SUCCESS
PM_ERR_UNKNOWN_PRINT_MGR

Related Functions

PM_GetDefaultPrintMgr

---

PM_SetJobStatus

Sets the job specified by the job ID to the specified status.

Include Files

#include "pmlib.h"

Syntax

```
int WINAPI PM_SetJobStatus(
    LPCSTR          lpszServerName,
    JOBID           JobID,
```

```
int nJobStatus,
LPCSTR            lpszDescription);
```

Parameters

| | |
|---|---|
| *lpszServerName* | Name of the print server to set job status. |
| *JobID* | Specified job ID to be set. |
| *nJobStatus* | The valid values are:<br>JOB_FINISHED<br>JOB_CANCELED<br>JOB_RESUMED<br>JOB_SUSPENDED |
| *lpszDescription* | Description of print job. |

Usage Notes

This function notifies the Print Manager to update the current status of the specified job ID. This Print Manager maintains the current status of all print jobs. Users must have system administrator privileges to call this function.

Return Values

PM_SUCCESS
PM_ERR_INVALID_JOB_ID
PM_ERR_INVALID_JOB_STATUS
PM_ERR_INVALID_SERVER_NAME
PM_ERR_NETWORK_ERROR
PM_ERR_PRINT_MGR_ERROR
PM_ERR_PRINT_MGR_NOT_RESPONSE

Related Functions

PM_GetJobStatus

----------

PM_SetServerStatus

Sets the specified server to the specified status.

Include Files

```
#include "pmlib.h"
```

Syntax

```
int WINAPI PM_SetServerStatus(
    LPCSTR            lpszServerName,
    int nNewStatus);
```

Parameters

| | |
|---|---|
| *lpszServerName* | Name of the print server. |

*nNewStatus* The valid values are:

SERVER_READY
SERVER_PAUSE—Server has been stopped.
SERVER_PAUSE_OFFLINE—Printer is off-line.
SERVER_PAUSE_NOPAPER—No paper in paper tray.
SERVER_PAUSE_PAPERJAM—Paper jam in printer.
SERVER_PAUSE_NOPOWER—Printer is turned off.
SERVER_PAUSE_NOTCONNECTED—No cable is connected

Usage Notes

Only a member of the Object Manager predefined SysAdmin group can call this function.

Return Values

PM_SUCCESS
PM_ERR_INVALID_SERVER_NAME
PM_ERR_INVALID_SERVER_STATUS
PM_ERR_NETWORK_ERROR
PM_ERR_PRINT_MGR_ERROR
PM_ERR_PRINT_MGR_NOT_RESPONSE

Related Functions

PM_GetServerInfo

---

PM_SubmitJob

Submits a simple object or a group object to the Print Manager for printing to the specified queue.

Include Files

#include "pmlib.h"

Syntax

```
int WINAPI PM_SubmitJob(
    LPCSTR          lpszQueueName,
    LPVMHOBJECT     lpvmhObjHandle,
    int nRecursiveLevel,
    int nPaperSize,
    int nScale,
    int nOrientation,
    int nNoCopies,
    time_t          StartTime,
    LPJOBID         lpResultBuf);
```

Parameters

*lpszQueueName* Queue name.

*lpvmhObjHandle* Object handle of a simple or group object.

| | |
|---|---|
| *nRecursiveLevel* | Specifies how many levels the function should recurse into nested group objects. It applies only to group objects and is ignored when *lpvmhObjHandle* specifies a simple object.<br>0 Gets all simple objects in the group object specified in *lpvmhObjHandle*.<br>1 Recurses 1 level into nested group objects found in the *lpvmhObjHandle* group object but not beyond. Specifying a value larger than the deepest level does not produce an error.<br>-1 Prints all objects found in the group object specified in *lpvmhObjHandle*. |
| *nPaperSize* | Size of the paper. |
| *nScale* | Placeholder for a scale factor argument that will be passed from a higher-level Object Manager function at run time. |
| *nOrientation* | Placeholder for an orientation argument that will be passed from a higher-level Object Manager function at run time. |
| *nNoCopies* | Number of copies. |
| *StartTime* | Time to start the print job specified in UNIX GM time. Specify any time between 0 and the current time to start the job immediately. |
| *lpResultBuf* | Location to store the returned job ID assigned to this print job. |

Return Values

PM_SUCCESS
PM_ERR_INVALID_RECURSIVE_LEVEL
PM_ERR_INVALID_RESULT_BUFFER
PM_ERR_NETWORK_ERROR
PM_ERR_PRINT_MGR_ERROR
PM_ERR_PRINT_MGR_NOT_RESPONSE
PM_ERR_UNKNOWN_SERVER_NAME

Related Functions

PM_CancelJob
PM_SuspendJob

---

PM_SuspendJob

Suspends a print job.

Include Files

#include "pmlib.h"

Syntax

```
int WINAPI PM_SuspendJob(
    LPCSTR          lpszServerName,
```

JOBID JobID);

Parameters

*lpszServerName* Name of the queue in which the job to be suspended resides.

*JobID* Job ID returned from PM_SubmitJob.

Usage Notes

Only the submitter or the system administrator can suspend a print job. Suspending an already suspended job does not produce an error. Suspending an already finished print job produces the error code PM_ERR_INVALID_JOB_ID.

Return Values

PM_SUCCESS
PM_ERR_INVALID_JOB_ID
PM_ERR_NETWORK_ERROR
PM_ERR_PRINT_MGR_ERROR
PM_ERR_PRINT_MGR_NOT_RESPONSE

Related Functions

PM_ResumeJob
PM_CancelJob

---

PM_UnregisterPrintServer

Tells the Print Manager that the print server is not available.

Include Files

```
#include "pmlib.h"
```

Syntax

```
int WINAPI PM_UnregisterPrintServer(
    LPCSTR          lpszServerName);
```

Parameters

*lpszServerName* Name of the print server to unregister for service.

Usage Notes

This function tells the Print Manager that the print server is shutting down and is unavailable to accept services. If the attached queue is created automatically by the Print Manager through PM_RegisterPrintServer, any outstanding jobs for this print server in the Print Manager queue are removed automatically when it is unregistered.

Return Values

PM_SUCCESS
PM_ERR_NETWORK_ERROR
PM_ERR_PRINT_MGR_ERROR
PM_ERR_PRINT_MGR_NOT_RESPONSE

PM_ERR_SERVER_NOT_REGISTERED

Related Functions

PM_RegisterPrintServer
PM_EnumPrintServer

SYSTEM LOADER FUNCTIONS FOR 4GL APPLICATIONS

These functions are called before and after calling Object Manager libraries in situations where Fourth Generation Languages (4GLs) such as Gupta for Windows, PowerBuilder, SmallTalk for Windows, and Visual Basic) are used in connection with system 100. The tables that follow list each of the System Loader functions along with its description.

| Function Name and Description |
| --- |
| SL_Init<br>Loads and initializes OBJECT MANAGER LIBRARIES AND THEIR DEPENDENCIES. |
| SL_Done<br>Uninitializes and unloads OBJECT MANAGER LIBRARIES AND THEIR DEPENDENCIES. |

---

*Technical Specifications*

SL_Done

Uninitializes and unloads Object Manager libraries and their dependencies.

Include Files

```
#include "wmobj.h"
```

Syntax

```
int WINAPI SL_Done(void)
```

Parameters
None.

Usage Notes
Each Fourth Generation Language (4GL) application (such as Gupta for Windows, PowerBuilder, SmallTalk for Windows, and Visual Basic) must call this function after the last call to Object Manager libraries. Doing so ensures that Windows is able to uninitialize and unload the correct Object Manager libraries in the correct sequence.

This function takes information from the [SysLoader] section of the WMCOMMON.INI file. For each library listed in the Library keyword, it loads the library and calls the corresponding termination entry point that is specified in the DoneAPI keyword. For example:

```
[SysLoader]
Library=wmcommon.dll,winsock.dll,dslib.dll,vmlib.dll
InitAPI=NULL,NULL,DS_Initialize,VM_Initialize
DoneAPI=NULL,NULL,DS_Terminate,VM_Terminate
```

Return Values
SL_Done returns a value of 1 for success and a value of 0 for failure.

Related Functions
SL_Init
WML_ObjectInitialize
WML_ObjectTerminate

---

SL_Init

Loads and initializes Object Manager libraries and their dependencies.

Include Files
#include "wmobj.h"

Syntax
int WINAPI SL_Init(void)

Parameters
None.

Usage Notes
Each Fourth Generation Language (4GL) application (such as Gupta for Windows, PowerBuilder, SmallTalk for Windows, and Visual Basic) must call this function before calling any Object Manager libraries. Doing so ensures that your application is able to bind to the correct Object Manager libraries in the correct sequence.

This function takes information from the [SysLoader] section of the WMCOMMON.INI file. For each library listed in the Library keyword, it loads the library and calls the corresponding initialization entry point that is specified in the InitAPI keyword. For example:

```
[SysLoader]
Library=wmcommon.dll,winsock.dll,dslib.dll,vmlib.dll
InitAPI=NULL,NULL,DS_Initialize,VM_Initialize
DoneAPI=NULL,NULL,DS_Terminate,VM_Terminate
```

Return Values
SL_Init returns a value of 1 for success and a value of 0 for failure.

Related Functions
SL_Done

SECURITY SERVICE LIBRARY FUNCTIONS

The Security Service Library (SSLIB) provides a set of functions that manage the security server 121. The set consists of three groups: server functions specifically related to managing security on server computer 120; client functions specifically related to managing security on client workstation 101, including logging in and out, administering users, administering user groups, and working with tasks; and common functions related to both servers and clients. The tables that follow list each of the Security Service Library functions by group along with its description.

*Server Functions*

| Function Name and Description |
|---|
| SS_ExtractUserInfo<br>Extracts user information from an access ticket. |
| SS_IsValidAccessTicket<br>Validates the specified access ticket. |

*Client Functions*

*Logging In and Out*

| Function Name and Description |
|---|

| |
|---|
| SS_Login<br>Requests login to the system. |
| SS_Logout<br>Requests to log out of the system. |

*Administering Users*

| Function Name and Description |
|---|
| SS_AddUser<br>Adds a new user to the security database. |
| SS_DeleteUser<br>Deletes a user from the security database. |
| SS_EnumUsers<br>Lists all users known to the Security Server or all logged-in users. |
| SS_GetCurrentUser<br>Retrieves information about the current user of the current task. |
| SS_GetKey<br>Retrieves the associated key of the specified username. |
| SS_GetUserAccessTicket<br>Retrieves a user's access ticket for the specified service. |
| SS_GetUserProfile<br>Retrieves a profile of a specific user or of the user associated with the current task. |
| SS_GetUserProfileByID<br>Retrieves a profile of a specific user by user ID. |
| SS_SetUserProfile<br>Sets a new profile for an existing user. |

*Administering Groups*

| Function Name and Description |
|---|
| SS_AddGroup<br>Adds a new group to the security database. |
| SS_DeleteGroup<br>Deletes a group name from the security database. |

| |
|---|
| SS_EnumGroups<br>Lists all groups known to the Security Server. |
| SS_GetGroupID<br>Retrieves the group name associated with a group ID. |
| SS_SetGroup<br>Sets a new description for an existing group. |

*Working with Tasks*

| Function Name and Description |
|---|
| SS_AssociateTask<br>Associates the specified task with the calling task. |
| SS_DisassociateTask<br>Disassociates a specified task from the calling task. |
| SS_EnumAssociateTasks<br>Lists all tasks associated with the calling task. |
| SS_IsAssociatedTask<br>Queries if the specified task is associated with the current task. |
| SS_IsLoggedIn<br>Queries for the login status of the current task. |

*Common Functions*

| Function Name and Description |
|---|
| SS_GetDefaultServer<br>Retrieves the default login server name. |
| SS_IsValidGroupID<br>Reports if a group ID is valid. |
| SS_SetDefaultServer<br>Sets the default login server. |

Technical Specifications

SS_AddGroup

Adds a new group to the security database.

Include Files

```
#include "sslib.h"
```

Syntax

```
int WINAPI SS_AddGroup
    LPCSTR          lpszGroupName,
    LPCSTR          lpszDescription,
    LPGROUPID       lpGroupID );
```

Parameters

| | |
|---|---|
| *lpszGroupName* | Name of the new group. It must be a unique name and must not be longer than 40 characters, including a null terminator. |
| *lpszDescription* | Application-defined text description of the group name. It must not be longer than 256 characters, including a null terminator. |
| *lpGroupID* | Location to store the returned group ID. |

Usage Notes

Only a member of the Object Manager predefined SysAdmin group can call this function.

Return Value

SS_SUCCESS
SS_ERR_INVALID_GROUP_NAME
SS_ERR_INVALID_RESULT_BUFFER
SS_ERR_NETWORK_ERROR
SS_ERR_NOT_LOGGED_IN

Related Functions

SS_DeleteGroup
SS_SetGroup

---

SS_AddUser

Adds a new user to the security database.

Include Files

```
#include "sslib.h"
```

Syntax

```
int WINAPI SS_AddUser(
    LPCSTR          lpszUserName,
    LPCSTR          lpszFullName,
    LPCSTR          lpszDescription,
    LPCSTR          lpszPassword,
    int nType,
    UINT            nSecurityLevel,
    LPGROUPIDLIST   lpGroupIDList,
    TIME_T          EffectiveDate,
    TIME_T          ExpirationDate,
    LPUSERID        lpUserID );
```

Parameters

| | |
|---|---|
| *lpszUserName* | Required login name. It must be a unique user name and must not be longer than 20 characters, including a null terminator. |
| *lpszFullName* | Required full user name. It must not be longer than 80 characters, including a null terminator. |
| *lpszDescription* | User defined description string. Specify as null or an empty string to set empty description. If it is not empty or null, the string's length must not be longer than 256 characters, including a null terminator. |
| *lpszPassword* | Required initial password for this user. It must not be longer than 20 characters, including a null terminator. The password string is case sensitive. |
| *nType* | The valid options are: TYPE_USER TYPE_SERVER |
| *nSecurityLevel* | Application defined. |
| *lpGroupIDList* | List of group membership IDs for this user. Group ID 0 is a system wide predefined guest group ID. |
| *EffectiveDate* | Account starting date in seconds since January 1, 1970. Specify 0 or a date before the current date to start the account right away. |
| *ExpirationDate* | Account expiration date in seconds since January 1, 1970. Specify 0 or a date before the current date to specify no expiration date. |
| *lpUserID* | Location to store the assigned user ID. |

Usage Notes

When a new user is added to the database, the user is assigned a user ID that is returned in the location pointed to by lpUserID. Only a member of the Object Manager predefined SysAdmin group can call this function.

Return Value

SS_SUCCESS
SS_ERR_DUPLICATE_USERNAME
SS_ERR_INVALID_FULLNAME
SS_ERR_INVALID_GROUP_ID
SS_ERR_INVALID_PASSWORD
SS_ERR_INVALID_RESULT_BUFFER
SS_ERR_INVALID_USERNAME
SS_ERR_NETWORK_ERROR
SS_ERR_NOT_LOGGED_IN

Related Functions

SS_DeleteUser
SS_EnumUsers
SS_SetUserProfile

---

SS_AssociateTask

Associates the specified task with the calling task.

Include Files

#include "sslib.h"

Syntax

```
int WINAPI SS_AssociateTask(HTASK hTask);
```

Parameters

*hTask* The specified task handle to be associated with the calling task.

Usage Notes

This function is useful when the calling task is the one that called SS_Login. An access ticket is created and associated with the task. When the task spawns another task to perform some operations on behalf of the calling task, it can call this function to associate the spawned task to the calling task, which will allow the specified task to share the same access ticket with the calling task. So the specified task can access the system as if it also is logged into the system.

By allowing another task to share the same ticket implies that the calling task granted the other task the same privileges as the calling task. If that task calls SS_Logout, the ticket is destroyed and all of the tasks that are associated with the destroyed ticket will be removed from the logged-in table. This means that the affected tasks no longer can access any service providers within the system. It also implies that the granted task can associate another task to share the same ticket or even disassociate the granting task from sharing the ticket.

Multiple calls to associate to the same task is not an error. It simply does nothing and returns SS_SUCCESS. But it is an error to try to associate to a specified task that is already sharing a different access ticket with another task; at any time, a task cannot share more than one access ticket, the same access ticket, with other tasks.

Return Value
SS_SUCCESS
SS_ERR_ASSOCIATED_TASK
SS_ERR_INVALID_TASK_HANDLE
SS_ERR_NOT_LOGGED_IN Related Functions
SS_DisassociateTask
SS_EnumAssociateTasks

----------

SS_DeleteGroup
Deletes a group name from the security database.

Include Files
#include "sslib.h"

Syntax
int WINAPI SS_DeleteGroup(LPCSTR lpszGroupName);

Parameters
*lpszGroupName* Name of the group to be deleted from the database.

Usage Notes
Only a member of the Object Manager predefined SysAdmin group can call this function.

Return Value
SS_SUCCESS
SS_ERR_NETWORK_ERROR
SS_ERR_NOT_LOGGED_IN
SS_ERR_UNKNOWN_GROUP_NAME Related Functions
SS_AddGroup
SS_EnumGroups

----------

SS_DeleteUser
Deletes a user from the security database.

Include Files
#include "sslib.h"

Syntax
int WINAPI SS_DeleteUser(LPCSTR lpszUserName);

Parameters
*lpszUserName* The user name of the user to be deleted from the security database.

Usage Notes
Only a member of the Object Manager predefined SysAdmin group can call this function.

Return Value
SS_SUCCESS
SS_ERR_NETWORK_ERROR
SS_ERR_NOT_LOGGED_IN
SS_ERR_UNKNOWN_USERNAME Related Functions
SS_AddUser
SS_EnumUsers

---------

SS_DisassociateTask
Disassociates a specified task from the calling task.

Include Files
#include "sslib.h"

Syntax
int WINAPI SS_DisassociateTask(HTASK hTask);

Parameters
*hTask* The specified task handle to be disassociated with the calling task.

Usage Notes
This function prevents the specified task from sharing the same access ticket with the calling task.

Return Value
SS_SUCCESS
SS_ERR_INVALID_TASK_HANDLE
SS_ERR_NETWORK_ERROR
SS_ERR_NOT_ASSOCIATED
SS_ERR_NOT_LOGGED_IN Related Functions
SS_AssociateTask
SS_EnumAssociateTasks
SS_IsAssociatedTask

----------

SS_EnumAssociateTasks

Lists all tasks associated with the calling task.

Include Files

```
#include "sslib.h"
```

Syntax

```
int WINAPI SS_EnumAssociateTasks(
    FARPROC        lpfnCallback,
    ULONG          UserData );
```

Parameters

*lpfnCallback* Pointer to the callback function that the Security Server library calls during enumeration. If the caller is an application, this function must be a pointer returned from MakeProcInstance. If the caller is a DLL, it must be an exported function.

*UserData* The application-defined value to pass to the callback function.

Callback Procedure

Invoke the callback as follows:

```
BOOL CALLBACK MyEnumCallback(
    HTASK          hTask,
    ULONG          UserData );
```

*hTask* Task handle associated with the current task.

*UserData* The application-defined value specified in SS_EnumAssociateTasks.

The callback function must return True to continue enumeration. It must return False to stop the enumeration.

Return Value

SS_SUCCESS
SS_ERR_INVALID_CALLBACK_FUNCTION
SS_ERR_NO_ASSOCIATED_TASK
SS_ERR_NOT_LOGGED_IN

Related Functions

SS_AssociateTask
SS_DisassociateTask
SS_IsAssociatedTask

---

SS_EnumGroups

Lists all groups known to the Security Server.

Include Files

```
#include "sslib.h"
```

Syntax

```
int WINAPI SS_EnumGroups(
    FARPROC        lpfnCallback,
    ULONG          UserData );
```

Parameters

*lpfnCallback* — Pointer to the callback function that the Security Server library calls during enumeration. If the caller is an application, this function must be a pointer returned from MakeProcInstance. If the caller is a DLL, it must be an exported function.

*UserData* — The application-defined value to pass to the callback function.

Callback Procedure

Invoke the callback as follows:

```
BOOL CALLBACK MyEnumCallback(
    LPCSTR         lpszGroupName,
    LPCSTR         lpszDescription,
    GROUPID        GroupID,
    ULONG          UserData );
```

*lpszGroupName* — Pointer to a group name string.

*lpszDescription* — Pointer to a group description string.

*GroupID* — The associated group ID.

*UserData* — The application-defined value specified in SS_EnumGroups.

The callback function must return True to continue enumeration. It must return False to stop the enumeration.

Return Value

SS_SUCCESS
SS_ERR_INVALID_CALLBACK_FUNCTION
SS_ERR_NETWORK_ERROR
SS_ERR_NOT_LOGGED_IN
SS_ERR_SS_SERVER_ERROR
SS_ERR_SS_SERVER_NOT_RESPONSE

Related Functions

SS_AddGroup
SS_DeleteGroup

---

SS_EnumUsers

Lists all users known to the Security Server or all logged-in users.

Include Files

```
#include "sslib.h"
```

Syntax

```
int WINAPI SS_EnumUsers(
    int nEnumFlag,
    FARPROC      lpfnCallback,
    ULONG        UserData );
```

Parameters

*nEnumFlag* — The valid values are:

ENUM_ALL
ENUM_LOGGED_IN_USERS

*lpfnCallback* — Pointer to the callback function that is called by the Security Server library during enumeration. If the caller is an application, this function must be a pointer returned from MakeProcInstance. If the caller is a DLL, it must be an exported function.

*UserData* — Application-defined value to pass to the callback function.

Callback Procedure

Invoke the callback as follows:

```
BOOL CALLBACK MyEnumCallback(
    LPCSTR       lpszUserName,
    LPCSTR       lpszFullName,
    LPCSTR       lpszDescription,
    USERID       UserID,
    int nUserType,
    ULONG        UserData );
```

*lpszUserName* — Pointer to a user name string.

*lpszFullName* — Pointer to a fullname string.

*lpszDescription* — Pointer to the description text.

*UserID* — The associated user ID.

*nUserType* — Valid values are:

TYPE_USER
TYPE_SERVER

*UserData* — The application-defined value specified in SS_EnumUsers.

The callback function must return True to continue enumeration. It must return False to stop the enumeration.

Return Value

SS_SUCCESS

SS_ERR_INVALID_CALLBACK_FUNCTION
SS_ERR_INVALID_ENUM_FLAG
SS_ERR_NETWORK_ERROR
SS_ERR_NOT_LOGGED_IN
SS_ERR_SS_SERVER_ERROR
SS_ERR_SS_SERVER_NOT_RESPONSE
SS_ERR_NO_MORE_USER

Related Functions
SS_AddUser
SS_DeleteUser

---

SS_ExtractUserInfo

Extracts user information from an access ticket.

Include Files
#include "sslib.h"

Syntax
```
int SS_ExtractUserInfo(
    LPACCESSTICKET      lpAccessTicket,
    LPCSTR              lpszServiceName,
    LPUSERINFO          lpUserInfo );
```

Parameters

*lpAccessTicket* Pointer to a valid access ticket.

*lpszServiceName* Name of the service provider.

*lpUserInfo* Location to store the returned user information structure.

Usage Notes
This function is used by the service provider to extract user information from the access ticket. The caller must be the same service provider for which the access ticket is intended. User information contains information about the user who requests the service, such as user ID, an array of group IDs, and security level, which the service provider can use to determine whether to honor the request or not.

Return Value
SS_SUCCESS
SS_ERR_INVALID_ACCESS_TICKET
SS_ERR_INVALID_RESULT_BUFFER
SS_ERR_NO_PERMISSION
SS_ERR_TOO_SMALL_RESULT_BUFFER

Related Functions
SS_GetUserAccessTicket

---

SS_GetCurrentUser

Retrieves information about the current user of the current task.

Include Files

#include "sslib.h"

Syntax

```
int WINAPI SS_GetCurrentUser(
    LPGENUSERINFO          lpUserInfo );
```

Parameters lpUserInfo — Pointer to the structure to store information about the current user.

Usage Notes

The function retrieves the user information from the local ticket cache.

Return Value

SS_SUCCESS
SS_ERR_NETWORK_ERROR
SS_ERR_NOT_LOGGED_IN
SS_ERR_INVALID_RESULT_BUFFER
SS_ERR_TOO_SMALL_RESULT_BUFFER

---

SS_GetDefaultServer

Retrieves the default login server name.

Include Files

#include "sslib.h"

Syntax

```
int WINAPI SS_GetDefaultServer(
    int nBufLen,
    LPSTR          lpszResultBuffer );
```

Parameters

*nBufLen* — Length of the result buffer pointed to by lpszResultBuffer.

*lpszResultBuffer* — Result buffer to store default login server name. This buffer must be large enough to store the whole server name string, including a null terminator.

Usage Notes

This is the default Security Server that will be used in authenticating users.

Return Value

SS_SUCCESS

SS_ERR_INVALID_RESULT_BUFFER
SS_ERR_TOO_SMALL_RESULT_BUFFER

Related Functions

SS_SetDefaultServer

---

SS_GetGroupID

Retrieves the group name associated with a group ID.

Include Files

#include "sslib.h"

Syntax

```
int WINAPI SS_GetGroupID(
    GROUPID          GroupID,
    int nGroupNameLen,
    LPSTR            lpszGroupName,
    int nDescriptionLen,
    LPSTR            lpszDescription );
```

Parameters

| | |
|---|---|
| *GroupID* | Group ID to get the associated group name and description. |
| *nGroupNameLen* | Size of the buffer pointed to by lpszGroupName. It must be large enough to store the entire group name string. |
| *lpszGroupName* | Location to store the group name string. |
| *nDescriptionLen* | Size of the buffer pointed to by lpszDescription. It must be large enough to store the entire group name string. |
| *lpszDescription* | Location to store the description string. |

Return Value

SS_SUCCESS
SS_ERR_INVALID_RESULT_BUFFER
SS_ERR_NETWORK_ERROR
SS_ERR_NOT_LOGGED_IN
SS_ERR_TOO_SMALL_RESULT_BUFFER
SS_ERR_UNKNOWN_GROUP_ID

---

SS_GetKey

Retrieves the associated key of the specified username.

Include Files

#include "sslib.h"

Syntax

```
int WINAPI SS_GetKey(
    LPCSTR          lpszName,
    LPCSTR          lpszKeyPathname );
```

Parameters

*lpszName* Name of the target service provider.

*lpszKeyPathname* Full pathname of the key file to be used as the store key. This filename can be any filename but when installing this file on the machine on which the service provider resides, the filename must be the same as the name of the service provider specified above, with .k as the extension. Because Object Manager uses a single ticket system the key filename must be GenericS.Key.

Usage Notes

Only a member of the system administration group can call this function. It is useful at system installation time or changes of service provider key. In this case, the system administrator can retrieve a key associated with the specified service provider from the Security Server, save it to a local disk, and then install it on the machine on which the service provider resides.

Return Value

SS_SUCCESS
SS_ERR_FAILED_CREATE_FILE
SS_ERR_INVALID_PATHNAME
SS_ERR_NETWORK_ERROR
SS_ERR_NOT_LOGGED_IN
SS_ERR_UNKNOWN_USERNAME

---

SS_GetUserAccessTicket

Retrieves a user's access ticket for the specified service.

Include Files

#include "sslib.h"

Syntax

```
int WINAPI SS_GetUserAccessTicket(
    LPCSTR          lpszTargetService,
    LPACCESSTICKET          lpAccessTicket );
```

Parameters

*lpszTargetService* Name of the target service to be accessed. Because Object Manager uses a single ticket system, this parameter is ignored.

*lpAccessTicket* Location (result buffer) to store the returned access ticket.

Usage Notes
This function generates a new access ticket for the client to access the specified service. It must be called before every attempt to access any service.

Return Value
SS_SUCCESS
SS_ERR_INVALID_RESULT_BUFFER
SS_ERR_NOT_LOGGED_IN
SS_ERR_TOO_SMALL_RESULT_BUFFER
SS_ERR_UNKNOWN_SERVICE
SS_ERR_USER_NOT_LOGIN Related Functions
SS_ExtractUserInfo

---

SS_GetUserProfile

Retrieves a profile of a specific user or of the user associated with the current task.

Include Files
#include "sslib.h"

Syntax
```
int WINAPI SS_GetUserProfile(
    LPCSTR            lpszUserName,
    LPUSERPROFILE  lpUserProfile );
```

Parameters

*lpszUserName* Name of the user to get his/her profile. If null or empty string, the current login user of the current task will be used.

*lpUserProfile* Location (result buffer) to store the returned user profile structure.

Usage Notes
Only a member of the Object Manager predefined SysAdmin group can get the entire profile of any username. Other users can get the entire profile of their own username.

Return Value
SS_SUCCESS
SS_ERR_INVALID_RESULT_BUFFER
SS_ERR_NETWORK_ERROR
SS_ERR_NOT_LOGGED_IN
SS_ERR_TOO_SMALL_RESULT_BUFFER
SS_ERR_UNKNOWN_USERNAME Related Functions
SS_GetUserProfileByID
SS_SetUserProfile

---------

SS_GetUserProfileByID

Retrieves a profile of a specific user by user ID.

Include Files
#include "sslib.h"

Syntax
```
int WINAPI SS_GetUserProfileByID(
    USERID          UserID,
    LPUSERPROFILE   lpUserProfile );
```

Parameters

*UserID* ID of the user to get his/her profile.

*lpUserProfile* Location (result buffer) to store the returned user profile structure.

Usage Notes
Only a member of the Object Manager predefined SysAdmin group can get the entire profile of the specified username. Other users can get the entire profile only for themselves.

Return Value
SS_SUCCESS
SS_ERR_INVALID_RESULT_BUFFER
SS_ERR_NETWORK_ERROR
SS_ERR_NOT_LOGGED_IN
SS_ERR_TOO_SMALL_RESULT_BUFFER
SS_ERR_UNKNOWN_USERNAME Related Functions
SS_GetUserProfile
SS_SetUserProfile

---------

SS_IsAssociatedTask

Queries if the specified task is associated with the current task.

Include Files
#include "sslib.h"

Syntax
```
int WINAPI SS_IsAssociatedTask(
```

```
        HTASK       hTask,
        LPBOOL      lpResult );
```

Parameters

*hTask* Handle of the affected task.

*lpResult* Location to store the return result. It stores True if the specified task is associated with the current task, and False if it is not.

Return Value

SS_SUCCESS
SS_ERR_INVALID_RESULT_BUFFER
SS_ERR_INVALID_TASK_HANDLE
SS_ERR_NOT_LOGGED_IN

Related Functions

SS_AssociateTask
SS_DisassociateTask
SS_EnumAssociateTasks

---

SS_IsLoggedIn

Queries for the login status of the current task.

Include Files

```
#include "sslib.h"
```

Syntax

```
BOOL WINAPI SS_IsLoggedIn(void);
```

Parameters

None.

Return Values

True
False

Related Functions

SS_Login
SS_Logout

---

SS_IsValidAccessTicket

Validates the specified access ticket.

Include Files

```
#include "sslib.h"
```

Syntax

```
BOOL SS_IsValidAccessTicket(
    LPACCESSTICKET        lpAccessTicket,
    LPCSTR        lpszServiceName );
```

Parameters

| | |
|---|---|
| *lpAccessTicket* | Pointer to the access ticket to be validated. |
| *lpszServiceName* | Name of the service provider. |

Usage Notes

This function normally is used by the service provider to validate the client's ticket before accepting the requested service. It validates that the specified ticket is authentic and not expired; that is, the ticket is issued by the login server to the user who requested the service, the ticket is to be used by the service provider who received the request with the ticket, and the ticket is not expired.

Return Values

True
False

Related Functions

SS_GetUserAccessTicket

----------

SS_IsValidGroupID

Reports if a group ID is valid.

Include Files

#include "sslib.h"

Syntax

```
BOOL WINAPI SS_IsValidGroupID(GROUPID GroupID);
```

Parameters

| | |
|---|---|
| *GroupID* | Group ID to be validated. |

Usage Notes

The function queries the Security Server to validate the group ID.

Return Values

True
False

Related Functions

SS_GetGroupID

---

SS_Login

Requests login to the system.

Include Files

#include "sslib.h"

Syntax

```
int WINAPI SS_Login(
    LPCSTR        lpszUserName,
    LPSTR         lpszPassword );
```

Parameters

*lpszUserName* Name of the user requesting to login to the system.

*lpszPassword* Password of the user. If an application needs to save the password, it must save it elsewhere; this function clears the password when it returns.

Usage Notes

If the login request is successful, the specified username is associated with the calling task.

Return Values

SS_SUCCESS
SS_ERR_CORRUPTED_DS_RECORD
SS_ERR_DS_SERVER_ERROR
SS_ERR_NETWORK_ERROR
SS_ERR_NETWORK_INIT_FAILED
SS_ERR_NO_PERMISSION
SS_ERR_NOT_LOGGED_IN
SS_ERR_SERVER_NOT_RESPONSE

Related Functions

SS_IsLoggedIn
SS_Logout

---

SS_Logout

Requests to log out of the system.

Include Files

#include "sslib.h"

Syntax

```
int WINAPI SS_Logout(void);
```

Parameters

None.

Usage Notes

This is a blocking call. When the logout request is granted, the calling task is disassociated from the login session, and any outstanding tickets associated with the calling task are completely destroyed.

Return Values

SS_SUCCESS
SS_ERR_NETWORK_ERROR
SS_ERR_USER_NOT_LOGIN

Related Functions

SS_IsLoggedIn
SS_Login

---

SS_SetDefaultServer

Sets the default login server.

Include Files

```
#include "sslib.h"
```

Syntax

```
int WINAPI SS_SetDefaultServer(
    LPCSTR            lpszServerName  );
```

Parameters

*lpszServerName* Name of the Security Server.

Usage Notes

This is the default Security Server that will be used in authenticating users.

Return Values

SS_SUCCESS
SS_ERR_UNKNOWN_SERVER

Related Functions

SS_GetDefaultServer

---

SS_SetGroup

Sets a new description for an existing group.

Include Files

```
#include "sslib.h"
```

Syntax

```
int WINAPI SS_SetUserProfile(
      LPCSTR          lpszGroupName,
      LPCSTR          lpszDescription );
```

Parameters

*lpszGroupName* Name of the affected group.

*lpszDescription* Pointer to the group's new description text. Description text is limited to 256 bytes, including a null terminator.

Usage Notes

Only a member of the Object Manager predefined SysAdmin group can call this function.

Return Values

SS_SUCCESS
SS_ERR_NETWORK_ERROR
SS_ERR_NO_PERMISSION
SS_ERR_NOT_LOGGED_IN
SS_ERR_UNKNOWN_GROUP_NAME

Related Functions

SS_AddGroup
SS_DeleteGroup

---

SS_SetUserProfile

Sets a new profile for an existing user.

Include Files

#include "sslib.h"

Syntax

```
int WINAPI SS_SetUserProfile(
      LPCSTR          lpszUserName,
      LPUSERPROFILE   lpUserProfile );
```

Parameters

*lpszUserName* Name of the user to get his/her profile. If null or empty string, the current login user of the current task will be used. szUserName, UserID, nType members of the UserProfile structure cannot be changed and are ignored by this function.

*lpUserProfile* Pointer to user profile structure.

Usage Notes

Only a member of the Object Manager predefined SysAdmin group can call this function to change the profile of other users. Users can change only the data in the full name and description fields of their own profiles.

Return Values

SS_SUCCESS
SS_ERR_NETWORK_ERROR
SS_ERR_NO_PERMISSION
SS_ERR_NOT_LOGGED_IN
SS_ERR_UNKNOWN_USERNAME

Related Functions

SS_GetUserProfile
SS_GetUserProfileByID

VOLUME MANAGER LIBRARY FUNCTIONS

The Volume Manager Library (VMLIB) provides a set of functions that manage volumes and the objects that reside on those volumes. The set consists of the following groups: general functions related to administering volume manager 123; functions related to backing up and restoring volumes; functions related to managing families; functions related to managing volumes; and functions related to managing objects. The tables that follow list each of the Volume Manager Library functions by group along with its description.

*General Functions*

| Function Name and Description |
|---|
| VM_Initialize<br>Initializes the VMLIB module. |
| VM_Terminate<br>Terminates the VMLIB module. |
| VM_Attach<br>Attaches a user to a specific Volume Manager. |
| VM_Detach<br>Detaches a user from a Volume Manager. |
| VM_EnumVolMgrs<br>Lists the names of all the Volume Managers in the system. |

| |
|---|
| VM_GetErrorText<br>Retrieves the error text associated with a specified error code and returns it to the caller. |
| VM_EnumCheckOuts<br>Lists checked out objects on all servers in the system by invoking a callback procedure for each checked out object. |
| VM_CheckInDialog<br>Displays a dialog box that shows a list of checked out objects. |
| VM_ACLDialog<br>Displays a dialog box which allows a user to modify an access control list (ACL). |

*Backup and Restore Functions*

| Function Name and Description |
|---|
| VM_BackupCreate<br>Creates a backup definition on the attached Volume Manager. |
| VM_BackupChange<br>Changes a backup definition on the attached Volume Manager. |
| VM_BackupDelete<br>Deletes a backup definition on the attached Volume Manager. |
| VM_BackupSchedule<br>Schedules a defined backup on the attached Volume Manager. |
| VM_BackupStop<br>Stops a scheduled backup on the attached Volume Manager. |
| VM_BackupGetAttr<br>Obtains the attributes of a defined backup on the attached Volume Manager, and returns the attributes to the caller. |
| VM_EnumBackups<br>Lists all backup definition names in the attached Volume Manager by invoking the callback procedure for each definition name. |
| VM_BackupGetLabel<br>Obtains the backup label from the first media in a backup set, and returns the label to the caller. |

| |
|---|
| VM_BackupEnumVolObjects<br>Lists objects on a volume backed up on a backup set by invoking the callback procedure for each object. |
| VM_BackupEnumVolumes<br>Lists the names of all volumes backed up on a backup set by invoking the callback procedure for each volume. |
| VM_BackupVolGetAttr<br>Retrieves the attributes of a volume backed up on a backup set, and returns the attributes to the caller. |
| VM_BackupObjGetAttr<br>Retrieves the object attributes associated with an object handle backed up on a backup set, and returns the attributes to the caller. |
| VM_RestoreVolumes<br>Restores one or more volumes backed up on a backup set. |
| VM_JournalGetLabel<br>Obtains the journal label from the first media in a journal set, and returns the label to the caller. |
| VM_ReplayJournal<br>Replays a journal set. |

*Family Functions*

| Function Name and Description |
|---|
| VM_EnumFamilies<br>Lists family names in the system and invokes the specified callback procedure for each family. |
| VM_FamCreate<br>Creates a family on the attached Volume Manager. |
| VM_FamDelete<br>Deletes a family on the attached Volume Manager. |
| VM_FamRename<br>Renames a family on the attached Volume Manager. |

*Volume Functions*

| Function Name and Description |
|---|

| |
|---|
| VM_EnumVolumes<br>Lists volume names on all servers in the system by invoking a callback procedure for each volume. |
| VM_VolCreate<br>Creates a volume on the attached Volume Manager. |
| VM_VolDelete<br>Deletes a volume on the attached Volume Manager. |
| VM_VolExport<br>Exports a volume on the attached Volume Manager. |
| VM_VolImport<br>Imports a volume on the attached Volume Manager. |
| VM_VolGetAttr<br>Retrieves the attributes of a volume and returns them to the caller. |
| VM_VolSetAttr<br>Sets the attributes of a volume. |
| VM_VolGetState<br>Retrieves the current state of a volume and returns it to the caller. |
| VM_VolSetState<br>Sets the current state of a volume. |
| VM_VolEnumObjects<br>Lists objects on a volume and invokes the specified callback procedure for each object. |

*Object Functions*

| **Function Name and Description** |
|---|
| VM_ObjOpen<br>Opens an object specified by an object handle and prepares the object datafile for subsequent reading or writing. If the open is successful, the current object attributes are returned to the caller. |
| VM_ObjClose<br>Closes an object datafile. |

| |
|---|
| VM_ObjCreate<br>Creates an object on the specified volume/family, and returns a handle to the created object. |
| VM_ObjDelete<br>Decreases the reference count for an object specified by an object handle and deletes the object when the count reaches zero. |
| VM_ObjRead<br>Reads data from an object datafile. |
| VM_ObjWrite<br>Writes to an object datafile. |
| VM_ObjStartCache<br>Initiates a fetch of an object into the read cache of the object's Volume Manager. |
| VM_ObjStopCache<br>Cancels the fetch of an object into the read cache of the object's Volume Manager. |
| VM_ObjAddReference<br>Adds a reference to the object associated with a specified object handle. |
| VM_ObjRemReference<br>Removes a reference to the object associated with a specified object handle. |
| VM_ObjCheckIn<br>Checks in the object associated with a specified object handle. |
| VM_ObjCheckOut<br>Checks out the object associated with a specified object handle. |
| VM_ObjGetAttr<br>Retrieves the object attributes associated with a specified object handle. |
| VM_ObjSetAttr<br>Sets the attributes associated with a specified object handle. |
| VM_ObjGetType<br>Retrieves the object type associated with a specified object handle. |

| |
|---|
| VM_ObjGetVolName<br>Retrieves the volume name associated with a specified object handle. |
| VM_ObjSeek<br>Seeks to a particular byte of an object datafile. |
| VM_ObjSwap<br>Swaps two objects. |

*Technical Specifications*

VM_ACLDialog

Displays a dialog box which allows a user to modify an access control list (ACL).

Include Files

```
#include "vmlib.h"
```

Syntax

```
int WINAPI VM_ACLDialog(
    HWND        hWnd,
    LPVM_ACL    lpACL );
```

Parameters

*hWnd* Parent window handle.

*lpACL* Pointer to access control list.

Usage Notes

Provides a graphical user interface which allows a user to add, modify, and delete entries in an access control list (ACL). The user must call the function with a far pointer to a legitimate VM_ACL structure which can either be initialized to all zeroes or obtained from a previous call to VM_VolGetAttr or VM_ObjGetAttr. A typical use of this call might be to call VM_VolGetAttr or VM_ObjGetAttr to retrieve an ACL, call VM_ACLDialog to update the ACL, and call VM_VolSetAttr or VM_ObjSetAttr to update the contents of the ACL associated with the corresponding volume or object.

The ACL dialog is shown below.

Structures

```
typedef struct {
  WORD wID;                        /*user/group ID*/
  unsigned int flsGroupID : 1;     /*is wID a group ID*/
  unsigned int fPermissions : 15;  /*set of permissions*/
} VM_ACE, FAR *LPVM_ACE;

typedef VM_ACE VM_ACL[MAX_ACL_SIZE], FAR *LPVM_ACL;
```

Return Values
VM_OK
VM_OUT_OF_RESOURCE

Related Functions
VM_ObjGetAttr
VM_ObjSetAttr
VM_VolGetAttr
VM_VolSetAttr

---------

VM_Attach

Attaches a user to a specific Volume Manager.

Include Files
#include "vmlib.h"

Syntax
int WINAPI VM_Attach(LPCSTR lpszVolMgr);

Parameters
*lpszVolMgr* Volume Manager name.

Usage Notes
Attaches a user to the specified Volume Manager for performing administrative functions such as creating, deleting, exporting, and importing a volume. The caller must have access rights to use the function.

Return Values
VM_OK
VM_ATTACHED
VM_NO_SUCH_VOLMGR
VM_NETWORK_ERROR

Related Functions
VM_Detach
VM_EnumVolMgrs

VM_BackupChange

Changes a backup definition on the attached Volume Manager.

Include Files

#include "vmlib.h"

Syntax

```
int WINAPI VM_BackupChange(
    LPCSTR                  lpszBackupName,
    LPVM_BACKUPVOLSPEC      lpBackupVolSpec,
    LPVM_DEVSPEC            lpDeviceSpec );
```

Parameters

| | |
|---|---|
| *lpszBackupName* | Backup definition name. |
| *lpszBackupVolSpec* | Pointer to specification of volumes to backup. |
| *lpDeviceSpec* | Pointer to specification of backup devices. |

Usage Notes

Changes a named backup definition in the attached Volume Manager. The changed definition specifies the volumes to back up (for non predefined backup definitions) and the set of devices to be used in the specified order to perform the backup. Scheduled backup definitions cannot be changed. A scheduled backup should be stopped using VM_BackupStop, before being changed. For predefined backups, only the backup devices can be changed. The caller must have administrator access rights to use the function, if Security Services are enabled.

Structures

```
typedef struct {
  DWORD dwVolumes;              /*Number of Volumes to backup*/
  char **lplpszVolumes;         /*Pointer to an array of volumes
                                  *to backup*/
} VM BACKUPVOLSPEC, FAR *LPVM_BACKUPVOLSPEC;

typedef struct {
  DWORD dwBackupDevices;        /*Number of backup devices*/
  char **lplpszBackupDevices;   /*Pointer to an array of backup
                                  *devices*/
} VM_DEVSPEC, FAR *LPVM_DEVSPEC;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_NO_SUCH_VOLUME
VM_INVALID_BACKUP_ARGS
VM_NO_SUCH_BACKUP
VM_BACKUP_BUSY

VM_UNKNOWN

Related Functions

VM_BackupCreate
VM_BackupDelete
VM_BackupSchedule
VM_BackupStop
VM_BackupGetAttr

---

VM_BackupCreate

Creates a backup definition on the attached Volume Manager.

Include Files

#include "vmlib.h"

Syntax

```
int WINAPI VM_BackupCreate(
    LPCSTR                  lpszBackupName,
    LPVM_BACKUPVOLSPEC          lpBackupVolSpec,
    LPVM_DEVSPEC            lpDeviceSpec );
```

Parameters

| | |
|---|---|
| *lpszBackupName* | Backup definition name. |
| *lpszBackupVolSpec* | Pointer to specification of volumes to backup. |
| *lpDeviceSpec* | Pointer to specification of backup devices. |

Usage Notes

Creates a backup definition in the attached Volume Manager. The definition specifies the volumes to back up and a set of devices to be used in the specified order to perform the backup. The caller must have administrator access rights to use the function, if Security Services are enabled.

Structures

```
typedef struct {
  DWORD dwVolumes;            /*Number of Volumes to backup*/
  char **lplpszVolumes;       /*Pointer to an array of volumes
                  *to backup*/
} VM_BACKUPVOLSPEC, FAR *LPVM BACKUPVOLSPEC;

typedef struct {
  DWORD dwBackupDevices;         /*Number of backup devices*/
  char **lplpszBackupDevices;    /*Pointer to an array of backup
                  *devices*/
} VM_DEVSPEC, FAR *LPVM_DEVSPEC;
```

Return Values

VM_OK
VM_NOT_INITIALIZED
VM_NOT_ATTACHED

VM_MEM_ALLOCATION_ERR
VM_NETWORK_ERROR
VM_NOT_LOGGED_ON
VM_NO_PERMISSION
VM_NO_SUCH_VOLUME
VM_DUPLICATE_BACKUP
VM_INVALID_BACKUP_ARGS
VM_UNKNOWN

Related Functions
VM_BackupDelete
VM_BackupChange
VM_BackupSchedule
VM_BackupStop
VM_BackupGetAttr

---------

VM_BackupDelete

Deletes a backup definition on the attached Volume Manager.

Include Files

#include "vmlib.h"

Syntax

```
int WINAPI VM_BackupDelete(
    LPCSTR              lpszBackupName );
```

Parameters

*lpszBackupName* Backup definition name.

Usage Notes

Deletes a backup definition in the attached Volume Manager. Scheduled and predefined backup definitions cannot be deleted. A scheduled backup should be stopped using VM_BackupStop, before being deleted. The caller must have administrator access rights to use the function, if Security Services are enabled.

Return Values

VM_OK
VM_NOT_INITIALIZED
VM_NOT_ATTACHED
VM_NETWORK_ERROR
VM_NOT_LOGGED_ON
VM_NO_PERMISSION
VM_NO_SUCH_BACKUP
VM_BACKUP_BUSY
VM_UNKNOWN

Related Functions

VM_BackupCreate
VM_BackupChange
VM_BackupSchedule

VM_BackupStop
VM_BackupGetAttr

---

VM_BackupEnumVolObjects

Lists objects on a volume backed up on a backup set by invoking the callback procedure for each object.

Include Files

#include "vmlib.h"

Syntax

```
int WINAPI VM_BackupEnumVolObjects(
    LPVM_DEVSPEC  lpDeviceSpec,
    LPCSTR        lpszVolName,
    FARPROC       lpEnumProc,
    LPVOID        lpData,
    BOOL          bContinue );
```

Parameters

| | |
|---|---|
| *lpDeviceSpec* | Pointer to specification of backup devices. |
| *lpszVolName* | Volume name. |
| *lpEnumProc* | Callback procedure. |
| *lpData* | Application specific data to be passed untouched to the callback procedure. |
| *bContinue* | Indicates if an interrupted enumeration should be aborted. |

Usage Notes

Enumerates all objects in a volume backed up in the specified backup set. The media constituting the backup set are assumed to be loaded in the devices specified in lpDeviceSpec, in the proper order. If the enumeration is interrupted due to exhaustion of all specified devices in the backup set, the function returns the status code VM_END_OF_DEVICE_GROUP. The enumeration can be aborted by setting the bContinue argument to FALSE in a subsequent call to this function, or resumed after replacing media in the devices by setting the argument to TRUE. The caller must have administrator access rights to use the function, if Security Services are enabled.

Callback Procedure

Invoke the callback procedure as follows:

```
int FAR PASCAL EnumProc(
    LPVOID    lpData;
    DWORD     dwObjID );
```

| | |
|---|---|
| *lpData* | Callback parameter specified in VM_BackupEnumVolObjects |
| *dwObjID* | Unique object identifier (the numeric portion of the object handle). |

EnumProc is a placeholder for the application-supplied procedure name. The actual name must be exported by including it in an EXPORTS statement in the application's module definition file.

When VM_BackupEnumVolObjects calls EnumProc, it passes only a portion of the object handle in dwObjID. An example function to convert dwObjID to a full object handle is shown in the Technical Specification for VM_VolEnumObjects.

Structures

```
typedef struct {
  DWORD dwBackupDevices;         /*Number of backup devices*/
  char **lplpszBackupDevices;    /*Pointer to an array of backup
                                  *devices*/
} VM_DEVSPEC, FAR *LPVM_DEVSPEC;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_NO_SUCH_VOLUME
VM_INVALID_RESTORE_ARGS
VM_END_OF_DEVICE_GROUP
VM_RESTORE_STOPPED
VM_UNKNOWN

Related Functions

VM_BackupGetLabel
VM_BackupEnumVolumes
VM_BackupVolGetAttr
VM_BackupObjGetAttr
VM_RestoreVolumes

---

VM_BackupEnumVolumes

Lists the names of all volumes backed up on a backup set by invoking the callback procedure for each volume.

Include Files

#include "vmlib.h"

Syntax

```
int WINAPI VM_BackupEnumVolumes(
    LPVM_DEVSPEC  lpDeviceSpec,
    FARPROC       lpEnumProc,
    LPVOID        lpData,
    BOOL          bContinue );
```

Parameters

| | |
|---|---|
| *pDeviceSpec* | Pointer to specification of backup devices. |
| *lpEnumProc* | Callback procedure. |
| *lpData* | Application specific data to be passed untouched to the callback procedure. |
| *bContinue* | Indicates if an interrupted enumeration should be aborted. |

Usage Notes

Enumerates all volumes backed up in the specified backup set. The media constituting the backup set are assumed to be loaded in the devices specified in lpDeviceSpec, in the proper order. If the enumeration is interrupted due to exhaustion of all specified devices in the backup set, the function returns the status code VM_END_OF_DEVICE_GROUP. The enumeration can be aborted by setting the bContinue argument to FALSE in a subsequent call to this function, or resumed after replacing media in the devices by setting the argument to TRUE. The caller must have administrator access rights to use the function, if Security Services are enabled.

Callback Procedure

Invoke the callback procedure as follows:

```
int FAR PASCAL EnumProc(
    LPVOID       lpData;
    LPCSTR       lpszVolume );
```

| | |
|---|---|
| *lpData* | Callback parameter specified in VM_BackupEnumVolumes |
| *lpszVolume* | Volume name. |

EnumProc is a placeholder for the application-supplied procedure name. The actual name must be exported by including it in an EXPORTS statement in the application's module definition file.

Structures

```
typedef struct {
  DWORD dwBackupDevices;        /*Number of backup devices*/
  char **lplpszBackupDevices;   /*Pointer to an array of backup
                                *devices*/
} VM_DEVSPEC, FAR *LPVM_DEVSPEC;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_INVALID_RESTORE_ARGS
VM_END_OF_DEVICE_GROUP
VM_RESTORE_STOPPED
VM_UNKNOWN

Related Functions

VM_BackupGetLabel
VM_BackupEnumVolObjects
VM_BackupVolGetAttr
VM_BackupObjGetAttr
VM_RestoreVolumes

---

VM_BackupGetAttr

Obtains the attributes of a defined backup on the attached Volume Manager, and returns the attributes to the caller.

Include Files

```
#include "vmlib.h"
```

Syntax

```
int WINAPI VM_BackupGetAttr(
    LPCSTR              lpszBackupName,
    LPVM_BACKUPATTR         lpBackupAttr  );
```

Parameters

| | |
|---|---|
| *lpszBackupName* | Backup definition name. |
| *lpBackupAttr* | Pointer to backup attributes. |

Usage Notes

Gets the attributes of the defined backup in the attached Volume Manager. The backup attributes include the backup definition, its prior or current schedule specification and schedule status, and the last backup time and completion status. The definition specifies the volumes to back up (for non predefined backup definitions) and a set of devices to be used in the specified order to perform the backup. If the backup had ever been scheduled or is currently scheduled, its prior or current schedule specification is also retrieved. The schedule status indicates if the backup is unscheduled, scheduled or started. If the backup had ever been started, the last backup time and its completion status are also retrieved. The caller must have administrator access rights to use the function, if Security Services are enabled.

Structures

```
typedef enum {
    VM_B_UNSCHEDULED = 0,                          /*Backup is not scheduled*/
        VM_B_SCHEDULED,                                        /*Backup is
            scheduled*/
        VM_B_STARTED
                                    /*Backup is started*/
} BACKUP_STATUS;

typedef struct {
  DWORD dwLastBackupTime;        /*Time of last backup*/
  BACKUP_STATUS Status;          /*Current status of backup*/
  int nErrCode;               /*Error code from last backup*/
  VM_BACKUPVOLSPEC backupVolSpec;   /*Current definition of volumes
                  *to backup*/
  VM_DEVSPEC deviceSpec;         /*Current backup devices*/
  VM_SCHEDULESPEC scheduleSpec;    /*Schedule specifications*/
} VM_BACKUPATTR, FAR *LPVM_BACKUPATTR;

typedef struct {
  DWORD dwVolumes;            /*Number of Volumes to backup*/
  char **lplpszVolumes;        /*Pointer to an array of volumes
                  *to backup*/
} VM_BACKUPVOLSPEC, FAR *LPVM_BACKUPVOLSPEC;

typedef struct {
  DWORD dwBackupDevices;         /*Number of backup devices*/
  char **lplpszBackupDevices;     /*Pointer to an array of backup
                  *devices*/
} VM_DEVSPEC, FAR *LPVM_DEVSPEC;

typedef struct {
  BACKUP_SCHEDULE_TYPE scheduleType;  /*Schedule Type*/
  union {
    DWORD dwLaterTime;          /*Time of scheduled later backup*/
    VM_PERIODICSPEC periodicSpec;  /*Periodic Schedule Specification*/
  } scheduleSpec;            /*Schedule Specification*/
} VM_SCHEDULESPEC, FAR *LPVM_SCHEDULESPEC;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_NO_SUCH_BACKUP
VM_UNKNOWN

Related Functions

VM_BackupCreate
VM_BackupChange
VM_BackupSchedule
VM_BackupStop
VM_BackupDelete

---

VM_BackupGetLabel

Obtains the backup label from the first media in a backup set, and returns the label to the caller.

Include Files

```
#include "vmlib.h"
```

Syntax

```
int WINAPI VM_BackupGetLabel(
    LPVM_DEVSPEC          lpDeviceSpec,
    LPVM_BACKUPLABEL      lpBackupLabel );
```

Parameters

*lpDeviceSpec* Pointer to specification of backup devices.

*lpBackupLabel* Pointer to backup label.

Usage Notes

Gets the label off the first media in the specified backup set. The backup label identifies the backup definition name, the time of backup, and the number of backed up entities (volumes, database records, or files). The media constituting the backup set are assumed to be loaded in the devices specified in lpDeviceSpec, in the proper order. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                                    *devices*/
} VM_DEVSPEC, FAR *LPVM_DEVSPEC;

typedef struct {
  char szBackupName[L_BACKUPNAME+1]; /*Backup name*/
  DWORD dwBackupTime;             /*Time of Backup*/
  BYTE nSerialNo;                 /*Serial Number of backup device in
                                    *group*/
  DWORD dwEntries;                /*Number of entries backed up*/
} VM_BACKUPLABEL, FAR *LPVM_BACKUPLABEL;
```

Return Values

VM_OK
VM_NOT_INITIALIZED
VM_NOT_ATTACHED
VM_NETWORK_ERROR
VM_NOT_LOGGED_ON
VM_NO_PERMISSION
VM_END_OF_DEVICE_GROUP
VM_UNKNOWN

Related Functions

VM_BackupEnumVolumes
VM_BackupEnumVolObjects
VM_BackupVolGetAttr
VM_BackupObjGetAttr
VM_RestoreVolumes

---

VM_BackupObjGetAttr

Retrieves the object attributes associated with an object handle backed up on a backup set, and returns the attributes to the caller.

Include Files

#include "vmlib.h"

Syntax

```
int WINAPI VM_BackupObjGetAttr(
    LPVM_DEVSPEC    lpDeviceSpec,
    LPVM_OBJHANDLE          lpObjHandle,
    LPVM_OBJATTR  lpObjAttr,
    BOOL              bContinue );
```

Parameters

| | |
|---|---|
| *lpDeviceSpec* | Pointer to specification of backup devices. |
| *lpObjHandle* | Pointer to an object handle. |
| *lpObjAttr* | Pointer to the object attributes structure. |
| *bContinue* | Indicates if the attributes retrieval should be aborted. |

Usage Notes

Gets the attributes of an object backed up in the specified backup set. The media constituting the backup set are assumed to be loaded in the devices specified in lpDeviceSpec, in the proper order. If the retrieval is interrupted due to exhaustion of all specified devices in the backup set, the function returns the status code VM_END_OF_DEVICE_GROUP. The retrieval can be aborted by setting the bContinue argument to FALSE in a subsequent call to this function, or resumed after replacing media in the devices by setting the argument to TRUE. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                  *devices*/
} VM_DEVSPEC, FAR *LPVM_DEVSPEC;

typedef char VM_OBJHANDLE[L_OBJHANDLE], FAR *LPVM_OBJHANDLE;

typedef struct {
  char szFilename[L_FILENAME+1]; /*RW - original filename for object*/
  WORD wObjType;            /*RW - object type*/
  WORD wObjFlags;           /*RW - object flags*/
  DWORD dwObjSize;          /*R - object size (in bytes)*/
  DWORD dwPrimaryBlocks;    /*R - allocated blocks (primary zone)*/
  DWORD dwOverflowBlocks;   /*R - allocated blocks (overflow zone)*/
  WORD wDirNumber;          /*R - directory number*/
  WORD wFileNumber;         /*R - file number*/
  WORD wRefCount;           /*R - reference count*/
  WORD wRevLevel;           /*R - revision level*/
  DWORD dwTimeStamp;        /*R - creation date & time*/
  WORD wCreatorUIC;         /*R - creator UIC (writer of object)*/
  WORD wOwnerUIC;           /*R - owner UIC (checker of object*/
  WORD wSecurity;           /*RW - security level of object*/
  WORD wUserData;           /*RW - user data field*/
  BYTE nCompression;        /*RW - compression type field*/
  BYTE nEncryption;         /*RW - encryption type field*/
  VM_ACL acl;               /*RW - access control list*/
} VM_OBJATTR, FAR *LPVM_OBJATTR;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_NO_SUCH_OBJECT
VM_NO_SUCH_VOLUME
VM_INVALID_RESTORE_ARGS
VM_END_OF_DEVICE_GROUP
VM_RESTORE_STOPPED
VM_UNKNOWN

Related Functions

VM_BackupGetLabel
VM_BackupEnumVolumes
VM_BackupEnumVolObjects
VM_BackupVolGetAttr
VM_RestoreVolumes

---

VM_BackupSchedule

Schedules a defined backup on the attached Volume Manager.

Include Files

```
#include "vmlib.h"
```

Syntax

```
int WINAPI VM_BackupSchedule(
    LPCSTR                  lpszBackupName,
    LPVM_SCHEDULESPEC       lpScheduleSpec,
    BOOL                    bContinue );
```

Parameters

| | |
|---|---|
| *lpszBackupName* | Backup definition name. |
| *lpszScheduleSpec* | Pointer to backup schedule specification. |
| *bContinue* | Indicates if interrupted backup should be aborted. |

Usage Notes

Schedules a defined backup in the attached Volume Manager. The backup can be scheduled to run immediately (attended backup), run at a specified later time, or run using a periodic schedule. If an attended backup is interrupted due to exhaustion of all specified backup devices, the function returns the status code VM_END_OF_DEVICE_GROUP. The attended backup can be aborted by setting the bContinue argument to FALSE in a subsequent call to this function, or resumed after replacing media in the backup devices by setting the argument to TRUE. The caller must have administrator access rights to use the function, if Security Services are enabled.

Structures

```
typedef enum {
    VM_B_NOW = 0,                          /*Schedule backup now
          (attended)*/
    VM_B_LATER,                            /*Schedule backup at a later
          time*/
    VM_B_PERIODIC                          /*Schedule backup using periodic
          schedule*/
} BACKUP_SCHEDULE_TYPE;

typedef struct {
  BYTE nHour;          /*Hour of periodic schedule*/
  BYTE nMin;           /*Minute of periodic schedule*/
  BYTE nWeekDays;      /*Days in week of periodic schedule*/
  DWORD dwMonthDays;   /*Days in month of periodic schedule*/
  WORD wMonths;        /*Months in year of periodic
          *schedule*/
} VM_PERIODICSPEC, FAR *LPVM_PERIODICSPEC;

typedef struct {
  BACKUP_SCHEDULE_TYPE scheduleType;  /*Schedule Type*/
  union {
    DWORD dwLaterTime;          /*Time of scheduled later backup*/
    VM_PERIODICSPEC periodicSpec;  /*Periodic Schedule Specification*/
  } scheduleSpec;          /*Schedule Specification*/
} VM_SCHEDULESPEC, FAR *LPVM_SCHEDULESPEC;
```

Return Values

VM_OK
VM_NOT_INITIALIZED
VM_NOT_ATTACHED
VM_NETWORK_ERROR

VM_NOT_LOGGED_ON
VM_NO_PERMISSION
VM_NO_SUCH_BACKUP
VM_BACKUP_BUSY
VM_SPAWN_FAILED
VM_END_OF_DEVICE_GROUP
VM_BACKUP_STOPPED
VM_NO_SUCH_VOLUME
VM_VOLUME_BUSY
VM_MAIN_FAILURE
VM_MIRROR_FAILURE
VM_UNKNOWN

Related Functions

VM_BackupCreate
VM_BackupChange
VM_BackupDelete
VM_BackupStop
VM_BackupGetAttr

---

VM_BackupStop

Stops a scheduled backup on the attached Volume Manager.

Include Files

```
#include "vmlib.h"
```

Syntax

```
int WINAPI VM_BackupStop(
    LPCSTR          lpszBackupName  );
```

Parameters

*lpszBackupName* Backup definition name.

Usage Notes

Stops a scheduled backup in the attached Volume Manager. The caller must have administrator access rights to use the function, if Security Services are enabled.

Return Values

VM_OK
VM_NOT_INITIALIZED
VM_NOT_ATTACHED
VM_NETWORK_ERROR
VM_NOT_LOGGED_ON
VM_NO_PERMISSION
VM_NO_SUCH_BACKUP
VM_BACKUP_NOT_SCHEDULED
VM_UNKNOWN

Related Functions
VM_BackupCreate
VM_BackupChange
VM_BackupSchedule
VM_BackupDelete
VM_BackupGetAttr

---

VM_BackupVolGetAttr

Retrieves the attributes of a volume backed up on a backup set, and returns the attributes to the caller.

Include Files

```
#include "vmlib.h"
```

Syntax

```
int WINAPI VM_BackupVolGetAttr(
    LPVM_DEVSPEC  lpDeviceSpec,
    LPCSTR        lpszVolName,
    LPVM_VOLATTR  lpVolAttr,
    BOOL          bContinue );
```

Parameters

| | |
|---|---|
| *lpDeviceSpec* | Pointer to specification of backup devices. |
| *lpszVolName* | Volume name. |
| *lpVolAttr* | Pointer to the volume attributes structure. |
| *bContinue* | Indicates if the attributes retrieval should be aborted. |

Usage Notes

Gets the attributes of a volume backed up in the specified backup set. The media constituting the backup set are assumed to be loaded in the devices specified in lpDeviceSpec, in the proper order. If the retrieval is interrupted due to exhaustion of all specified devices in the backup set, the function returns the status code VM_END_OF_DEVICE_GROUP. The retrieval can be aborted by setting the bContinue argument to FALSE in a subsequent call to this function, or resumed after replacing media in the devices by setting the argument to TRUE. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                                  *devices*/
} VM_DEVSPEC, FAR *LPVM_DEVSPEC;

typedef struct {
  char szFamName[L_FAMNAME+1];    /*R - associated family name*/
  char szVolPath[L_VOLPATH+1];    /*R - full path of volume*/
  char szMirrorVolPath[L_VOLPATH+1]; /*R - full path of mirror volume*/
  WORD wVolType;                  /*R - volume type*/
  WORD wVolState;                 /*RW - volume state (online/offline)*/
  WORD wVolFlags;                 /*RW - volume flags*/
  DWORD dwObjectCount;            /*R - total number of objects*/
  DWORD dwExportSize;             /*R - allocated size (in KB)
                                  *of export zone*/
  DWORD dwExportFree;             /*R - available size (in KB)
                                  *of export zone*/
  DWORD dwPrimarySize;            /*R - allocated size (in KB)
                                  *of primary zone*/
  DWORD dwPrimaryFree;            /*R - available size (in KB)
                                  *of primary zone*/
  DWORD dwOverflowSize;           /*R - allocated size (in KB)
                                  *of overflow zone*/
  DWORD dwOverflowFree;           /*R - available size (in KB)
                                  *of overflow zone*/
  VM_ACL acl;                     /*RW - access control list*/
} VM_VOLATTR, FAR *LPVM_VOLATTR;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_NO_SUCH_VOLUME
VM_INVALID_RESTORE_ARGS
VM_END_OF_DEVICE_GROUP
VM_RESTORE_STOPPED
VM_UNKNOWN

Related Functions

VM_BackupGetLabel
VM_BackupEnumVolumes
VM_BackupEnumVolObjects
VM_BackupObjGetAttr
VM_RestoreVolumes

---

VM_CheckInDialog

Displays a dialog box that shows a list of checked out objects.

Include Files

#include "vmlib.h"

Syntax int WINAPI VM_CheckInDialog(HWND hWnd);

Parameters

*hWnd* Parent window handle.

Usage Notes

Displays a dialog box that shows a list of checked out objects on the attached Volume Manager. A user with access rights can use the dialog box to check in objects. The user selects the Save button to check in the object with changes and selects the Discard button to check in the object without the changes.

The checkin dialog is shown below.

Return Values

VM_OK
VM_NOT_INITIALIZED
VM_NOT_ATTACHED
VM_NETWORK_ERROR
VM_NOT_LOGGED_ON
VM_NO_PERMISSION
VM_UNKNOWN

Related Functions

VM_EnumBackups
VM_ObjCheckIn
VM_ObjCheckOut
VM_ObjGetAttr

---

VM_Detach

Detaches a user from a Volume Manager.

Include Files

#include "vmlib.h"

Syntax int WINAPI VM_Detach(void);

Parameters

None.

Usage Notes

Detaches a user from the Volume Manager to which the user was previously attached via the VM_Attach function.

Return Values
VM_OK
VM_NOT_ATTACHED
VM_NETWORK_ERROR

Related Functions
VM_Attach

---------

VM_EnumBackups

Lists all backup definition names in the attached Volume Manager by invoking the callback procedure for each definition name.

Include Files
#include "vmlib.h"

Syntax
```
int WINAPI VM_EnumBackups(
FARPROC lpEnumProc,
LPVOID    lpData );
```

Parameters

*lpEnumProc* Callback procedure.

*lpData* Application specific data to be passed untouched to the callback procedure.

Usage Notes

Enumerates all backup definitions in the attached Volume Manager. The caller must have administrator access rights to use the function, if Security Services are enabled.

Callback Procedure

Invoke the callback procedure as follows:

```
int FAR PASCAL EnumProc(
    LPVOID      lpData;
    LPCSTR      lpszBackupName );
```

*lpData* Callback parameter specified in VM_EnumBackups

*lpszBackupName* Backup definition name.

EnumProc is a placeholder for the application-supplied procedure name. The actual name must be exported by including it in an EXPORTS statement in the application's module definition file.

Return Values
VM_OK
VM_NOT_INITIALIZED
VM_NOT_ATTACHED
VM_NETWORK_ERROR

VM_NOT_LOGGED_ON
VM_NO_PERMISSION
VM_UNKNOWN

Related Functions
VM_BackupCreate
VM_BackupChange
VM_BackupSchedule
VM_BackupStop
VM_BackupDelete

---

VM_EnumCheckOuts

Lists checked out objects on all servers in the system by invoking a callback procedure for each checked out object.

Include Files

```
#include "vmlib.h"
```

Syntax

```
int WINAPI VM_EnumCheckOuts(
    BOOL        bAllServers,
    FARPROC     lpEnumProc,
    LPVOID      lpData );
```

Parameters

*bAllServers* — Boolean variable that operates as follows:

| | |
|---|---|
| True | Queries each Volume Manager to return a list of its checked out objects. |
| False | Enumerates all checked out objects on the attached Volume Manager. |

Enumeration continues until there are no more checked out objects or the callback procedure returns zero.

*lpEnumProc* — Callback procedure.

*lpData* — Application specific data to be passed untouched to the callback procedure.

Callback Procedure

Invoke the callback as follows:

```
int FAR PASCAL EnumProc(
    LPVOID            lpData,
    LPVM_OBJHANDLE    lpObjHandle );
```

*lpData* — Callback parameter specified in VM_EnumCheckOuts.

*lpObjHandle* — Pointer to an object handle.

EnumProc is a placeholder for the application-supplied procedure name. The actual name must be exported by including it in an EXPORTS statement in the application's module definition file.

Structures

```
typedef char VM_OBJHANDLE[L_OBJHANDLE], FAR *LPVM_OBJHANDLE;
```

Return Values

VM_OK
VM_NOT_ATTACHED
VM_NETWORK_ERROR

Related Functions

VM_ObjCheckIn
VM_ObjCheckOut
VM_VolGetAttr

----------

VM_EnumFamilies

Lists family names in the system and invokes the specified callback procedure for each family.

Include Files

```
#include "vmlib.h"
```

Syntax

```
int WINAPI VM_EnumFamilies(
        BOOL            bAllServers,
        FARPROC         lpEnumProc,
        LPVOID          lpData );
```

Parameters

*bAllServers* — Boolean variable that operates as follows:

| | |
|---|---|
| True | Enumerates all family names in the FAMILY domain. |
| False | Enumerates all family names on the attached Volume Manager. |

Enumeration continues until there are no more families or the callback procedure returns zero.

*lpEnumProc* — Callback procedure.

*lpData* — Application specific data to be passed untouched to the callback procedure.

Callback Procedure

Invoke the callback as follows:

```
int FAR PASCAL EnumProc(
        LPVOID          lpData,
        LPCSTR          lpszFamily );
```

*lpData* — Callback parameter specified on VM_EnumFamilies call.

*lpszFamily* — Family name.

EnumProc is a placeholder for the application-supplied procedure name. The actual name must be exported by including it in an EXPORTS statement in the application's module definition file.

Return Values

VM_OK
VM_NOT_ATTACHED
VM_NETWORK_ERROR

Related Functions

VM_FamCreate
VM_FamDelete
VM_FamRename

---

VM_EnumVolumes

Lists volume names on all servers in the system by invoking a callback procedure for each volume.

Include Files

```
#include "vmlib.h"
```

Syntax

```
int WINAPI VM_EnumVolumes(
    BOOL        bAllServers,
    FARPROC     lpEnumProc,
    LPVOID      lpData );
```

Parameters

*bAllServers* — Boolean variable that operates as follows:

| | |
|---|---|
| True | Enumerates all volume names in the VOLUME domain. |
| False | Enumerates all volume names on the attached Volume Manager. |

Enumeration continues until there are no more volumes or the callback procedure returns zero.

*lpEnumProc* — Callback procedure.

*lpData* — Application specific data to be passed untouched to the callback procedure.

Callback Procedure

Invoke the callback as follows:

```
int FAR PASCAL EnumProc(
    LPVOID      lpData,
    LPCSTR      lpszVolume );
```

*lpData* — Callback parameter specified in VM_EnumVolumes.

*lpszVolume* Volume name.

EnumProc is a placeholder for the application-supplied procedure name. The actual name must be exported by including it in an EXPORTS statement in the application's module definition file.

Return Values
VM_OK
VM_NOT_ATTACHED
VM_NETWORK_ERROR

Related Functions
VM_VolCreate
VM_VolDelete

---

VM_EnumVolMgrs

Lists the names of all the Volume Managers in the system.

Include Files
#include "vmlib.h"

Syntax
```
int WINAPI VM_EnumVolMgrs(
    FARPROC     lpEnumProc,
    LPVOID      lpData );
```

Parameters

*lpEnumProc* Callback procedure.

*lpData* Application specific data to be passed untouched to the callback procedure.

Callback Procedure

VM_EnumVolMgrs enumerates Volume Manager names in the system by invoking a callback procedure for each Volume Manager. It uses the Domain Server to enumerate all Volume Manager names in the VOLMGR domain. Enumeration continues until there are no more Volume Managers or the callback procedure returns zero.

Invoke the callback as follows:

```
int FAR PASCAL EnumProc(
    LPVOID      lpData,
    LPCSTR      lpszVolMgr );
```

*lpData* Callback parameter specified in VM_EnumVolMgrs.

*lpszVolMgr* Volume Manager name.

EnumProc is a placeholder for the application-supplied procedure name. The actual name must be exported by including it in an EXPORTS statement in the application's module definition file.

Return Values
VM_OK
VM_NETWORK_ERROR

Related Functions
VM_Attach
VM_Detach

---

VM_FamCreate

Creates a family on the attached Volume Manager.

Include Files
#include "vmlib.h"

Syntax
```
int WINAPI VM_FamCreate(
    LPCSTR          lpszFamName );
```

Parameters
*lpszFamName* Family name to be assigned to the newly created family.

Return Values
VM_OK
VM_NOT_ATTACHED
VM_DUPLICATE_FAMNAME
VM_NETWORK_ERROR

Related Functions
VM_FamDelete

---

VM_FamDelete

Deletes a family on the attached Volume Manager.

Include Files
#include "vmlib.h"

Syntax
```
int WINAPI VM_FamDelete(
    LPCSTR          lpszFamName );
```

Parameters
*lpszFamName* Name of the family to be deleted.

Return Values
VM_OK
VM_NO_SUCH_FAMILY
VM_NOT_ATTACHED
VM_NETWORK_ERROR

Related Functions
VM_FamCreate

---------

VM_FamRename

Renames a family on the attached Volume Manager.

Include Files

```
#include "vmlib.h"
```

Syntax

```
int WINAPI VM_FamRename(
    LPCSTR          lpszOldFamName,
    LPCSTR          lpszNewFamName );
```

Parameters

| | |
|---|---|
| *lpszOldFamName* | Current name of the family to be renamed. |
| *lpszNewFamName* | New name to be assigned to the renamed family. |

Return Values
VM_OK
VM_NOT_ATTACHED
VM_NO_SUCH_FAMILY
VM_DUPLICATE_FAMNAME
VM_NETWORK_ERROR Related Functions
VM_FamCreate
VM_FamDelete
VM_EnumFamilies

---------

VM_GetErrorText

Retrieves the error text associated with a specified error code and returns it to the caller.

Include Files

```
#include "vmlib.h"
```

Syntax

```
int WINAPI VM_GetErrorText(
```

```
int nErrorCode,
LPSTR           lpszErrorText,
int cbErrorText );
```

Parameters

| | |
|---|---|
| *nErrorCode* | Error code number. |
| *lpszErrorText* | Name of the error text buffer. |
| *cbErrorText* | Size of the error text buffer. |

Return Values
VM_OK

---

VM_Initialize

Initializes the VMLIB module.

Include Files
#include "vmlib.h"

Syntax
int WINAPI VM_Initialize(void);

Parameters
None.

Usage Notes
The system maintains a count of the number of times a Volume Manager is initialized. VM_Terminate must be called the same number of times to terminate the Volume Manager.

Return Values
VM_OK
VM_NETWORK_ERROR

Related Functions
VM_RestoreVolumes

---

VM_JournalGetLabel

Obtains the journal label from the first media in a journal set, and returns the label to the caller.

Include Files
#include "vmlib.h"

Syntax

```
int WINAPI VM_JournalGetLabel(
    LPVM_DEVSPEC          lpDeviceSpec,
    LPVM_JOURNALLABEL     lpJournalLabel );
```

Parameters

*lpDeviceSpec* Backup devices containing the media in the journal set.

*lpJournalLabel* Pointer to journal label.

Usage Notes

Gets the label off the first media in the specified journal set. The journal label identifies the start time of the journal set. The media constituting the journal set are assumed to be loaded in the devices specified in lpDeviceSpec, in the proper order. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                   *devices*/
} VM_DEVSPEC, FAR *LPVM_DEVSPEC;

typedef struct {
  DWORD dwJournalTime;            /*Time of start of journal*/
  BYTE nSerialNo;             /*Serial Number of backup device in
                   *group*/
} VM_JOURNALLABEL, FAR *LPVM_JOURNALLABEL;
```

Return Values

VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_END_OF_DEVICE_GROUP
VM_UNKNOWN

Related Functions

VM_ReplayJournal

---------

VM_ObjAddReference

Adds a reference to the object associated with a specified object handle.

Include Files

#include "vmlib.h"

Syntax

```
int WINAPI VM_ObjAddReference(
```

LPVM_OBJHANDLE lpObjHandle );

Parameters

*lpObjHandle* Pointer to an object handle.

Usage Notes

This function increments the object's reference count by one. See VM_ObjDelete for information on deleting the object.

Structures

```
typedef char VM_OBJHANDLE[L_OBJHANDLE], FAR *LPVM_OBJHANDLE;
```

Return Values

VM_OK
VM_NO_SUCH_VOLUME
VM_NO_SUCH_OBJECT
VM_NO_SUCH_VOLMGR
VM_NETWORK_ERROR

Related Functions

VM_ObjRemReference
VM_ObjDelete

---------

VM_ObjCheckIn

Checks in the object associated with a specified object handle.

Include Files

#include "vmlib.h"

Syntax

```
int WINAPI VM_ObjCheckIn(
    LPVM_OBJHANDLE      lpObjHandle,
    BOOL                bCommit );
```

Parameters

*lpObjHandle* Pointer to an object handle.

*bCommit* Commits changes to an object as follows:

| | |
|---|---|
| True (non-zero) | Object Manager applies pending changes to the object and creates a new revision. |
| False(zero) | Object Manager discards pending changes to the object. |

Structures

```
typedef char VM_OBJHANDLE[L_OBJHANDLE], FAR *LPVM_OBJHANDLE;
```

Return Values

VM_OK

VM_NO_SUCH_VOLUME
VM_NO_SUCH_OBJECT
VM_NO_SUCH_VOLMGR
VM_NOT_CHECKED_OUT
VM_NETWORK_ERROR

Related Functions
VM_ObjCheckOut
VM_EnumBackups
VM_BackupChange

----------

VM_ObjCheckOut

Checks out the object associated with a specified object handle.

Include Files

```
#include "vmlib.h"
```

Syntax

```
int WINAPI VM_ObjCheckOut(LPVM_OBJHANDLE lpObjHandle);
```

Parameters

*lpObjHandle* Pointer to an object handle.

Structures

```
typedef char VM_OBJHANDLE[L_OBJHANDLE], FAR *LPVM_OBJHANDLE;
```

Return Values
VM_OK
VM_NO_SUCH_VOLUME
VM_NO_SUCH_OBJECT
VM_NO_PERMISSION
VM_CHECKED_OUT
VM_NO_SUCH_VOLMGR
VM_NETWORK_ERROR Related Functions
VM_ObjCheckIn
VM_EnumBackups

---

VM_ObjClose

Closes an object datafile.

Include Files

#include "vmlib.h"

Syntax

```
int WINAPI VM_ObjClose(int nHandle);
```

Parameters

*nHandle* Handle referring to an open object datafile.

Return Values

VM_OK
VM_BAD_FILE
VM_NETWORK_ERROR

Related Functions

VM_ObjOpen
VM_ObjCreate

---

VM_ObjCreate

Creates an object on the specified volume/family, and returns a handle to the created object.

Include Files

#include "vmlib.h"

Syntax

```
int WINAPI VM_ObjCreate(
    LPCSTR           lpszName,
    WORD             wType,
    BOOL             bIgnoreRedZone,
    LPVM_OBJATTR     lpObjAttr,
    LPVM_OBJHANDLE   lpObjHandle );
```

Parameters

*lpszName* Volume or family name.

*wType* Type of name specified by lpszName. Valid options are:

VM_VOLUME
VM_FAMILY

*bIgnoreRedZone* Flag indicating that the object can be created on the red zone of the platter.

*lpObjAttr* Pointer to the object attributes structure.

*lpObjHandle* Pointer to the caller area to receive the object handle.

Structures

```
typedef struct {
  char szFilename[L_FILENAME+1]; /*RW - original filename for object*/
  WORD wObjType;          /*RW - object type*/
  WORD wObjFlags;         /*RW - object flags*/
  DWORD dwObjSize;         /*R  - object size (in bytes)*/
  DWORD dwPrimaryBlocks;      /*R  - allocated blocks (primary zone)*/
  DWORD dwOverflowBlocks;      /*R  - allocated blocks (overflow zone)*/
  WORD wDirNumber;         /*R  - directory number*/
  WORD wFileNumber;        /*R  - file number*/
  WORD wRefCount;         /*R  - reference count*/
  WORD wRevLevel;         /*R  - revision level*/
  DWORD dwTimeStamp;        /*R  - creation date & time*/
  WORD wCreatorUIC;        /*R  - creator UIC (writer of object)*/
  WORD wOwnerUIC;         /*R  - owner UIC (checker of object*/
  WORD wSecurity;         /*RW - security level of object*/
  WORD wUserData;         /*RW - user data field*/
  BYTE nCompression;       /*RW - compression type field*/
  BYTE nEncryption;        /*RW - encryption type field*/
  VM_ACL acl;           /*RW - access control list*/
} VM_OBJATTR, FAR *LPVM_OBJATTR;

typedef char VM_OBJHANDLE[L_OBJHANDLE], FAR *LPVM_OBJHANDLE;
```

Return Values

If successful, Object Manager creates an object and returns a non-negative handle to the object datafile. This handle is used on subsequent calls to VM_ObjWrite and VM_ObjClose. The following return values indicate failure.

VM_NO_SUCH_FAMILY
VM_NO_SUCH_VOLUME
VM_NO_SUCH_VOLMGR
VM_NO_MORE_FILES
VM_NO_PERMISSION
VM_VOLUME_FULL
VM_BAD_PATH
VM_NETWORK_ERROR

Related Functions

VM_ObjClose
VM_ObjDelete

---

VM_ObjDelete

Decreases the reference count for an object specified by an object handle and deletes the object when the count reaches zero.

Include Files

#include "vmlib.h"

Syntax

```
int WINAPI VM_ObjDelete(LPVM_OBJHANDLE lpObjHandle);
```

Parameters

*lpObjHandle* Pointer to an object handle.

Structures

```
typedef char VM_OBJHANDLE[L_OBJHANDLE], FAR *LPVM_OBJHANDLE;
```

Return Values

VM_OK
VM_NO_SUCH_VOLUME
VM_NO_SUCH_OBJECT
VM_NO_PERMISSION
VM_CHECKED_OUT
VM_NO_SUCH_VOLMGR
VM_BAD_PATH
VM_NETWORK_ERROR

Related Functions

VM_ObjCreate
VM_ObjClose

---

VM_ObjGetAttr

Retrieves the object attributes associated with a specified object handle.

Include Files

```
#include "vmlib.h"
```

Syntax

```
int WINAPI VM_ObjGetAttr(
    LPVM_OBJHANDLE        lpObjHandle,
    LPVM_OBJATTR  lpObjAttr );
```

Parameters

*lpObjHandle* Pointer to an object handle.

*lpObjAttr* Pointer to a caller area to receive the object attributes. Members of this structure are aligned on byte boundaries.

Structures

```
typedef char VM_OBJHANDLE[L_OBJHANDLE], FAR *LPVM_OBJHANDLE;

typedef struct {
  char szFilename[L_FILENAME+1]; /*RW - original filename for object*/
  WORD wObjType;             /*RW - object type*/
  WORD wObjFlags;            /*RW - object flags*/
  DWORD dwObjSize;           /*R  - object size (in bytes)*/
  DWORD dwPrimaryBlocks;     /*R  - allocated blocks (primary zone)*/
  DWORD dwOverflowBlocks;    /*R  - allocated blocks (overflow zone)*/
  WORD wDirNumber;           /*R  - directory number*/
  WORD wFileNumber;          /*R  - file number*/
  WORD wRefCount;            /*R  - reference count*/
  WORD wRevLevel;            /*R  - revision level*/
  DWORD dwTimeStamp;         /*R  - creation date & time*/
  WORD wCreatorUIC;          /*R  - creator UIC (writer of object)*/
  WORD wOwnerUIC;            /*R  - owner UIC (checker of object*/
  WORD wSecurity;            /*RW - security level of object*/
  WORD wUserData;            /*RW - user data field*/
  BYTE nCompression;         /*RW - compression type field*/
  BYTE nEncryption;          /*RW - encryption type field*/
  VM_ACL acl;                /*RW - access control list*/
} VM_OBJATTR, FAR *LPVM_OBJATTR;
```

Return Values

VM_OK
VM_NO_SUCH_VOLUME
VM_NO_SUCH_OBJECT
VM_NO_SUCH_VOLMGR
VM_NETWORK_ERROR

Related Functions

VM_ObjSetAttr

---------

VM_ObjGetType

Retrieves the object type associated with a specified object handle.

Include Files

```
#include "vmlib.h"
```

Syntax

```
int WINAPI VM_ObjGetType(
    LPVM_OBJHANDLE        lpObjHandle,
    LPWORD         lpwObjType );
```

Parameters

*lpObjHandle* Pointer to an object handle.

*lpwObjType* Pointer to a caller area to receive the object type.

Structures

```
typedef char VM_OBJHANDLE[L_OBJHANDLE], FAR *LPVM_OBJHANDLE;
```

Return Values
VM_OK
VM_NO_SUCH_VOLUME
VM_NO_SUCH_OBJECT
VM_NO_SUCH_VOLMGR
VM_NETWORK_ERROR

---------

VM_ObjGetVolName

Retrieves the volume name associated with a specified object handle.

Include Files

```
#include "vmlib.h"
```

Syntax

```
int WINAPI VM_ObjGetVolName(
    LPVM_OBJHANDLE          lpObjHandle,
    LPSTR                   lpszVolName );
```

Parameters

*lpObjHandle* Pointer to an object handle.

*lpszVolName* Pointer to a caller area to receive the volume name.

Structures

```
typedef char VM_OBJHANDLE[L_OBJHANDLE], FAR *LPVM_OBJHANDLE;
```

Return Values
VM_OK
VM_NO_SUCH_VOLUME
VM_NO_SUCH_OBJECT
VM_NO_SUCH_VOLMGR
VM_NETWORK_ERROR

---------

VM_ObjOpen

Opens an object specified by an object handle and prepares the object datafile for subsequent reading or writing. If the open is successful, the current object attributes are returned to the caller.

Include Files

```
#include "vmlib.h"
```

Syntax

```
int WINAPI VM_ObjOpen(
    LPVM_OBJHANDLE          lpObjHandle,
    char                    cMode,
    LPVM_OBJATTR    lpObjAttr );
```

Parameters

| | |
|---|---|
| *lpObjHandle* | Pointer to an object handle. |
| *cMode* | File access mode. The cMode argument indicates the access mode to be used and can either be R for read access or W for write access. |
| *lpObjAttr* | Pointer to object attributes structure. |

Usage Notes

When Object Manager opens an object with write access, it creates an empty object. All writes are made to this object, and its size is adjusted as needed to accommodate the amount of data that is written.

Structures

```
typedef char VM_OBJHANDLE[L_OBJHANDLE], FAR *LPVM_OBJHANDLE;

typedef struct {
  char szFilename[L_FILENAME+1]; /*RW - original filename for object*/
  WORD wObjType;          /*RW - object type*/
  WORD wObjFlags;         /*RW - object flags*/
  DWORD dwObjSize;        /*R  - object size (in bytes)*/
  DWORD dwPrimaryBlocks;  /*R  - allocated blocks (primary zone)*/
  DWORD dwOverflowBlocks; /*R  - allocated blocks (overflow zone)*/
  WORD wDirNumber;        /*R  - directory number*/
  WORD wFileNumber;       /*R  - file number*/
  WORD wRefCount;         /*R  - reference count*/
  WORD wRevLevel;         /*R  - revision level*/
  DWORD dwTimeStamp;      /*R  - creation date & time*/
  WORD wCreatorUIC;       /*R  - creator UIC (writer of object)*/
  WORD wOwnerUIC;         /*R  - owner UIC (checker of object*/
  WORD wSecurity;         /*RW - security level of object*/
  WORD wUserData;         /*RW - user data field*/
  BYTE nCompression;      /*RW - compression type field*/
  BYTE nEncryption;       /*RW - encryption type field*/
  VM_ACL acl;             /*RW - access control list*/
} VM_OBJATTR, FAR *LPVM_OBJATTR;
```

Return Values

If successful, Object Manager creates an object and returns a non-negative handle to the object datafile. This handle is used on subsequent calls to VM_ObjRead, VM_ObjWrite, VM_ObjSeek and VM_ObjClose. The following return values indicate failure.

VM_NO_SUCH_VOLUME
VM_NO_SUCH_VOLMGR
VM_NO_MORE_FILES
VM_NO_PERMISSION
VM_CHECKED_OUT
VM_BAD_PATH
VM_INVALID_ARG
VM_NETWORK_ERROR

Related Functions

VM_ObjClose

---

VM_ObjRead

Reads data from an object datafile.

Include Files

```
#include "vmlib.h"
```

Syntax

```
int WINAPI VM_ObjRead(
    int nHandle,
    LPVOID        lpBuffer,
    int nCount );
```

Parameters

*nHandle* Handle referring to an open object datafile.

*lpBuffer* Pointer to buffer to receive data.

*nCount* Maximum number of bytes.

Usage Notes

Attempts to read nCount bytes into lpBuffer from the object datafile associated with nHandle. The read operation begins at the current position in the object datafile. After the read operation, the file pointer points to the next unread byte.

Return Values

If successful, Object Manager read data from the file and returned the number of bytes actually read. A return value of 0 indicates end-of-file. The following return values indicate failure.

VM_BAD_FILE
VM_INVALID_ARG
VM_NETWORK_ERROR

Related Functions

VM_ObjWrite

---

VM_ObjRemReference

Removes a reference to the object associated with a specified object handle.

Include Files

```
#include "vmlib.h"
```

Syntax

```
int WINAPI VM_ObjRemReference(LPVM_OBJHANDLE lpObjHandle);
```

Parameters

| | |
|---|---|
| *lpObjHandle* | Pointer to an object handle. |

Usage Notes

This function decrements the object's reference count by one. See VM_ObjDelete for information on deleting the object.

Structures

```
typedef char VM_OBJHANDLE[L_OBJHANDLE], FAR *LPVM_OBJHANDLE;
```

Return Values

VM_OK
VM_OUT_OF_RESOURCE

Related Functions

VM_JournalGetLabel
VM_ObjDelete

---

VM_ObjSeek

Seeks to a particular byte of an object datafile.

Include Files

```
#include "vmlib.h"
```

Syntax

```
long WINAPI VM_ObjSeek(
    int nHandle,
    long        lOffset,
    int nOrigin );
```

Parameters

| | |
|---|---|
| *nHandle* | Handle referring to an open object datafile. |
| *lOffset* | Number of bytes from origin. |
| *nOrigin* | Initial position. |

Usage Notes

Moves the object datafile pointer associated with nHandle to a new location that is nOffset bytes from nOrigin. The next operation on the datafile occurs at the new location. The nOrigin argument must be one of the following constants, which are defined in stdio.h.

| | |
|---|---|
| SEEK_SET | Beginning of object datafile. |
| SEEK_CUR | Current position of object datafile pointer. |
| SEEK_END | End of object datafile. |

Return Values

If successful, Object Manager returns the offset, in bytes, of the new position from the beginning of the object datafile. The following return values indicate failure.

VM_BAD_FILE
VM_INVALID_ARG
VM_NETWORK_ERROR

---------

VM_ObjSetAttr

Sets the attributes associated with a specified object handle.

Include Files

#include "vmlib.h"

Syntax

```
int WINAPI VM_ObjSetAttr(
    LPVM_OBJHANDLE        lpObjHandle,
    LPVM_OBJATTR  lpObjAttr );
```

Parameters

*lpObjHandle* Pointer to an object handle.

*lpObjAttr* Pointer to a structure containing object attributes.

Structures

```
typedef char VM_OBJHANDLE[L_OBJHANDLE], FAR *LPVM_OBJHANDLE;

typedef struct {
  char szFilename[L_FILENAME+1]; /*RW - original filename for object*/
  WORD wObjType;          /*RW - object type*/
  WORD wObjFlags;         /*RW - object flags*/
  DWORD dwObjSize;          /*R - object size (in bytes)*/
  DWORD dwPrimaryBlocks;      /*R - allocated blocks (primary zone)*/
  DWORD dwOverflowBlocks;      /*R - allocated blocks (overflow zone)*/
  WORD wDirNumber;          /*R - directory number*/
  WORD wFileNumber;         /*R - file number*/
  WORD wRefCount;          /*R - reference count*/
  WORD wRevLevel;          /*R - revision level*/
  DWORD dwTimeStamp;         /*R - creation date & time*/
  WORD wCreatorUIC;         /*R - creator UIC (writer of object)*/
  WORD wOwnerUIC;          /*R - owner UIC (checker of object*/
  WORD wSecurity;         /*RW - security level of object*/
  WORD wUserData;          /*RW - user data field*/
  BYTE nCompression;        /*RW - compression type field*/
  BYTE nEncryption;        /*RW - encryption type field*/
  VM_ACL acl;          /*RW - access control list*/
} VM_OBJATTR, FAR *LPVM_OBJATTR;
```

Return Values

VM_OK
VM_NO_SUCH_VOLUME
VM_NO_SUCH_OBJECT
VM_NO_SUCH_VOLMGR
VM_NO_PERMISSION

VM_NETWORK_ERROR

Related Functions
VM_ObjGetAttr

---

VM_ObjStartCache

Initiates a fetch of an object into the read cache of the object's Volume Manager.

Include Files

#include "vmlib.h"

Syntax

```
int WINAPI VM_ObjStartCache(
    LPVM_OBJHANDLE                    lpObjHandle );
```

Parameters

*lpObjHandle* Pointer to object handle.

Usage Notes

Issues a request to the cache reader subtask of the object's Volume Manager to fetch the object into the read cache. The function however does not wait until the object is fetched. The caller must have access rights to the object to use this function, if Security Services are enabled.

Structures

```
typedef char VM_OBJHANDLE[L_OBJHANDLE], FAR *LPVM_OBJHANDLE;
```

Return Values

VM_OK
VM_NO_SUCH_VOLMGR
VM_NETWORK_ERROR
VM_NOT_LOGGED_ON
VM_NO_PERMISSION
VM_NO_SUCH_VOLUME
VM_VOLUME_BUSY
VM_ILLEGAL_OPERATION
VM_NO_SUCH_OBJECT
VM_CHECKED_OUT
VM_UNKNOWN

Related Functions

VM_ObjStopCache

---

VM_ObjStopCache

Cancels the fetch of an object into the read cache of the object's Volume Manager.

Include Files

```
#include "vmlib.h"
```

Syntax

```
int WINAPI VM_ObjStopCache(
    LPVM_OBJHANDLE                  lpObjHandle );
```

Parameters

*lpObjHandle* Pointer to object handle.

Usage Notes

Removes the object's prefetch request, if the request is pending. The request should have been issued by the function VM_ObjStartCache. The function does not return an error if the object is already prefetched. The caller must have access rights to the object to use this function, if Security Services are enabled.

Structures

```
typedef char VM_OBJHANDLE[L_OBJHANDLE], FAR *LPVM_OBJHANDLE;
```

Return Values

VM_OK
VM_NO_SUCH_VOLMGR
VM_NETWORK_ERROR
VM_NOT_LOGGED_ON
VM_NO_PERMISSION
VM_NO_SUCH_VOLUME
VM_VOLUME_BUSY
VM_ILLEGAL_OPERATION
VM_NO_SUCH_OBJECT
VM_UNKNOWN

Related Functions

VM_ObjStartCache

---

VM_ObjSwap

Swaps two objects.

Include Files

```
#include "vmlib.h"
```

Syntax

```
int WINAPI VM_ObjSwap(
    LPVM_OBJHANDLE                  lpObjHandle1,
    LPVM_OBJHANDLE                  lpObjHandle2 );
```

Parameters

*lpObjHandle1* Pointer to object handle #1.

*lpObjHandle2* Pointer to object handle #2.

Structures

```
typedef char VM_OBJHANDLE[L_OBJHANDLE], FAR *LPVM_OBJHANDLE;
```

Return Values

VM_OK
VM_NO_SUCH_VOLUME
VM_NO_SUCH_VOLMGR
VM_NO_PERMISSION
VM_NETWORK_ERROR

---

VM_ObjWrite

Writes to an object datafile.

Include Files

```
#include "vmlib.h"
```

Syntax

```
int WINAPI VM_ObjWrite(
    int nHandle,
    LPVOID          lpBuffer,
    int nCount );
```

Parameters

| | |
|---|---|
| *nHandle* | Handle returned from VM_ObjOpen. |
| *lpBuffer* | Pointer to buffer containing data to be written. |
| *nCount* | Number of bytes. |

Usage Notes

The write operation begins at the current position in the object datafile. After the write operation, the file pointer is increased by the number of bytes actually written.

Writes must occur in sequential order. Using VM_ObjSeek with VM_ObjWrite will yield unpredictable results.

Return Values

If successful, Object Manager returns the number of bytes actually written. The following return values indicate failure.

VM_BAD_FILE
VM_VOLUME_FULL
VM_INVALID_ARG
VM_NETWORK_ERROR

Related Functions

VM_ObjRead
VM_ObjOpen

VM_ReplayJournal

Replays a journal set.

Include Files

```
#include "vmlib.h"
```

Syntax

```
int WINAPI VM_ReplayJournal(
    LPVM_DEVSPEC  lpDeviceSpec,
    DWORD         dwStartTime,
    DWORD         dwStopTime,
    BYTE          nReplayMode,
    BOOL          bContinue );
```

Parameters

| | |
|---|---|
| *lpDeviceSpec* | Pointer to backup devices containing the media in the journal set. |
| *dwStartTime* | Start time of desired transactions. |
| *dwStopTime* | Stop time of desired transactions. |
| *nReplayMode* | Indicates type of desired transactions. |
| *bContinue* | Indicates if the replay be continued or aborted. |

Usage Notes

Replays desired transactions in the specified journal set. The media constituting the journal set are assumed to be loaded in the devices specified in lpDeviceSpec, in the proper order. All transactions before and after the specified start and stop times are ignored. The replay mode is an ORed specification of the flags VM_J_VOLUME, VM_J_CACHE, VM_J_WIP, and VM_J_DB which respectively select transactions applying to entire volumes, the cache, the Work In Progress area, and the database. If the replay is interrupted due to exhaustion of all specified devices in the journal set, the function returns the status code VM_END_OF_DEVICE_GROUP. The replay can be aborted by setting the bContinue argument to FALSE in a subsequent call to this function, or resumed after replacing media in the devices by setting the argument to TRUE. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                                    *devices*/
} VM_DEVSPEC, FAR *LPVM_DEVSPEC;
```

Return Values
VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_END_OF_DEVICE_GROUP
VM_RESTORE_STOPPED
VM_UNKNOWN Related Functions
VM_JournalGetLabel

---------

VM_RestoreVolumes

Restores one or more volumes backed up on a backup set.

Include Files

```
#include "vmlib.h"
```

Syntax

```
int WINAPI VM_RestoreVolumes(
    LPVM_DEVSPEC            lpDeviceSpec,
    LPVM_BACKUPVOLSPEC      lpBackupVolSpec,
    BOOL                    bContinue );
```

Parameters

*lpDeviceSpec* Pointer to backup devices containing the media in the backup set.

*lpBackupVolSpec* Pointer to volumes to be restored.

*bContinue* Indicates if the restore should be aborted.

Usage Notes

Restores the desired volumes in the specified backup set. The media constituting the backup set are assumed to be loaded in the devices specified in lpDeviceSpec, in the proper order. If the restore is interrupted due to exhaustion of all specified devices in the backup set, the function returns the status code VM_END_OF_DEVICE_GROUP. The restore can be aborted by setting the bContinue argument to FALSE in a subsequent call to this function, or resumed after replacing media in the devices by setting the argument to TRUE. If a volume to be restored already exists in the Volume Manager, missing revisions of objects are restored from the backup set. If a non-identical volume with the same name exists in the Volume Manager, the function returns an error. The caller must have administrator access rights to use the function, if Security Services are enabled.

Structures

```
typedef struct {
  DWORD dwBackupDevices;          /*Number of backup devices*/
  char **lplpszBackupDevices;     /*Pointer to an array of backup
                                  *devices*/
} VM DEVSPEC, FAR *LPVM_DEVSPEC;

typedef struct {
  DWORD dwVolumes;                /*Number of Volumes to backup*/
  char **lplpszVolumes;           /*Pointer to an array of volumes
                                  *to backup*/
} VM_BACKUPVOLSPEC, FAR *LPVM_BACKUPVOLSPEC;
```

----------

Return Values
VM_OK
VM_NOT_INITIALIZED
VM_NOT_ATTACHED
VM_MEM_ALLOCATION_ERR
VM_NETWORK_ERROR
VM_NOT_LOGGED_ON
VM_NO_PERMISSION
VM_VOLUME_BUSY
VM_BAD_VOLUME
VM_NOT_RESTORED
VM_OUT_OF_RESOURCE
VM_MAIN_FAILURE
VM_MIRROR_FAILURE
VM_INVALID_RESTORE_ARGS
VM_END_OF_DEVICE_GROUP
VM_RESTORE_STOPPED
VM_UNKNOWN Related Functions
VM_BackupGetLabel
VM_BackupEnumVolumes
VM_BackupEnumVolObjects
VM_BackupVolGetAttr
VM_BackupObjGetAttr

----------

VM_Terminate

Terminates the VMLIB module.

Include Files
#include "vmlib.h"

Syntax
int WINAPI VM_Terminate(void);

Parameters
None.

Usage Notes
This is the converse of the VM_Initialize function.

Return Values
VM_OK

Related Functions
VM_Initialize

----------

VM_VolCreate

Creates a volume on the attached Volume Manager.

Include Files
#include "vmlib.h"

Syntax
```
int WINAPI VM_VolCreate(
    LPCSTR          lpszVolName,
    LPVM_VOLATTR lpVolAttr );
```

Parameters

*lpszVolName* Volume name.

*lpVolAttr* Pointer to volume attributes structure.

Structures
```
typedef struct {
  char szFamName[L_FAMNAME+1];     /*R - associated family name*/
  char szVolPath[L_VOLPATH+1];     /*R - full path of volume*/
  char szMirrorVolPath[L_VOLPATH+1]; /*R - full path of mirror volume*/
  WORD wVolType;                   /*R - volume type*/
  WORD wVolState;                  /*RW - volume state (online/offline)*/
  WORD wVolFlags;                  /*RW - volume flags*/
  DWORD dwObjectCount;             /*R - total number of objects*/
  DWORD dwExportSize;              /*R - allocated size (in KB)
                 *of export zone*/
  DWORD dwExportFree;              /*R - available size (in KB)
                 *of export zone*/
  DWORD dwPrimarySize;             /*R - allocated size (in KB)
                 *of primary zone*/
  DWORD dwPrimaryFree;             /*R - available size (in KB)
                 *of primary zone*/
  DWORD dwOverflowSize;            /*R - allocated size (in KB)
                 *of overflow zone*/
  DWORD dwOverflowFree;            /*R - available size (in KB)
                 *of overflow zone*/
  VM_ACL acl;                      /*RW - access control list*/
} VM_VOLATTR, FAR *LPVM_VOLATTR;
```

Return Values
VM_OK
VM_NOT_ATTACHED
VM_DUPLICATE_VOLNAME

VM_INVALID_VOLPATH
VM_NETWORK_ERROR

Related Functions
VM_VolDelete

---------

VM_VolDelete

Deletes a volume on the attached Volume Manager.

Include Files

```
#include "vmlib.h"
```

Syntax

```
int WINAPI VM_VolDelete(
    LPCSTR          lpszVolName );
```

Parameters

*lpszVolName* Volume name.

Return Values

VM_OK
VM_NOT_ATTACHED
VM_NO_SUCH_VOLUME
VM_NETWORK_ERROR

Related Functions
VM_VolCreate

---------

VM_VolEnumObjects

Lists objects on a volume and invokes the specified callback procedure for each object.

Include Files

```
#include "vmlib.h"
```

Syntax

```
int WINAPI VM_VolEnumObjects(
    LPCSTR          lpszVolName,
    FARPROC         lpEnumProc,
    LPVOID          lpData );
```

Parameters

*lpszVolName* Volume name.

*lpEnumProc* Callback procedure.

*lpData* Callback parameter.

Callback Procedure

Invoke the callback as follows:

```
int FAR PASCAL EnumProc(
    LPVOID        lpData,
    DWORD         dwObjID );
```

*lpData* Callback parameter specified in VM_VolEnumObjects.

*dwObjID* Unique object identifier (the numeric portion of the object handle).

EnumProc is a placeholder for the application-supplied procedure name. The actual name must be exported by including it in an EXPORTS statement in the application's module definition file.

When VM_VolEnumObjects calls EnumProc, it passes only a portion of the object handle in dwObjID. To convert dwObjID into a full object handle, use the following function:

```
#include "vmlib.h"

/* Convert a volume name and object serial number into an object handle.
  Input: dwObjID - The Object's Serial number within a volume. lpszVolume - The name of the volume.
  Output: lpObjHandle - The object handle for use when calling other interfaces. */

/* Processing Example:
   An object on volume "NewVolume" with Serial number 14 (decimal) would have an object handle that
            looks like:
    "NewVolume..........0000000E"
   Where the periods (".") between "NewVolume" and "0000000E" are actually nulls. */

void MakeHandle(DWORD dwObjID, LPCSTR lpszVolume, LPVM_OBJHANDLE lpObjHandle)
{
 char szBuf[9];

 /* Clear out the object handle */
 memset(lpObjHandle, 0, L_OBJHANDLE);

 /* Convert the DWORD to a hex string. */
 sprintf(szBuf, "%08lx", dwObjID);
 /* Concat Volume name with... */
 strcpy(lpObjHandle, lpszVolume);

 /* Object Serial in hex. */
 memcpy(&lpObjHandle[L_VOLNAME], szBuf, 8);
};
```

Return Values

VM_OK
VM_NOT_ATTACHED
VM_NETWORK_ERROR

---

VM_VolExport

Exports a volume on the attached Volume Manager.

Include Files

```
#include "vmlib.h"
```

Syntax

```
int WINAPI VM_VolExport(
    LPCSTR            lpszVolName );
```

Parameters

*lpszVolName* Volume name.

Return Values

VM_OK
VM_NOT_ATTACHED
VM_NO_SUCH_VOLUME
VM_NETWORK_ERROR

Related Functions

VM_VolImport

---------

VM_VolGetAttr

Retrieves the attributes of a volume and returns them to the caller.

Include Files

```
#include "vmlib.h"
```

Syntax

```
int WINAPI VM_VolGetAttr(
    LPCSTR            lpszVolName,
    LPVM_VOLATTR lpVolAttr );
```

Parameters

*lpszVolName* Volume name.

*lpVolAttr* Pointer to the volume attributes structure.

Structures

```
typedef struct {
  char szFamName[L_FAMNAME+1];      /*R - associated family name*/
  char szVolPath[L_VOLPATH+1];      /*R - full path of volume*/
  char szMirrorVolPath[L_VOLPATH+1]; /*R - full path of mirror volume*/
  WORD wVolType;              /*R - volume type*/
  WORD wVolState;             /*RW - volume state (online/offline)*/
  WORD wVolFlags;             /*RW - volume flags*/
  DWORD dwObjectCount;        /*R - total number of objects*/
  DWORD dwExportSize;         /*R - allocated size (in KB)
              *of export zone*/
  DWORD dwExportFree;         /*R - available size (in KB)
              *of export zone*/
  DWORD dwPrimarySize;        /*R - allocated size (in KB)
              *of primary zone*/
  DWORD dwPrimaryFree;        /*R - available size (in KB)
              *of primary zone*/
  DWORD dwOverflowSize;       /*R - allocated size (in KB)
              *of overflow zone*/
  DWORD dwOverflowFree;       /*R - available size (in KB)
              *of overflow zone*/
  VM_ACL acl;                 /*RW - access control list*/
} VM_VOLATTR, FAR *LPVM_VOLATTR;
```

Return Values

VM_OK
VM_NOT_ATTACHED
VM_NO_SUCH_VOLUME
VM_NETWORK_ERROR

Related Functions

VM_VolSetAttr

---------

VM_VolGetState

Retrieves the current state of a volume and returns it to the caller.

Include Files

```
#include "vmlib.h"
```

Syntax

```
int WINAPI VM_VolGetState(
    LPCSTR      lpszVolName,
    LPWORD      lpwVolState );
```

Parameters

*lpszVolName* Volume name.

*lpwVolState* Pointer to caller area to receive current volume state.

Return Values

VM_OK
VM_NOT_ATTACHED
VM_NO_SUCH_VOLUME
VM_NETWORK_ERROR

Related Functions
VM_VolSetState

---------

VM_VolImport

Imports a volume on the attached Volume Manager.

Include Files

#include "vmlib.h"

Syntax

```
int WINAPI VM_VolImport(
    LPCSTR          lpszVolName,
    LPCSTR          lpszVolPath
    LPCSTR          lpszMirrorVolPath
    WORD            lpwVolFlags  );
```

Parameters

| | |
|---|---|
| *lpszVolName* | Volume name. |
| *lpszVolPath* | Main volume path. |
| *lpszMirrorVolPath* | Mirror volume path. |
| *lpwVolFlags* | Volume flags. |

Return Values

VM_OK
VM_NOT_ATTACHED
VM_DUPLICATE_VOLNAME
VM_INVALID_VOLPATH
VM_NETWORK_ERROR

Related Functions

VM_VolExport

---------

VM_VolSetAttr

Sets the attributes of a volume.

Include Files

#include "vmlib.h"

Syntax

```
int WINAPI VM_VolSetAttr(
    LPCSTR          lpszVolName,
    LPVM_VOLATTR lpVolAttr );
```

Parameters

*lpszVolName* Volume name.

*lpVolAttr* Pointer to volume attributes structure.

Structures

```
typedef struct {
  char szFamName[L_FAMNAME+1];    /*R - associated family name*/
  char szVolPath[L_VOLPATH+1];    /*R - full path of volume*/
  char szMirrorVolPath[L_VOLPATH+1]; /*R - full path of mirror volume*/
  WORD wVolType;              /*R - volume type*/
  WORD wVolState;             /*RW - volume state (online/offline)*/
  WORD wVolFlags;             /*RW - volume flags*/
  DWORD dwObjectCount;        /*R - total number of objects*/
  DWORD dwExportSize;         /*R - allocated size (in KB)
                    *of export zone*/
  DWORD dwExportFree;         /*R - available size (in KB)
                    *of export zone*/
  DWORD dwPrimarySize;        /*R - allocated size (in KB)
                    *of primary zone*/
  DWORD dwPrimaryFree;        /*R - available size (in KB)
                    *of primary zone*/
  DWORD dwOverflowSize;       /*R - allocated size (in KB)
                    *of overflow zone*/
  DWORD dwOverflowFree;       /*R - available size (in KB)
                    *of overflow zone*/
  VM_ACL acl;                 /*RW - access control list*/
} VM_VOLATTR, FAR *LPVM_VOLATTR;
```

Return Values

VM_OK
VM_NOT_ATTACHED
VM_NO_SUCH_VOLUME
VM_NETWORK_ERROR

Related Functions

VM_VolGetAttr

---------

VM_VolSetState

Sets the current state of a volume.

Include Files

```
#include "vmlib.h"
```

Syntax

```
int WINAPI VM_VolSetState(
    LPCSTR      lpszVolName,
    WORD        wVolState );
```

Parameters

*lpszVolName* Volume name.

*wVolState* Volume state.

Return Values

VM_OK
VM_NOT_ATTACHED
VM_NO_SUCH_VOLUME
VM_NETWORK_ERROR

Related Functions

VM_VolGetState

WORKSTATION MANAGER LIBRARY FUNCTIONS

The Workstation Manager Library (WMLIB) provides a set of functions that manage activities on workstations, e.g., 101. The set consists of the groups indicated in the following table:

- WM Library: Barcode Functions for recognizing barcodes using a barcode recognition engine.
- WM Library: Batch Functions for creating, deleting, and manipulating scanned batches.
- WM Library: Clean Functions for cleaning up images and objects.
- WM Library: Form Recognition Functions for recognizing forms.
- WM Library: ICR Functions for recognizing hand printed text using the intelligent character recognition (ICR) module.
- WM Library: Object Functions for creating, deleting, and manipulating objects.
- WM Library: OCR Functions for converting scanned images to editable text using the optical character recognition (OCR) module.
- WM Library: OMR Functions for recognizing check marks in boxes on forms.
- WM Library: Print Functions for printing files and objects.
- WM Library: Image Registration Functions for aligning a document with a predefined position to enhance the percentage of correct reads from ICR, OCR, and OMR.
- WM Library: Scan Functions for configuring and using scanners.
- WM Library: Security Functions for managing security specifically related to the Workstation Manager.
- WM Library: Template-Based Recognition Functions for performing a recognition operation, such as OCR or barcode, using templates that define recognition zones.
- WM Library: View Functions for displaying and viewing application-dependent objects.

WML: BARCODE FUNCTIONS

The barcode functions of in the Workstation Manager Library can be grouped by use as: general operations; working with pages, working with zones; and verifying results. The tables that follow list each of the barcode functions by group along with its description.

*General Operations*

| Function Name and Description |
|---|
| WML_BarCodeInit<br>Initializes the barcode module. |
| WML_BarCodeFree<br>Uninitializes the barcode module. |
| WML_BarCodePreferences<br>Displays a dialog box that allows the user to make changes to the barcode engine configuration. |
| WML_BarCodeGetErrorText<br>Returns a corresponding error string for the given error code. |

*Working with Pages*

| Function Name and Description |
|---|
| WML_BarCodeImage<br>Performs barcode recognition on an image file and returns one or more barcodes. |
| WML_BarCodeImageOne<br>Performs barcode recognition on an image file but returns only a single barcode. |

| | |
|---|---|
| WML_BarCodeObject<br>Performs barcode recognition on a Volume Manager object and returns one or more barcodes. | |
| WML_BarCodeObjectOne<br>Performs barcode recognition on a Volume Manager object but returns only a single barcode. | |

*Working with Zones*

| Function Name and Description |
|---|
| WML_BarCodeAddZone<br>Adds a zone to the barcode engine. |
| WML_BarCodeRecognize<br>Performs barcode recognition on an image using the current zone or zones. |
| WML_BarCodeRecognizeObject<br>Performs barcode recognition on a Volume Manager object using the current zone or zones. |
| WML_BarCodeClearZones<br>Clears all zones. |

*Verifying Results*

| Function Name and Description |
|---|
| WML_BarCodeGetResult<br>Gets the result for a zone. |
| WML_BarCodeGetZoneImage<br>Returns a bitmap copy of the area of an image file defined by the specified zone. |
| WML_BarCodeGetRectImage<br>Returns a bitmap copy of the area of an image file defined by the specified coordinates. |

*Technical Specifications*

WML_BarCodeAddZone

Adds a zone to the barcode engine.

Include Files

#include "wmbarcod.h"

Syntax

```
int WINAPI WML_BarCodeAddZone(
        UINT        nZoneNum,
        long        xOrig,
        long        yOrig,
        long        xWidth,
        long        yHeight,
        UINT        iTypes,
        UINT        iOrientation,
        UINT        iQuality,
        UINT        iCheckSum);
```

Parameters

| | |
|---|---|
| *nZoneNum* | Zone number. |
| *xOrig* | X origin of the zone. |
| *yOrig* | Y origin of the zone. |
| *xWidth* | Width of the zone. |
| *yHeight* | Height of the zone. |
| *iTypes* | Barcode type to look for. |
| *iOrientation* | Barcode orientation flag. |
| *iQuality* | Barcode quality flag. |
| *iCheckSum* | Barcode checksum flag. |

Usage Notes

To be independent of image resolution, the xOrig, yOrig, xWidth, and yHeight parameters must be in TWIPs(1 inch = 1440 TWIPs). If the values for xOrig, yOrig, xWidth, and yHeight are all zero, the zone is assumed to be the entire page.

The iTypes parameter can be any combination of the following:

| | |
|---|---|
| BARCODE_TYPE_CODE_3OF9 | Code 39 |
| BARCODE_TYPE_CODABAR | Codabar |
| BARCODE_TYPE_INTERLEAVED_2OF5 | Interleaved 2 of 5 |

| | |
|---|---|
| BARCODE_TYPE_AIRLINE_2OF5 | Airline 2 of 5 |
| BARCODE_TYPE_CODE_128 | Code 128 |
| BARCODE_TYPE_CODE_2OF5 | Code 2 of 5 |
| BARCODE_TYPE_CODE_93 | Code 93 |
| BARCODE_TYPE_UPC_A | UPC Version A |
| BARCODE_TYPE_UPC_E | UPC Version E |
| BARCODE_TYPE_EAN_13 | EAN-13 |
| BARCODE_TYPE_POSTNET | PostNet |

However, because the WMBARCOD library is a generic interface for various barcode recognition packages, the types of barcodes that the engine will actually search for depends on the capabilities of the barcode recognition engine.

The iOrientation parameter can be any of the following:

| | |
|---|---|
| BARCODE_ORIENT_HORIZONTAL | Horizontal |
| BARCODE_ORIENT_VERTICAL | Vertical |
| BARCODE_ORIENT_HORIZONTAL_VERTICAL | Horizontal/Vertical |
| BARCODE_ORIENT_HORIZONTAL_SKEW | Horizontal with skew |
| BARCODE_ORIENT_VERTICAL_SKEW | Vertical with skew |
| BARCODE_ORIENT_HORIZONTAL_VERTICAL_SKEW | Horizontal/Vertical with skew |

The iQuality parameter can be any of the following:

| | |
|---|---|
| BARCODE_QUAL_AUTO | Automatic |
| BARCODE_QUAL_EXCELLENT | Excellent |
| BARCODE_QUAL_GOOD | Good |
| BARCODE_QUAL_AVERAGE | Average |
| BARCODE_QUAL_POOR | Poor |
| BARCODE_QUAL_BAD | Bad |

The iCheckSum parameter instructs the barcode engine to use a checksum procedure to validate the results. However, not all barcode types include the ability to have a checksum.

Return Values

WM_SUCCESS
WM_ERR_BARCODE_NOT_INITIALIZED

Related Functions
WML_BarCodeClearZones

----------

WML_BarCodeClearZones
Clears all zones.

Include Files
#include "wmbarcod.h"

Syntax
int WINAPI WML_BarCodeClearZones(void);

Parameters
None.

Usage Notes
This call clears all zones from the barcode engine including any results.

Return Values
WM_SUCCESS
WM_ERR_BARCODE_NOT_INITIALIZED

Related Functions
WML_BarCodeAddZone

----------

WML_BarCodeFree
Uninitializes the barcode module.

Include Files
#include "wmbarcod.h"

Syntax
int WINAPI WML_BarCodeFree(void);

Parameters
None.

Return Values
WM_SUCCESS

Related Functions
WML_BarCodeInit

----------

WML_BarCodeGetErrorText

Returns a corresponding error string for the given error code.

Include Files

#include "wmbarcod.h"

Syntax

```
LPSTR WINAPI WML_BarCodeGetErrorText(
      int         nErrorCode,
      LPSTR       lpszErrorTextBuffer,
      int         cbErrorTextBuffer);
```

Parameters

| | |
|---|---|
| *nErrorCode* | Error code. |
| *lpszErrorTextBuffer* | Error text buffer. |
| *cbErrorTextBuffer* | Size of error text buffer. |

Usage Notes

This function will attempt to find a string associated with the passed *nErrorCode* parameter. The *nErrorCode* parameter should be an error code returned from the WML_Barcode functions.

Return Values

Returns the pointer to the passed error buffer, *lpszErrorTextBuffer*. The error buffer will be filled with the error string associated with the passed error code, *nErrorCode*. If the error string does not fit into the error buffer, the string will be truncated.

----------

WML_BarCodeGetRectImage

Returns a bitmap copy of the area of an image file defined by the specified coordinates.

Include Files

#include "wmbarcod.h"

Syntax

```
int WINAPI WML_BarCodeGetRectImage(
      LPCSTR          lpszImageFile,
      long            xOrig,
      long            yOrig,
      long            xWidth,
      long            yHeight,
      HBITMAP FAR *   lphDib);
```

Parameters

| | |
|---|---|
| *lpszImageFile* | Image file name. |
| *xOrig* | X origin of the zone. |
| *yOrig* | Y origin of the zone. |
| *xWidth* | Width of the zone. |
| *yHeight* | Height of the zone. |
| *lphDib* | Pointer to zone bitmap. |

Usage Notes

This function allows an application developer to retrieve a bitmap copy of a zone, so that it can be used for verification and other visual purposes.

To be independent of image resolution, the xOrig, yOrig, xWidth, and yHeight parameters must be in TWIPs (1 inch = 1440 TWIPs). If the values for xOrig, yOrig, xWidth, and yHeight are all zero, the zone is assumed to be the entire page. The *lphDib* parameter will return a device independent bitmap (DIB) that can be freed by using the Windows SDK *DeleteObject()* function.

Return Values

WM_SUCCESS
WM_ERR_BARCODE
WM_ERR_BARCODE_NOT_INITIALIZED
WM_ERR_INVALID_RESULT_BUFFER
WM_ERR_BAD_PARAMETER
WM_ERR_OUT_OF_MEMORY
WM_ERR_COULD_NOT_CREATE_BITMAP

Related Functions

WML_BarCodeGetZoneImage

---------

WML_BarCodeGetResult

Gets the result for a zone.

Include Files

#include "wmbarcod.h"

Syntax

```
int WINAPI WML_BarCodeGetResult(
      UINT        nZoneNum,
      LPSTR       lpszResultBuffer,
      UINT        cbResultBuffer,
      LPUINT      lpnConfidenceLevel);
```

Parameters

| | |
|---|---|
| *nZoneNum* | Zone number. |
| *lpszResultBuffer* | Pointer to result buffer. |

| | |
|---|---|
| *cbResultBuffer* | Size of result buffer. |
| *lpnConfidenceLevel* | Confidence level. |

Usage Notes

The results for a zone will be in a string format. If the zone does not have a result, the result buffer will contain an empty string.

Return Values

WM_SUCCESS
WM_ERR_BARCODE_NOT_INITIALIZED
WM_ERR_INVALID_RESULT_BUFFER
WM_ERR_NO_ZONES_WERE_FOUND
WM_ERR_ZONE_OUTOFRANGE

---------

WML_BarCodeGetZoneImage

Returns a bitmap copy of the area of an image file defined by the specified zone.

Include Files

#include "wmbarcod.h"

Syntax

```
int WINAPI WML_BarCodeGetZoneImage(
      UINT             nZoneNum,
      LPCSTR           lpszImageFile,
      HBITMAP FAR *    lphDib);
```

Parameters

| | |
|---|---|
| *nZoneNum* | Zone number. |
| *lpszImageFile* | Image file name. |
| *lphDib* | Pointer to zone bitmap. |

Usage Notes

This function allows an application developer to retrieve a bitmap copy of a zone, so that it can be used for verification and other visual purposes. The *lphDib* parameter will return a device independent bitmap (DIB) that can be freed by using the Windows SDK *DeleteObject()* function.

Return Values

WM_SUCCESS
WM_ERR_BARCODE_NOT_INITIALIZED
WM_ERR_INVALID_RESULT_BUFFER
WM_ERR_BAD_PARAMETER
WM_ERR_NO_ZONES_WERE_FOUND
WM_ERR_ZONE_OUTOFRANGE

Related Functions

WML_BarCodeGetRectImage

WML_BarCodeImage

Performs barcode recognition on an image file and returns one or more barcodes.

Include Files

#include "wmbarcod.h"

Syntax

```
int WINAPI WML_BarCodeImage(
      LPCSTR                        lpszImageFile,
      LPUINT                        lpuintNum,
      LPBARCODERESULTS FAR *        pBc     ;
```

Parameters

| | |
|---|---|
| *lpszImageFile* | Image file. |
| *lpuintNum* | Number of barcodes found. |
| *pBc* | Buffer for resulting output filename. |

Usage Notes

This function returns the number of barcodes found, and fills an array of BARCODERESULTS structures that are passed into the function.

Structures

The function will use the BARCODERESULTS structure to return information about the barcodes that were found on the page. The structure is shown below.

```
typedef struct _BARCODERESULTS
{
 int cbSize;   /* size of the BARCODERESULTS  structure */
 int iType;    /* type of barcode found */
 int iConfidence;                  /* confidence level for the barcode result */
 int iCheckSum;                    /* whether the found barcode had a checksum */
 ZONEAREA zoneArea;                /* the approximate position of found barcode */
 char szResult[512];;              /* the string value decoded from the barcode */
}BARCODERESULTS, FAR *LPBARCODERESULTS;
```

In the above example, ZONEAREA is defined as follows:

```
typedef struct _ZONEAREA
{
 long xOrig;                       /* x origin */
 long yOrig;                       /* y origin */
 long xWidth;                      /* width */
 long yHeight;                     /* height */
}ZONEAREA, far *LPZONEAREA;
```

On input, the lpuintNum parameter should be filled with the number of BARCODERESULTS structures contained in pBc. On output, the lpuintNum parameter will specify how many barcodes were found and fill the pBc array with these results. If there are more barcodes found than BARCODERESULTS structures passed, the function will merely fill as many array entries as possible in the pBc array and report how many barcodes were found in the lpuintNum parameter. If the lpuintNum is greater than it was on input, the user should take appropriate actions to recall the function with more BARCODERESULTS structures on input or ignore.

Return Values

WM_SUCCESS
WM_ERR_BARCODE
WM_ERR_BARCODE_NOT_INITIALIZED
WM_ERR_INVALID_RESULT_BUFFER
WM_ERR_BAD_PARAMETER
WM_ERR_NO_BARCODES_FOUND
WM_ERR_BUFFER_TOO_SMALL

Related Functions

WML_BarCodeImageOne
WML_BarCodeObject
WML_BarCodeObjectOne

----------

WML_BarCodeImageOne

Performs barcode recognition on an image file but returns only a single barcode.

Include Files

```
#include "wmbarcod.h"
```

Syntax

```
int WINAPI WML_BarCodeImageOne(
        LPCSTR        lpszImageFile,
        LPSTR         lpszResultBuffer,
        UINT          cbResultBuffer,
        LPUINT        lpnConfidenceLevel);
```

Parameters

| | |
|---|---|
| *lpszImageFile* | Image file. |
| *lpszResultBuffer* | Pointer to result buffer. |
| *cbResultBuffer* | Size of result buffer. |
| *lpnConfidenceLevel* | Confidence level. |

Usage Notes

This function returns the barcode string and confidence level for the results, or an error if no barcode is found.

Return Values

WM_SUCCESS
WM_ERR_BARCODE
WM_ERR_BARCODE_NOT_INITIALIZED
WM_ERR_INVALID_RESULT_BUFFER
WM_ERR_BAD_PARAMETER
WM_ERR_NO_BARCODES_FOUND
WM_ERR_BUFFER_TOO_SMALL

Related Functions
WML_BarCodeImage
WML_BarCodeObject
WML_BarCodeObjectOne

---

WML_BarCodeInit
Initializes the barcode module.

Include Files
#include "wmbarcod.h"

Syntax
```
int WINAPI WML_BarCodeInit(void);
```

Parameters
None.

Return Values
WM_SUCCESS
WM_ERR_BARCODE
WM_ERR_BARCODE_NOT_INITIALIZED

Related Functions
WML_BarCodeFree

---

WML_BarCodeObject
Performs barcode recognition on a Volume Manager object and returns one or more barcodes.

Include Files
#include "wmbarcod.h"

Syntax
```
int WINAPI WML_BarCodeObject(
        LPVMHOBJECT                 lpObjHandle,
        LPUINT                      lpuintNum,
        LPBARCODERESULTS FAR *      pBc);
```

Parameters
| | |
|---|---|
| *lpObjHandle* | Object handle. |
| *lpuintNum* | Number of barcodes found. |
| *pBc* | Buffer for resulting output filename. |

Usage Notes

This function returns the number of barcodes found, and fills an array of BARCODERESULTS structures that are passed into the function. (See WML_BarCodeImage for a description of BARCODERESULTS.)

On input, the lpuintNum parameter should be filled with the number of BARCODERESULTS structures contained in pBc. On output, the lpuintNum parameter will specify how many barcodes were found and fill the pBc array with these results. If there are more barcodes found than BARCODERESULTS structures passed, the function will merely fill all the given BARCODERESULTS structures in the pBc array and report how many barcodes were found in the lpuintNum parameter. If the lpuintNum is greater than it was on input, the user should take appropriate actions to recall the function with more BARCODERESULTS structures on input, or ignore.

Return Values

WM_SUCCESS
WM_ERR_BARCODE
WM_ERR_BARCODE_NOT_INITIALIZED
WM_ERR_INVALID_RESULT_BUFFER
WM_ERR_BAD_PARAMETER
WM_ERR_NO_BARCODES_FOUND
WM_ERR_BUFFER_TOO_SMALL
WM_ERR_OBJECT
WM_ERR_OBJECTATTRIB
WM_ERR_BARCODE_INVALID_OBJECT
WM_ERR_BARCODE_COULD_NOT_LOAD_WMOBJ

Related Functions

WML_BarCodeImage
WML_BarCodeImageOne
WML_BarCodeObjectOne

----------

WML_BarCodeObjectOne

Performs barcode recognition on a Volume Manager object but returns only a single barcode.

Include Files

```
#include "wmbarcod.h"
```

Syntax

```
int WINAPI WML_BarCodeObjectOne(
        LPVMHOBJECT  lpObjHandle,
        LPSTR        lpszResultBuffer,
        UINT         cbResultBuffer,
        LPUINT       lpnConfidenceLevel);
```

Parameters

*lpObjHandle* Object handle

*lpszResultBuffer* Pointer to result buffer.

| | |
|---|---|
| *cbResultBuffer* | Size of result buffer. |
| *lpnConfidenceLevel* | Confidence level. |

Usage Notes
This function returns the barcode string and confidence level for the results, or an error if no barcode is found.

Return Values
WM_SUCCESS
WM_ERR_BARCODE
WM_ERR_BARCODE_NOT_INITIALIZED
WM_ERR_INVALID_RESULT_BUFFER
WM_ERR_BAD_PARAMETER
WM_ERR_NO_BARCODES_FOUND
WM_ERR_BUFFER_TOO_SMALL
WM_ERR_OBJECT
WM_ERR_OBJECTATTRIB
WM_ERR_BARCODE_INVALID_OBJECT
WM_ERR_BARCODE_COULD_NOT_LOAD_WMOBJ Related Functions
WML_BarCodeImage
WML_BarCodeImageOne
WML_BarCodeObject

----------

WML_BarCodePreferences
Displays a dialog box that allows the user to make changes to the barcode engine configuration.

Include Files
#include "wmbarcod.h"

Syntax
```
int WINAPI WML_BarCodePreferences(
      HWND            hWndParent);
```

Parameters

| | |
|---|---|
| *hWndParent* | Parent window. |

Usage Notes
This dialog edits the barcode configuration for the whole system, so if two applications are using the barcode engine, the changes to the configuration will affect both applications.

Return Values
WM_SUCCESS
WM_ERR_BARCODE_NOT_INITIALIZED

---

WML_BarCodeRecognize

Performs barcode recognition on an image using the current zone or zones.

Include Files

#include "wmbarcod.h"

Syntax

```
int WINAPI WML_BarCodeRecognize(
      LPCSTR            lpszImageFile);
```

Parameters

*lpszImageFile* Image file name.

Usage Notes

This call performs the actual barcode recognition, but assumes that the application developer has added at least one zone to the initialized barcode engine. The recognition process will replace any existing zone results.

Return Values

WM_SUCCESS
WM_ERR_BARCODE
WM_ERR_BARCODE_NOT_INITIALIZED
WM_ERR_BAD_PARAMETER
WM_ERR_NO_ZONES_WERE_FOUND

Related Functions

WML_BarCodeRecognizeObject

---

WML_BarCodeRecognizeObject

Performs barcode recognition on a Volume Manager object using the current zone or zones.

Include Files

#include "wmbarcod.h"

Syntax

```
int WINAPI WML_BarCodeRecognizeObject(
      LPVMHOBJECT    lpObjHandle);
```

Parameters

*lpObjHandle* Object handle to image file.

Usage Notes
This call performs the actual barcode recognition, but assumes that the application developer has added at least one zone to the initialized barcode engine. The recognition process will replace any existing zone results.

Return Values
WM_SUCCESS
WM_ERR_BARCODE
WM_ERR_BARCODE_NOT_INITIALIZED
WM_ERR_BAD_PARAMETER
WM_ERR_NO_ZONES_WERE_FOUND
WM_ERR_OBJECT
WM_ERR_OBJECTATTRIB
WM_ERR_BARCODE_INVALID_OBJECT
WM_ERR_BARCODE_COULD_NOT_LOAD_WMOBJ Related Functions
WML_BarCodeRecognize

WML: BATCH FUNCTIONS

The batch functions of in the Workstation Manager Library can be grouped by use as: managing batch operations; miscellaneous batch operations; managing batch servers; selecting a batch to work on; indexing; learning about batches. The tables that follow list each of the batch functions by group along with its description.

*Managing Batch Operations*

| Function Name and Description |
| --- |
| WML_BatchInitialize<br>Initializes the batch library. |
| WML_BatchUninitialize<br>Uninitializes the batch library. |
| WML_BatchGetVersion<br>Retrieves the string containing the version number of the Workstation Manager batch library. |

*Miscellaneous Batch Operations*

| Function Name and Description |
|---|
| WML_BatchCommit<br>Commits a defined batch to the Volume Manager. |
| WML_BatchDelete<br>Deletes a batch. |
| WML_BatchQC<br>Displays a batch in quality control mode, which permits rescanning, re-ordering, deleting, and inserting. |
| WML_BatchScan<br>Displays an interface for document scanning. |

*Managing Batch Servers*

| Function Name and Description |
|---|
| WML_BatchGetDefaultServers<br>Returns a string indicating the batch servers that are currently selected as defaults. |
| WML_BatchSetDefaultServers<br>Sets which batch servers are to be the default batch servers. |
| WML_BatchGetServerID<br>Gets the server ID for a requested batch server name. |
| WML_BatchGetFirstServerID<br>Returns the ID of the first batch server process in the specified string that represents the selected batch server processes. |
| WML_BatchGetNextServerID<br>Returns the ID of the next batch server process in the specified string that represents the selected batch server processes. |
| WML_BatchGetNextJob<br>Returns the batch handle of the next batch of a given status waiting to be processed by the specified batch server. |
| WML_BatchServerSetupDialog<br>Displays the batch server setup dialog. |
| WML_BatchServersDialog<br>Displays the batch server selection dialog. |

*Selecting a Batch to Work On*

| Function Name and Description |
|---|
| WML_BatchGetCount<br>Retrieves the number of active batches that have a specified status. |
| WML_BatchGetFirst<br>Retrieves the first (oldest) batch of a specified status. |
| WML_BatchGetLast<br>Retrieves the last (newest) batch of a specified status. |
| WML_BatchGetNth<br>Retrieves a specific batch of a specified status. |
| WML_BatchGetUserSelected<br>Displays a list of batches and lets the user select one. |
| WML_BatchUnlock<br>Marks a batch as no longer in use, making it available for other users or processes. |

*Indexing Batches*

| Function Name and Description |
|---|
| WML_BatchIndex<br>Displays a batch in view-only mode for batch indexing. |
| WML_BatchIndexDone<br>Completes the batch indexing process. |
| WML_BatchIndexGetCurrentDocument<br>Retrieves the object handle of the document being viewed in a WML_BatchIndex window. |
| WML_BatchIndexGetCurrentDocID<br>Returns the document number of the document being viewed in a WML_BatchIndex window. |
| WML_BatchIndexGetCurrentDocumentInGroup<br>Creates a new group object, places the document being viewed in the WML_BatchIndex window into that group, and returns the object handle of that group. |
| WML_BatchIndexNextDocument<br>Goes to the next document to be indexed in a batch. |

| | |
|---|---|
| WML_BatchIndexGetResult<br>Retrieves the result string of a zoned recognition by the zone number. |
| WML_BatchIndexGetResultByName<br>Retrieves the result string of a zoned recognition by the zone name. |
| WML_BatchIndexHighlightZone<br>Highlights the area on the image corresponding to a particular zone number. |
| WML_BatchIndexHighlightZoneByName<br>Highlights the area on the image corresponding to a particular zone name. |
| WML_BatchIndexUnHighlightZone<br>Removes highlighting from any highlighted area on the image. |

*Learning about Batches*

| Function Name and Description |
|---|
| WML_BatchGetProperty<br>Retrieves a specified property (such as creation date or status) of a specified batch. |
| WML_BatchSetProperty<br>Assigns a value to a specified property of a specified batch. |
| WML_BatchGetDocumentProperty<br>Retrieves a particular property (such as the description or status) of a document in a specific batch. |
| WML_BatchSetDocumentProperty<br>Assigns a value to a specified property (such as the description or status) of a document in a specified batch. |
| WML_BatchGetPageProperty<br>Retrieves a specified property for a page in a specified batch. |
| WML_BatchSetPageProperty<br>Assigns a value to a specified property of a page in a specified batch. |
| WML_BatchGetPage<br>Retrieves the full pathname of a particular page in a specified batch. |

Technical Specifications

WML_BatchCommit

Commits a defined batch to the Volume Manager.

Include Files

```
#include "wmbatch.h"
```

Syntax

```
int FAR PASCAL WML_BatchCommit(
    HWND            hWnd,
    BATCHHANDLE  hBatchHandle);
```

Parameters

| | |
|---|---|
| *hWnd* | Window handle of the calling application. |
| *hBatchHandle* | Batch to be committed to the Volume Manager. |

Return Values

WM_SUCCESS
WM_ERR_INVALID_BATCH_HANDLE
WM_ERR_VM_NOT_RESPONSE
WM_ERR_BATCH

Related Functions

WML_BatchDelete
WML_BatchQC
WML_BatchScan
WML_BatchUnlock

WML_BatchDelete

Deletes a batch.

Include Files

```
#include "wmbatch.h"
```

Syntax

```
int FAR PASCAL WML_BatchDelete(
    HWND            hWnd,
    BATCHHANDLE  hBatchHandle);
```

Parameters

| | |
|---|---|
| *hWnd* | Window handle of the calling application. |
| *hBatchHandle* | Batch to be deleted. |

Usage Notes

If an application has explicitly changed the current working directory to the subdirectory containing the files of a particular batch, and WML_BatchDelete is called on that batch, problems may occur.

WML_BatchDelete not only deletes the files that make up the batch but also removes the directory where these files were located. Certain network operating systems may have a problem if a directory is removed when it is the current working directory on the system. For example, under Novell NetWare, all drive mappings that reference the drive on which this occurs will be removed from the drive mappings.

Therefore, if your program has made the batch subdirectory the current working directory, you must change the current working directory before calling WML_BatchDelete.

Return Values

WM_SUCCESS
WM_ERR_INVALID_BATCH_HANDLE
WM_ERR_VM_NOT_RESPONSE
WM_ERR_BATCH

Related Functions

WML_BatchCommit
WML_BatchQC

----------

WML_BatchGetCount

Retrieves the number of active batches that have a specified status.

Include Files

```
#include "wmbatch.h"
```

Syntax

```
int FAR PASCAL WML_BatchGetCount(
    HWND        hWnd,
    LPWORD      lpwCount,
    LPCSTR      szBatchStatus);
```

Parameters

| | |
|---|---|
| *hWnd* | Window handle of the calling application. |
| *lpwCount* | Pointer to an object handle used to store the batch count. |
| *szBatchStatus* | Status to be used as the search value. |

Return Values
WM_SUCCESS
WM_ERR_INVALID_BATCH_STATE
WM_ERR_INVALID_RESULT_BUFFER
WM_ERR_BATCH Related Functions
WML_BatchGetFirst
WML_BatchGetLast
WML_BatchGetNth
WML_BatchGetUserSelected

---

WML_BatchGetDefaultServers

Returns a string indicating the batch servers that are currently selected as defaults.

Include Files
#include "wmbatch.h"

Syntax

```
int WINAPI WML_BatchGetDefaultServers(
    LPBATCHSERVERS                    lpServers);
```

Parameters

*lpServers* The current default batch servers.

Return Values
WM_SUCCESS

Related Functions
WML_BatchSetDefaultServers

---

WML_BatchGetDocumentProperty

Retrieves a particular property (such as the description or status) of a document in a specific batch.

Include Files
#include "wmbatch.h"

Syntax

```
int FAR PASCAL WML_BatchGetDocumentProperty(
    HWND            hWnd,
    BATCHHANDLE     nBatchHandle,
    UINT            nDoc,
    int nDocumentProperty,
    LPSTR           lpszResultBuf,
```

int cbBufSize);

Parameters

| | |
|---|---|
| *hWnd* | Window handle of calling application |
| *nBatchHandle* | Batch Handle on which to get property |
| *nDoc* | Document number within batch |
| *nDocumentProperty* | Constant for document property to get (see below) |
| *lpszResultBuf* | Buffer to hold result string |
| *cbBufSize* | Size of result buffer |

Usage Notes

This function always returns a character string containing the requested property. Even if the result is numeric, it is represented as characters. For example, the number 21 is returned as the two-character string 21.

Values for nDocumentProperty are given in the table below.

| Constant Name | Description | Buffer Size | Sample Format |
|---|---|---|---|
| DOCUMENT_DESCRIPTI ON | Document description | 20 | Document1 |
| DOCUMENT_STATUS | Document status | 8 | 00001001 |
| DOCUMENT_TEMPLATE | Recognition template ID | 3 | 21 |
| DOCUMENT_OBJECTHA NDLE | Document object handle after commit | 28 | Volume1 000001E4 |
| DOCUMENT_PAGECOUN T | Number of pages in document | 3 | 12 |

Return Values

WM_SUCCESS
WM_ERR_BATCH

Related Functions

WML_BatchSetDefaultServers
WML_BatchGetPageProperty
WML_BatchGetProperty

---------

WML_BatchGetFirst

Retrieves the first (oldest) batch of a specified status.

Include Files

#include "wmbatch.h"

Syntax

```
int FAR PASCAL WML_BatchGetFirst(
    HWND              hWnd,
    LP_BATCHHANDLE    lpBatchHandle,
    LPCSTR            szBatchStatus,
    BOOL              bLock);
```

Parameters

*hWnd* Window handle of the calling application.

*lpBatchHandle* Pointer to an object handle used to store the batch handle.

*szBatchStatus* Status to be used as the search value.

*bLock* Whether to lock the batch to indicate that it is in use.

Return Values

WM_SUCCESS
WM_ERR_INVALID_BATCH_STATE
WM_ERR_INVALID_RESULT_BUFFER
WM_ERR_BATCH

Related Functions

WML_BatchGetCount
WML_BatchGetLast
WML_BatchGetNth
WML_BatchGetUserSelected

---

WML_BatchGetFirstServerID

Returns the ID of the first batch server process in the specified string that represents the selected batch server processes.

Include Files

#include "wmbatch.h"

Syntax

```
int WINAPI WML_BatchGetFirstServerID(
    LPBATCHSERVERS    lpServers,
    LPWORD            lpwServerID);
```

Parameters

*lpServers* String that represents the selected batch servers.

*lpwServerID* Pointer to a WORD where to store the server ID.

Return Values

WM_SUCCESS

Related Functions

WML_BatchGetNextServerID

---------

WML_BatchGetLast

Retrieves the last (newest) batch of a specified status.

Include Files

#include "wmbatch.h"

Syntax

```
int FAR PASCAL WML_BatchGetLast(
    HWND            hWnd,
    LP_BATCHHANDLE          lpBatchHandle,
    LPCSTR          szBatchStatus,
    BOOL            bLock);
```

Parameters

| | |
|---|---|
| *hWnd* | Window handle of the calling application. |
| *lpBatchHandle* | Pointer to an object handle used to store the batch handle. |
| *szBatchStatus* | Status to be used as the search value. |
| *bLock* | Whether to lock the batch to indicate that it is in use. |

Return Values

WM_SUCCESS
WM_ERR_INVALID_BATCH_STATE
WM_ERR_INVALID_RESULT_BUFFER
WM_ERR_BATCH

Related Functions

WML_BatchGetFirst
WML_BatchGetNth
WML_BatchGetUserSelected

---------

WML_BatchGetNextJob

Returns the batch handle of the next batch of a given status waiting to be processed by the specified batch server.

Include Files

#include "wmbatch.h"

Syntax

```
int WINAPI WML_BatchGetNextJob(
    LPCSTR                    lpszBatchStatus,
    WORD                      wServerID,
    LP_BATCHHANDLE                    lpBatchHandle);
```

Parameters

| | |
|---|---|
| *lpszBatchStatus* | The status filter to apply in selecting the next batch. |

*wServerID* The server ID of the server requesting the next job.

*lpBatchHandle* Pointer to hold the returned batch handle.

Return Values
WM_SUCCESS

----------

WML_BatchGetNextServerID

Returns the ID of the next batch server process in the specified string that represents the selected batch server processes.

Include Files
#include "wmbatch.h"

Syntax

```
int WINAPI WML_BatchGetNextServerID(
    LPBATCHSERVERS          lpServers,
    LPWORD                  lpwServerID);
```

Parameters

*lpServers* String that represents the selected batch servers.

*lpwServerID* Pointer to the WORD to use to store the server ID.

Return Values
WM_SUCCESS

Related Functions
WML_BatchGetFirstServerID

----------

WML_BatchGetNth

Retrieves a specific batch of a specified status.

Include Files
#include "wmbatch.h"

Syntax

```
int FAR PASCAL WML_BatchGetNth(
    HWND            hWnd,
    LP_BATCHHANDLE          lpBatchHandle,
    LPCSTR          szBatchStatus,
    WORD            wRecNum,
    BOOL            bLock);
```

Parameters

*hWnd* Window handle of the calling application.

| | |
|---|---|
| *lpBatchHandle* | Pointer to an object handle used to store the batch handle. |
| *szBatchStatus* | Status to be used as the search value. |
| *wRecNum* | Nth item to be returned (zero-based). |
| *bLock* | Whether to lock the batch to indicate that it is in use. |

Return Values
WM_SUCCESS
WM_ERR_INVALID_BATCH_STATE
WM_ERR_INVALID_RESULT_BUFFER
WM_ERR_BATCH Related Functions
WML_BatchGetFirst
WML_BatchGetLast
WML_BatchGetUserSelected

----------

WML_BatchGetPage

Retrieves the full pathname of a particular page in a specified batch.

Include Files
#include "wmbatch.h"

Syntax
```
int FAR PASCAL WML_BatchGetPage(
    HWND           hWnd,
    BATCHHANDLE    nBatchHandle,
    int nDoc,
    int nPage
    LPSTR          lpszResultBuf,
    int cbBufSize);
```

Parameters

| | |
|---|---|
| *hWnd* | Window handle of calling application |
| *nBatchHandle* | Batch Handle on which to get property |
| *nDoc* | Document number. If nDoc = 0, nPage will be the absolute page within the batch. If nDoc != 0, nPage will be the page within the specified document. |
| *nPage* | Page number. If nDoc != 0, this is the page within a document. Page 0 will be the separator sheet, and Page 1 will be the first image in the document. |
| *lpszResultBuf* | Buffer to hold result string |
| *cbBufSize* | Size of result buffer |

Return Values
WM_SUCCESS
WM_ERR_BATCH

Related Functions
WML_BatchGetPageProperty
WML_BatchSetPageProperty

---

WML_BatchGetPageProperty

Retrieves a specified property for a page in a specified batch.

Include Files

```
#include "wmbatch.h"
```

Syntax

```
int FAR PASCAL WML_BatchGetPageProperty(
    HWND            hWnd,
    BATCHHANDLE     nBatchHandle,
    UINT            nDoc,
    UINT            nPage,
    int nPageProperty,
    LPSTR           lpszResultBuf,
    int cbBufSize);
```

Parameters

| | |
|---|---|
| *hWnd* | Window handle of calling application |
| *nBatchHandle* | Batch Handle on which to get property |
| *nDoc* | Document number in batch. |
| *nPage* | Page number in document. |
| *nPageProperty* | Constant that identifies the page for which to get the property. See below. |
| *lpszResultBuf* | Buffer to hold result string |
| *cbBufSize* | Size of result buffer |

Usage Notes

This function always returns a character string containing the requested property. Even if the result is numeric, it is represented as characters. For example, the number 21 is returned as the two-character string 21.

Values for nPageProperty are given in the table below.

| Constant Name | Description | Buffer Size | Sample Format |
|---|---|---|---|
| PAGE_FILENAME | Filename of image | 12 | 1E_0001.TIF |
| PAGE_STATUS | Status string for page | 8 | 00001001 |
| PAGE_FORMID | Form ID of image (if using forms recognition) | 3 | 21 |
| PAGE_OBJECTHANDL E | Object handle of page after commit. | 28 | Volume1 000001E4 |

Return Values

WM_SUCCESS
WM_ERR_BATCH

Related Functions

WML_BatchSetPageProperty
WML_BatchGetProperty
WML_BatchGetDocumentProperty

---

WML_BatchGetProperty

Retrieves a specified property (such as creation date or status) of a specified batch.

Include Files

```
#include "wmbatch.h"
```

Syntax

```
int FAR PASCAL WML_BatchGetProperty(
    HWND           hWnd,
    BATCHHANDLE  nBatchHandle,
    int nBatchProperty,
    LPSTR          lpszResultBuf,
    int cbBufSize);
```

Parameters

| | |
|---|---|
| *hWnd* | Window handle of calling application |
| *nBatchHandle* | Batch handle on which to get property |
| *nBatchProperty* | Constant that identifies the batch for which to get the property. See below. |
| *lpszResultBuf* | Buffer to hold result string |
| *cbBufSize* | Size of result buffer |

Usage Notes

This function always returns a character string containing the requested property. Even if the result is numeric, it is represented as characters. For example, the number 21 is returned as the two-character string 21.

Values for nBatchProperty are given in the table below.

| Constant Name | Description | Buffer Size | Sample Format |
|---|---|---|---|
| BATCH_NAME | The batch name. | 20 | Batch1 |
| BATCH_FAMILY | The VM family that the batch will be committed to. | 20 | Family1 |
| BATCH_DATECREATE D | The date the batch was created. | 8 | 01/23/95 |

| | | | |
|---|---|---|---|
| BATCH_WHOCREATED | The user who created the batch | 20 | MikeM |
| BATCH_DATEMODIFIED | The date the batch was last modified. | 8 | 01/27/95 |
| BATCH_STATUS | The status of the batch. | 8 | 00001011 |
| BATCH_DOCUMENTCOUNT | The number of documents in the batch. | 3 | 4 |
| BATCH_PAGECOUNT | The number of pages in the batch. | 3 | 23 |
| BATCH_SERVERS | The servers that will process the batch. | 16 | 0000000000101011 |
| BATCH_SERVERID | The ID of the next server to be executed. | 3 | 1 |

Return Values
WM_SUCCESS
WM_ERR_BATCH

Related Functions
WML_BatchSetProperty
WML_BatchGetDocumentProperty
WML_BatchGetPageProperty

----------

WML_BatchGetServerID

Gets the server ID for a requested batch server name.

Include Files
#include "wmbatch.h"

Syntax

```
int WINAPI WML_BatchGetServerID(
    LPCSTR          lpszServerName,
    LPWORD          lpwServerID);
```

Parameters

*lpszServerName* Server name of requested server ID.

*lpwServerID* Pointer to WORD which will contain requested server ID.

Return Values
WM_SUCCESS

---

WML_BatchGetUserSelected

Displays a list of batches and lets the user select one.

Include Files

```
#include "wmbatch.h"
```

Syntax

```
int FAR PASCAL WML_BatchGetUserSelected(
    HWND            hWnd,
    LP_BATCHHANDLE  lpBatchHandle,
    LPCSTR          szBatchStatus,
    BOOL            bLock);
```

Parameters

| | |
|---|---|
| *hWnd* | Window handle of the calling application. |
| *lpBatchHandle* | Pointer to an object handle used to store the batch handle. |
| *szBatchStatus* | Status to be used as the search value. |
| *bLock* | Whether to lock the batch to indicate that it is in use. |

Return Values

WM_SUCCESS
WM_ERR_INVALID_BATCH_STATE
WM_ERR_INVALID_RESULT_BUFFER
WM_ERR_BATCH

Related Functions

WML_BatchGetFirst
WML_BatchGetLast
WML_BatchGetNth

---

WML_BatchGetVersion

Retrieves the string containing the version number of the Workstation Manager batch library.

Include Files

```
#include "wmbatch.h"
```

Syntax

```
int FAR PASCAL WML_BatchGetVersion(
    LPSTR   lpszResultBuf,
    int cbBufSize);
```

Parameters

| | |
|---|---|
| *lpszResultBuf* | Buffer to hold version number string |

*cbBufSize* Size of result buffer

Return Values
WM_SUCCESS
WM_ERR_BATCH

----------

WML_BatchIndex
Displays a batch in view-only mode for batch indexing.

Include Files
#include "wmbatch.h"

Syntax
```
int FAR PASCAL WML_BatchIndex(
    HWND             hWnd,
    LP_BATCHHANDLE           hBatchHandle,
    BOOL             bAutoIndex,
    HWND FAR         *lphViewWnd);
```

Parameters

| | |
|---|---|
| *hWnd* | Window handle of the calling application. |
| *hBatchHandle* | Batch handle to be indexed. |
| *bAutoIndex* | Whether to support the use of templates for automatic indexing. |
| *lphViewWnd* | Returned window handle of the indexing window. It is used as input to other indexing-related calls. |

Return Values
WM_SUCCESS
WM_ERR_INVALID_BATCH_HANDLE
WM_ERR_BATCH

Related Functions
WML_BatchIndexDone
WML_BatchIndexNextDocument

----------

WML_BatchIndexDone
Completes the batch indexing process.

Include Files
#include "wmbatch.h"

Syntax
```
int FAR PASCAL WML_BatchIndexDone(
    HWND             hWnd,
```

```
HWND            hViewWnd);
```

Parameters

| | |
|---|---|
| *hWnd* | Window handle of the calling application. |
| *hViewWnd* | Window handle of the indexing window. |

Usage Notes

If all of the documents in a batch have been indexed, the batch is deleted. If the batch has unindexed documents, they are marked as unindexed; a subsequent call to WML_BatchIndex on this batch displays only these documents.

Return Values

WM_SUCCESS
WM_ERR_INVALID_BATCH_HANDLE
WM_ERR_BATCH

Related Functions

WML_BatchIndex
WML_BatchIndexNextDocument

---

WML_BatchIndexGetCurrentDocument

Retrieves the object handle of the document being viewed in a WML_BatchIndex window.

Include Files

```
#include "wmbatch.h"
```

Syntax

```
int FAR PASCAL WML_BatchIndexGetCurrentDocument(
    HWND            hWnd,
    HWND            HViewWnd,
    LPHOBJECT       lphObjHandle);
```

Parameters

| | |
|---|---|
| *hWnd* | Window handle of the calling application. |
| *HViewWnd* | Window handle of the indexing window (from WML_BatchIndex). |
| lphObjHandle | Pointer to the object handle. |

Usage Notes

The current document is marked as indexed and the next document becomes the current document being viewed.

Return Values

WM_SUCCESS
WM_ERR_INVALID_BATCH_HANDLE

WM_ERR_INVALID_RESULT_BUFFER
WM_ERR_VIEW_NO_RESPONSE
WM_ERR_BATCH

Related Functions
WML_BatchIndexGetCurrentDocumentInGroup
WML_BatchIndexNextDocument

----------

WML_BatchIndexGetCurrentDocID
Returns the document number of the document being viewed in a WML_BatchIndex window.

Include Files
#include "wmbatch.h"

Syntax
```
int WINAPI WML_BatchIndexGetCurrentDocID(
    HWND        hWnd,
    HWND        hIndexWnd,
    LPINT       lpDocID);
```

Parameters

*hWnd* Window handle of calling application

*hIndexWnd* Window handle of index window (from WML_BatchIndex).

*lpDocID* Pointer to integer variable to hold document number

Usage Notes
This function can be used for subsequent calls to WML_BatchGetDocumentProperty or WML_BatchSetDocumentProperty.

Return Values
WM_SUCCESS

Related Functions
WML_BatchGetDocumentProperty
WML_BatchSetDocumentProperty

---------

WML_BatchIndexGetCurrentDocumentInGroup
Creates a new group object, places the document being viewed in the WML_BatchIndex window into that group, and returns the object handle of that group.

Include Files
#include "wmbatch.h"

Syntax
```
int FAR PASCAL WML_BatchIndexGetCurrentDocumentInGroup(
    HWND        hWnd,
    HWND        HViewWnd,
    LPHOBJECT   lphObjHandle);
```

Parameters

| | |
|---|---|
| *hWnd* | Window handle of the calling application. |
| *HViewWnd* | Window handle of the indexing window (from WML_BatchIndex). |
| *lphObjHandle* | Pointer to the object handle. |

Return Values
WM_SUCCESS
WM_ERR_INVALID_BATCH_HANDLE
WM_ERR_INVALID_RESULT_BUFFER
WM_ERR_VIEW_NO_RESPONSE
WM_ERR_BATCH Related Functions
WML_BatchIndexGetCurrentDocument
WML_BatchIndexNextDocument

---

WML_BatchIndexGetResult

Retrieves the result string of a zoned recognition by the zone number.

Include Files
#include "wmbatch.h"

Syntax
```
int FAR PASCAL WML_BatchIndexGetResult(
    HWND        hWnd,
    HWND        hIndexWnd,
    UINT        nZoneNum,
    LPSTR       lpszResultBuf,
    int cbBufSize,
    LPINT       lpnConfidenceLevel);
```

Parameters

| | |
|---|---|
| *hWnd* | Window handle of calling application |
| *hIndexWnd* | Window handle of indexing window (from WML_BatchIndex) |
| *nZoneNum* | Zone number (defined in template editor) |
| *lpszResultBuf* | Buffer to hold result string |
| *cbBufSize* | Size of result buffer |

| | |
|---|---|
| *lpnConfidenceLevel* | Buffer to hold recognition confidence level value |

Usage Notes
This function can be called only if *bAutoIndex* has been specified in the call to WML_BatchIndex.

Return Values
WM_SUCCESS
WM_ERR_BATCH

Related Functions
WML_BatchIndexGetResultByName

----------

WML_BatchIndexGetResultByName
Retrieves the result string of a zoned recognition by the zone name.

Include Files
#include "wmbatch.h"

Syntax
```
int FAR PASCAL WML_BatchIndexGetResultByName(
    HWND          hWnd,
    HWND          hIndexWnd,
    LPCSTR        lpszZoneName,
    LPSTR         lpszResultBuf,
    int cbBufSize,
    LPINT         lpnConfidenceLevel);
```

Parameters

| | |
|---|---|
| *hWnd* | Window handle of calling application |
| *hIndexWnd* | Window handle of indexing window (from WML_BatchIndex) |
| *lpszZoneName* | Zone name (defined in template editor) |
| *lpszResultBuf* | Buffer to hold result string |
| *cbBufSize* | Size of result buffer |
| *lpnConfidenceLevel* | Buffer to hold recognition confidence level value |

Usage Notes
This function can be called only if *bAutoIndex* has been specified in the call to WML_BatchIndex.

Return Values
WM_SUCCESS
WM_ERR_BATCH

Related Functions
WML_BatchIndexGetResult

---

WML_BatchIndexHighlightZone
Highlights the area on the image corresponding to a particular zone number.

Include Files
#include "wmbatch.h"

Syntax
```
int FAR PASCAL WML_BatchIndexHighlightZone(
    HWND        hWnd,
    HWND        hIndexWnd,
    UINT        nZoneNum);
```

Parameters

| | |
|---|---|
| *hWnd* | Window handle of calling application |
| *hIndexWnd* | Window handle of indexing window (from WML_BatchIndex) |
| *nZoneNum* | Zone number (defined in template editor) |

Usage Notes
This function can be called only if *bAutoIndex* has been specified in the call to WML_BatchIndex.

Return Values
WM_SUCCESS
WM_ERR_BATCH

Related Functions
WML_BatchIndexHighlightZoneByName
WML_BatchIndexUnHighlightZone

---

WML_BatchIndexHighlightZoneByName
Highlights the area on the image corresponding to a particular zone name.

Include Files
#include "wmbatch.h"

Syntax
```
int FAR PASCAL WML_BatchIndexHighlightZoneByName(
    HWND        hWnd,
    HWND        hIndexWnd,
    LPCSTR      lpszZoneName);
```

Parameters

| | |
|---|---|
| *hWnd* | Window handle of calling application |

| | |
|---|---|
| *hIndexWnd* | Window handle of indexing window (from WML_BatchIndex) |
| *lpszZoneName* | Zone name (defined in template editor) |

Usage Notes
This function can be called only if *bAutoIndex* has been specified in the call to WML_BatchIndex.

Return Values
WM_SUCCESS
WM_ERR_BATCH

Related Functions
WML_BatchIndexHighlightZone
WML_BatchIndexUnHighlightZone

----------

WML_BatchIndexNextDocument

Goes to the next document to be indexed in a batch.

Include Files
#include "wmbatch.h"

Syntax
```
int FAR PASCAL WML_BatchIndexNextDocument(
    HWND        hWnd,
    HWND        HViewWnd);
```

Parameters

| | |
|---|---|
| *hWnd* | Window handle of the calling application. |
| *HViewWnd* | Window handle of the indexing window (from WML_BatchIndex). |

Usage Notes
If the application has called either WML_BatchIndexGetCurrentDocument or WML_BatchIndexGetCurrentDocumentInGroup previously, the document is marked as indexed. If these functions have not been called previously, the document is not marked as indexed, and the effect is to skip the indexing of the document.

Return Values
WM_SUCCESS
WM_ERR_INVALID_BATCH_HANDLE
WM_ERR_VIEW_NO_RESPONSE
WM_ERR_BATCH Related Functions
WML_BatchIndexGetCurrentDocument
WML_BatchIndexGetCurrentDocumentInGroup

----------

WML_BatchIndexUnHighlightZone

Removes highlighting from any highlighted area on the image.

Include Files

#include "wmbatch.h"

Syntax

```
int FAR PASCAL WML_BatchIndexUnHighlightZone(
    HWND        hWnd,
    HWND        hIndexWnd);
```

Parameters

*hWnd* Window handle of calling application

*hIndexWnd* Window handle of indexing window (from WML_BatchIndex)

Usage Notes

This function can be called only if *bAutoIndex* has been specified in the call to WML_BatchIndex.

Return Values

WM_SUCCESS
WM_ERR_BATCH

Related Functions

WML_BatchIndexHighlightZone
WML_BatchIndexHighlightZoneByName

----------

WML_BatchInitialize

Initializes the batch library.

Include Files

#include "wmbatch.h"

Syntax

```
int FAR PASCAL WML_BatchInitialize();
```

Parameters

None.

Usage Notes

This function must be called before any calls to other WML_Batch functions.

Usage Notes

Because WML_BatchInitialize may take some time to complete, it is best to call it only once at the beginning of an application.

Return Values

WM_SUCCESS
WM_ERR_BATCH

Related Functions

WML_BatchUninitialize

---

WML_BatchQC

Displays a batch in quality control mode, which permits rescanning, re-ordering, deleting, and inserting.

Include Files

```
#include "wmbatch.h"
```

Syntax

```
int FAR PASCAL WML_BatchQC(
    HWND          hWnd,
    BATCHHANDLE   hBatchHandle);
```

Parameters

*hWnd* Window handle of the calling application.

*hBatchHandle* Batch handle of the batch to be checked through quality control.

Return Values

WM_SUCCESS
WM_ERR_INVALID_BATCH_HANDLE
WM_ERR_BATCH

Related Functions

WML_BatchScan
WML_BatchDelete
WML_BatchCommit

---

WML_BatchScan

Displays an interface for document scanning.

Include Files

```
#include "wmbatch.h"
```

Syntax

```
int FAR PASCAL WML_BatchScan(
    HWND        hWnd,
    BOOL        bPreview);
```

Parameters

*hWnd* Window handle of the calling application.

*bPreview* Boolean variable that determines if each page is displayed as it is being scanned:

- TRUE displays the page.
- FALSE does not display the page.

Usage Notes

The interface for document scanning presents a postage-stamp icon, or thumbnail, for each page in the batch. It also provides a set of interactive processing options for selectively inserting, deleting, rescanning, and reordering pages, as well as for zooming, rotating, and inverting colors. The user can reorder pages using drag-and-drop techniques on the thumbnail icons. The user also can open a thumbnail icon to display a full view of the document page in its own window.

Return Values

WM_SUCCESS
WM_ERR_BATCH

Related Functions

WML_BatchCommit
WML_BatchDelete
WML_BatchQC

----------

WML_BatchServersDialog

Displays the batch server selection dialog.

Include Files

#include "wmbatch.h"

Syntax

```
int WINAPI WML_BatchServersDialog(
    HWND                hWnd,
    LPBATCHSERVERS              lpServers);
```

Parameters

*hWnd* Window handle of calling application.

*lpServers* A string indicating which batch servers were selected in the dialog.

Usage Notes
The batch server selection dialog lets users select which of the defined batch servers to use.

Return Values
WM_SUCCESS

----------

WML_BatchServerSetupDialog
Displays the batch server setup dialog.

Include Files
```
#include "wmbatch.h"
```

Syntax
```
int WINAPI WML_BatchServerSetupDialog(HWND hWnd);
```

Parameters

*hWnd* Window handle of calling application.

Usage Notes
The batch server setup dialog is used to define batch servers.

Return Values
WM_SUCCESS

----------

WML_BatchSetDefaultServers
Sets which batch servers are to be the default batch servers.

Include Files
```
#include "wmbatch.h"
```

Syntax
```
int WINAPI WML_BatchSetDefaultServers(
    LPBATCHSERVERS            lpServers);
```

Parameters

*lpServers* The string representing which batch servers are to be the default batch servers.

Return Values
WM_SUCCESS

Related Functions
WML_BatchGetDefaultServers

----------

WML_BatchSetDocumentProperty

Assigns a value to a specified property (such as the description or status) of a document in a specified batch.

Include Files

#include "wmbatch.h"

Syntax

```
int FAR PASCAL WML_BatchSetDocumentProperty(
    HWND            hWnd,
    BATCHHANDLE  nBatchHandle,
    UINT            nDoc,
    int nDocumentProperty,
    LPCSTR          szProperty);
```

Parameters

| | |
|---|---|
| *hWnd* | Window handle of calling application |
| *nBatchHandle* | Batch handle on which to set property |
| *nDoc* | Document number within batch |
| *nDocumentProperty* | Constant for which document property to set (see below) |
| *szProperty* | String containing the new value for the property |

Usage Notes

Values for nDocumentProperty are given in the table below.

| Constant Name | Description | Buffer Size | Sample Format |
|---|---|---|---|
| DOCUMENT_DESCRIPTION | Document description | 20 | Document1 |
| DOCUMENT_STATUS | Document status | 8 | 00001001 |
| DOCUMENT_TEMPLATE | Recognition template ID | 3 | 21 |

Return Values

WM_SUCCESS
WM_ERR_BATCH

Related Functions

WML_BatchGetDocumentProperty
WML_BatchSetPageProperty
WML_BatchSetProperty

---

WML_BatchSetPageProperty

Assigns a value to a specified property of a page in a specified batch.

Include Files

#include "wmbatch.h"

Syntax

```
int FAR PASCAL WML_BatchSetPageProperty(
    HWND            hWnd,
    BATCHHANDLE     nBatchHandle,
    UINT            nDoc,
    UINT            nPage,
    int nPageProperty,
    LPCSTR          szProperty);
```

Parameters

| | |
|---|---|
| *hWnd* | Window handle of calling application |
| *nBatchHandle* | Batch handle on which to get property |
| *nDoc* | Document number within batch. |
| *nPage* | Page number within document. |
| *nPageProperty* | Constant that identifies the page for which to get the property. See below. |
| *szProperty* | String containing the new value for the page property |

Usage Notes

Values for nPageProperty are given in the table below.

| Constant Name | Description | Buffer Size | Sample Format |
|---|---|---|---|
| PAGE_FILENAME | Filename of image | 12 | 1E_0001.TIF |
| PAGE_STATUS | Status string for page | 8 | 00001001 |
| PAGE_FORMID | Form ID of image (if using forms recognition) | 3 | 21 |

Return Values

WM_SUCCESS
WM_ERR_BATCH

Related Functions

WML_BatchGetPageProperty
WML_BatchSetDefaultServers
WML_BatchSetProperty

----------

WML_BatchSetProperty

Assigns a value to a specified property of a specified batch.

Include Files

```
#include "wmbatch.h"
```

Syntax

```
int FAR PASCAL WML_BatchSetProperty(
    HWND            hWnd,
    BATCHHANDLE  nBatchHandle,
    int nBatchProperty,
    LPCSTR          szProperty);
```

Parameters

| | |
|---|---|
| *hWnd* | Window handle of calling application |
| *nBatchHandle* | Batch handle on which to get property |
| *nBatchProperty* | Constant that identifies the batch for which to get the property. See below. |
| *szProperty* | String containing the new value for the page property |

Usage Notes

Values for nBatchProperty are given in the table below.

| Constant Name | Description | Buffer Size | Sample Format |
|---|---|---|---|
| BATCH_NAME | The batch name. | 20 | Batch1 |
| BATCH_FAMILY | The VM family that the batch will be committed to. | 20 | Family1 |
| BATCH_DATECREATED | The date the batch was created. | 8 | 01/23/95 |
| BATCH_WHOCREATED | The user who created the batch | 20 | MikeM |
| BATCH_DATEMODIFIED | The date the batch was last modified. | 8 | 01/27/95 |
| BATCH_STATUS | The status of the batch. | 8 | 00001011 |
| BATCH_SERVERS | The servers that will process the batch. | 16 | 0000000000101011 |
| BATCH_SERVERID | The ID of the next server to be executed. | 3 | 1 |

Return Values

WM_SUCCESS

WM_ERR_BATCH

Related Functions

WML_BatchGetProperty
WML_BatchSetDefaultServers
WML_BatchSetPageProperty

---------

WML_BatchUninitialize

Uninitializes the batch library.

Include Files

#include "wmbatch.h"

Syntax

```
int FAR PASCAL WML_BatchUninitialize();
```

Parameters

None.

Return Values

WM_SUCCESS
WM_ERR_BATCH

Related Functions

WML_BatchInitialize

---------

WML_BatchUnlock

Marks a batch as no longer in use, making it available for other users or processes.

Include Files

#include "wmbatch.h"

Syntax

```
int FAR PASCAL WML_BatchUnlock(
    BATCHHANDLE nBatchHandle);
```

Parameters

| | |
|---|---|
| *nBatchHandle* | Batch handle of batch to unlock |

Return Values

WM_SUCCESS
WM_ERR_BATCH

WML: CLEAN FUNCTIONS

The table that follows lists each of the dean functions of in the Workstation Manager Libraryalong with its description.

| Function Name and Description |
| --- |
| WML_CleanInitialize<br>Initializes the WMCLEAN library. |
| WML_CleanUninitialize<br>Uninitializes the WMCLEAN library. |
| WML_CleanGetVersion<br>Gets the version string of the installed WMCLEAN library. |
| WML_CleanConfigure<br>Configures the WMCLEAN library and displays a dialog of cleanup related operations. |
| WML_CleanSetConfigure<br>Sets the configuration settings for the WMCLEAN library. |
| WML_CleanImage<br>Uses the current configuration to perform image cleanup on a specified image. |
| WML_CleanObject<br>Uses the current configuration to perform image cleanup on a specified Volume Manager object. |
| WML_CleanGetErrorText<br>Gets the text associated with a WMCLEAN error code. |

---

*Technical Specifications*

WML_CleanConfigure

Configures the WMCLEAN library and displays a dialog of cleanup related operations.

Syntax

```
int WINAPI WML_CleanConfigure(
    HWND        hWnd,
    LPSTR       lpszConfigName,
    int         cbBuffer);
```

Parameters

| | |
|---|---|
| *hWnd* | Window handle of calling application. |
| *lpszConfigName* | Buffer to receive name of current configuration. |
| *cbBuffer* | Size of buffer. |

Return Values

WM_SUCCESS
WM_ERR_CLEAN_NOT_INITIALIZED
WM_ERR_CLEAN_CONFIGURATION

Related Functions

WML_CleanSetConfigure

----------

WML_CleanGetErrorText

Gets the text associated with a WMCLEAN error code.

Syntax

```
LPSTR WINAPI WML_CleanGetErrorText(
    int         nErrorCode,
    LPSTR       lpszErrorTextBuffer,
    int         cbErrorTextBuffer);
```

Parameters

| | |
|---|---|
| *nErrorCode* | Error code. |
| *lpszErrorTextBuffer* | Error text buffer. |
| *cbErrorTextBuffer* | Size of error text buffer. |

Usage Notes

This function will attempt to find a string associated with the passed nErrorCode parameter. The nErrorCode parameter should be an error code returned from the WML_ICR functions.

Return Values

Returns the pointer to the passed error buffer, lpszErrorTextBuffer. The error buffer will be filled with the error string associated with the passed error code, nErrorCode. If the error string does not fit into the error buffer, the string will be truncated.

----------

WML_CleanGetVersion

Gets the version string of the installed WMCLEAN library.

Syntax

```
int WINAPI WML_CleanGetVersion(
    LPSTR           lpszResultBuf,
    int cbBuffer);
```

Parameters

| | |
|---|---|
| *lpszResultBuf* | Buffer to hold version string. |
| *cbBuffer* | Size of lpszResultBuf. |

Return Values

WM_SUCCESS

----------

WML_CleanImage

Uses the current configuration to perform image cleanup on a specified image.

Syntax

```
int WINAPI WML_CleanImage(
    LPCSTR          lpszSourceFilename,
    LPCSTR          lpszDestFilename);
```

Parameters

| | |
|---|---|
| *lpszSourceFilename* | Full pathname to image to be cleaned. |
| *lpszDestFilename* | Full pathname of file designated for cleaned image. A NULL value tells Object Manager to overwrite source image with cleaned image. |

Usage Notes

The user can save the results to another file or overwrite the original image with the cleaned image.

Return Values

WM_SUCCESS
WM_ERR_CLEAN
WM_ERR_CLEAN_NOT_INITIALIZED
WM_ERR_CLEAN_CONFIGURATION

Related Functions

WML_CleanObject

----------

WML_CleanInitialize

Initializes the WMCLEAN library.

Syntax

```
int WINAPI WML_CleanInitialize(void);
```

Parameters

None.

Usage Notes

This function must be called before any other WMCLEAN functions are called.

Return Values

WM_SUCCESS
WM_ERR_CLEAN_NOT_INITIALIZED

Related Functions

WML_CleanUninitialize

----------

WML_CleanObject

Uses the current configuration to perform image cleanup on a specified Volume Manager object.

Syntax

```
int WINAPI WML_CleanObject(
    LPVMHOBJECT    lpObjHandle);
```

Parameters

*lpObjHandle* Volume Manager object handle.

Usage Notes

The results, which are saved to the object handle, replace the original object.

Return Values

WM_SUCCESS
WM_ERR_CLEAN
WM_ERR_CLEAN_NOT_INITIALIZED

Related Functions

WML_CleanImage

----------

WML_CleanSetConfigure

Sets the configuration settings for the WMCLEAN library.

Syntax

```
int WINAPI WML_CleanSetConfigure(
    LPCSTR          lpszConfigName);
```

Parameters

*lpszConfigName* Name of configuration to set as current.

Usage Notes

This function looks up the configuration using the passed name and sets the configuration accordingly.

Return Values

WM_SUCCESS
WM_ERR_CLEAN_NOT_INITIALIZED
WM_ERR_CLEAN_CONFIGURATION

Related Functions

WML_CleanConfigure

----------

WML_CleanUninitialize

Uninitializes the WMCLEAN library.

Syntax

```
int WINAPI WML_CleanUninitialize(void);
```

Parameters

None.

Usage Notes

This function must be called to properly terminate the use of the WMCLEAN library.

Return Values

WM_SUCCESS
WM_ERR_CLEAN_NOT_INITIALIZED

Related Functions

WML_CleanInitialize

WML: FORM RECOGNITION FUNCTIONS

The table that follows lists each of the form recognition functions in the Workstation Manager Library along with its description.

| Function Name and Description |
| --- |
| WML_FormInitialize<br>Initializes the form recognition library. |
| WML_FormTerminate<br>Terminates the form recognition library. |
| WML_FormRecognize<br>Recognizes a specific image and returns a form identification number representing a form in the forms database. |
| WML_FormReconstruct<br>Reconstructs the form using the information supplied in the source image file. |
| WML_FormRemove<br>Performs forms removal on a specified image using the form identification number. |

---------

*Technical Specifications*

WML_FormInitialize

Initializes the form recognition library.

Include Files

```
#include "wmform.h"
```

Syntax

```
int WINAPI WML_FormInitialize(void);
```

Parameters

None.

Return Values
WM_SUCCESS
WM_ERR_FORM

Related Functions
WML_FormTerminate

---------

WML_FormRecognize

Recognizes a specific image and returns a form identification number representing a form in the forms database.

Include Files
#include "wmform.h"

Syntax
```
int WINAPI WML_FormRecognize(
        LPCSTR          lpszSourceImage,
        LPWORD          lpwFormID);
```

Parameters

| | |
|---|---|
| *lpszSourceImage* | Filename for the source image. |
| *lpwFormID* | Form identification number. |

Usage Notes
Object Manager applies forms recognition to the source image and returns a form identification number. The form identification number represents a form record in the forms database that is to be used to reconstruct the form.

Return Values
WM_SUCCESS
WM_ERR_FORM

Related Functions
WML_FormRemove
WML_FormRemove

----------

WML_FormReconstruct

Reconstructs the form using the information supplied in the source image file.

Include Files
#include "wmform.h"

Syntax
```
int WINAPI WML_FormReconstruct(
```

```
LPCSTR          lpszSourceImage,
LPCSTR          lpszTargetImage);
```

Parameters

| | |
|---|---|
| *lpszSourceImage* | Filename for the source image. |
| lpszTargetImage | Filename for the target image. |

Usage Notes

The new image is saved to the target filename.

Return Values

WM_SUCCESS
WM_ERR_FORM

Related Functions

WML_FormRecognize
WML_FormRemove

---

WML_FormRemove

Performs forms removal on a specified image using the form identification number.

Include Files

```
#include "wmform.h"
```

Syntax

```
int WINAPI WML_FormRemove(
    LPCSTR          lpszSourceImage,
    LPCSTR          lpszTargetImage,
    WORD            wFormID);
```

Parameters

| | |
|---|---|
| *lpszSourceImage* | Filename for the source image. |
| *lpszTargetImage* | Filename for the target image. |
| *wFormID* | Form identification number. |

Usage Notes

Object Manager uses the form identification number to retrieve the characteristics of the form and saves the new image to the target filename.

Return Values

WM_SUCCESS
WM_ERR_FORM

Related Functions

WML_FormRecognize
WML_FormRemove

WML_FormTerminate

Terminates the form recognition library.

Include Files

#include "wmform.h"

Syntax int WINAPI WML_FormTerminate(void);

Parameters

None.

Return Values

WM_SUCCESS
WM_ERR_FORM

Related Functions

WML_FormInitialize

WML: ICR FUNCTIONS

The table that follows lists each of the ICR functions in the Workstation Manager Library along with its description.

| Function Name and Description |
| --- |
| WML_ICRInit<br>Initializes the ICR module for recognizing hand-printed text. |
| WML_ICRFree<br>Uninitializes the intelligent character recognition (ICR) module. |
| WML_ICRAddZone<br>Adds a zone to be processed. |
| WML_ICRClearZones<br>Clears all zones. |
| WML_ICRRecognize<br>Performs ICR of hand-printed text on the set of zones. |

| |
|---|
| WML_ICRRecognizeObject<br>Performs recognition of hand-printed text on a Volume Manager object using the current zone(s). |
| WML_ICRGetResult<br>Gets the ICR results from a zone and returns the confidence level. |
| WML_ICRGetZoneImage<br>Takes the image, lpszImageFile, and returns a bitmap copy of the area specified by the zone, nZoneNum. |
| WML_ICRGetRectImage<br>Takes the image, lpszImageFile, and returns a bitmap copy of the area specified by the xOrig, yOrig, xWidth, and yHeight parameters. |
| WML_ICRGetErrorText<br>Returns a corresponding error string for the given error code. |

---

*Technical Specifications*

WML_ICRAddZone

Adds a zone to be processed.

Include Files

```
#include "wmicr.h"
```

Syntax

```
int WINAPI WML_ICRAddZone(
    UINT        nZoneNum,
    long        xOrig,
    long        yOrig,
    long        xWidth,
    long        yHeight,
    int iTypes,
    int iSegmentation,
    int iContext,
    float       fCPI);
```

Parameters

| | |
|---|---|
| *nZoneNum* | Zone number. |
| *xOrig* | Minimum X value of zone. |
| *yOrig* | Minimum Y value of zone. |

| | |
|---|---|
| *xWidth* | Maximum X value of zone. |
| *yHeight* | Maximum Y value of zone. |
| *iTypes* | Type ascii/numeric. |
| *iSegmentation* | Segmentation type. |
| *iContext* | Character context checking. |
| *fCPI* | CPI (characters per inch). |

Usage Notes

This function adds a zone to the hand-printed text (ICR) engine. To be image resolution independent, the xOrig, yOrig, xWidth, and yHeight parameters are to be in TWIPs (1 inch = 1440 TWIPs). If the values for xOrig, yOrig, xWidth, and yHeight parameters are all zero, the zone is assumed to be the entire page.

The iTypes parameter can be one of the following:

HANDPRINT_MIXED
HANDPRINT_ALPHA
HANDPRINT_NUMERIC
HANDPRINT_MIXED_PUNC
HANDPRINT_ALPHA_PUNC
HANDPRINT_NUMERIC_PUNC

The iSegmentation parameter can be one of the following:

SEGMENTATION_SINGLE_CHARACTER
SEGMENTATION_SINGLE_WORD
SEGMENTATION_SINGLE_LINE
SEGMENTATION_MULTIPLE_LINES

The iContext parameter is a boolean flag that if non-zero will instruct the ICR module to perform character context checking. Character context checking is a process of determining the probability of a character being followed by another given character. For example, the recognition process recognizes the letter 'Q' followed by a letter that is determined to be a 'v' or 'u'. Because the probability of the letter 'u' following a 'Q' is much higher than 'v', the ICR engine returns 'Qu'.

The fCPI parameter is a floating point value that is used when a form is known to have character boxes that have a specific number of characters per inch (CPI). If the value is 0, the engine will ignore the fCPI parameter and attempt to determine the CPI on its own.

Return Values

WM_SUCCESS
WM_ERR_ICR_NOT_INITIALIZED

Related Functions

WML_ICRClearZones

---------

WML_ICRClearZones

Clears all zones.

Include Files

#include "wmicr.h"

Syntax int WINAPI WML_ICRClearZones(void);

Parameters

None.

Usage Notes

This call clears all zones from the ICR module including any results.

Return Values

WM_SUCCESS
WM_ERR_ICR_NOT_INITIALIZED

Related Functions

WML_ICRAddZone

---------

WML_ICRFree

Uninitializes the intelligent character recognition (ICR) module.

Include Files

#include "wmicr.h"

Syntax int WINAPI WML_ICRFree(void);

Parameters

None.

Return Values

WM_SUCCESS

Related Functions

WML_ICRInit

---------

WML_ICRGetErrorText

Returns a corresponding error string for the given error code.

Include Files

```
#include "wmicr.h"
```

Syntax

```
LPSTR WINAPI WML_ICRGetErrorText(
    int nErrorCode,
    LPSTR          lpszErrorTextBuffer,
    int cbErrorTextBuffer);
```

Parameters

| | |
|---|---|
| *nErrorCode* | Error code. |
| *lpszErrorTextBuffer* | Error text buffer. |
| *cbErrorTextBuffer* | Size of error text buffer. |

Usage Notes

This function will attempt to find a string associated with the passed nErrorCode parameter. The nErrorCode parameter should be an error code returned from the WML_ICR functions.

Return Values

Returns the pointer to the passed error buffer, lpszErrorTextBuffer. The error buffer will be filled with the error string associated with the passed error code, nErrorCode. If the error string does not fit into the error buffer, the string will be truncated.

---

WML_ICRGetRectImage

Takes the image, lpszImageFile, and returns a bitmap copy of the area specified by the xOrig, yOrig, xWidth, and yHeight parameters.

Include Files

```
#include "wmicr.h"
```

Syntax

```
int WINAPI WML_ICRGetRectImage(
    LPCSTR          lpszImageFile,
    long            xOrig,
    long            yOrig,
    long            xWidth,
    long            yHeight,
    HBITMAP FAR     *lphDib);
```

Parameters

| | |
|---|---|
| *lpszImageFile* | Image file name. |
| *xOrig* | X origin of the zone. |
| *yOrig* | Y origin of the zone. |
| *xWidth* | Width of the zone. |

*yHeight* Height of the zone.

*lphDib* Pointer to zone bitmap.

Usage Notes

The xOrig, yOrig, xWidth, and yHeight parameters are to be in TWIPs (1 inch = 1440 TWIPs). If the values for xOrig, yOrig, xWidth and yHeight are all zero, the zone is assumed to be the entire page. This function allows an application developer to retrieve a bitmap copy of a zone to be used for verification and other visual purposes. The lphDib parameter will return a device independent bitmap (DIB) that can be freed by using the Windows SDK DeleteObject function.

Return Values

WM_SUCCESS
WM_ERR_ICR
WM_ERR_ICR_NOT_INITIALIZED
WM_ERR_BAD_PARAMETER
WM_ERR_INVALID_RESULT_BUFFER
WM_ERR_ICR_IMAGE_RESOLUTION
WM_ERR_COULD_NOT_CREATE_BITMAP
WM_ERR_OUT_OF_MEMORY

Related Functions

WML_ICRGetResult
WML_ICRGetZoneImage

----------

WML_ICRGetResult

Gets the ICR results from a zone and returns the confidence level.

Include Files

```
#include "wmicr.h"
```

Syntax

```
int WINAPI WML_ICRGetResult(
    UINT        nZoneNum,
    LPSTR       lpszResultBuffer,
    UINT        cbResultBuffer,
    UINT far    *lpnConfidenceLevel);
```

Parameters

*nZoneNum* Zone number.

*lpszResultBuffer* Pointer to result buffer.

*cbResultBuffer* Size of result buffer.

*lpnConfidenceLevel* Confidence level.

Return Values

WM_SUCCESS
WM_ERR_ICR_NOT_INITIALIZED

WM_ERR_ICR_NO_ZONES_WERE_FOUND
WM_ERR_ICR_ZONE_OUTOFRANGE

Related Functions

WML_ICRGetRectImage
WML_ICRGetZoneImage

----------

WML_ICRGetZoneImage

Takes the image, lpszImageFile, and returns a bitmap copy of the area specified by the zone, nZoneNum.

Include Files

```
#include "wmicr.h"
```

Syntax

```
int WINAPI WML_ICRGetZoneImage(
    UINT            nZoneNum,
    LPCSTR          lpszImageFile,
    HBITMAP FAR     *lphDib);
```

Parameters

| | |
|---|---|
| *nZoneNum* | Zone number. |
| *lpszImageFile* | Image file name. |
| *lphDib* | Pointer to zone bitmap. |

Usage Notes

This function allows an application developer to retrieve a bitmap copy of a zone to be used for verification and other visual purposes. The lphDib parameter will return a device independent bitmap (DIB) that can be freed by using the Windows SDK DeleteObject function.

Return Values

WM_SUCCESS
WM_ERR_ICR
WM_ERR_ICR_NOT_INITIALIZED
WM_ERR_BAD_PARAMETER
WM_ERR_INVALID_RESULT_BUFFER
WM_ERR_ICR_IMAGE_RESOLUTION
WM_ERR_COULD_NOT_CREATE_BITMAP
WM_ERR_OUT_OF_MEMORY
WM_ERR_ICR_NO_ZONES_WERE_FOUND
WM_ERR_ICR_ZONE_OUTOFRANGE

Related Functions

WML_ICRGetRectImage
WML_ICRGetResult

----------

WML_ICRInit

Initializes the ICR module for recognizing hand-printed text.

Include Files

#include "wmicr.h"

Syntax int WINAPI WML_ICRInit(void);

Parameters

None.

Return Values

WM_SUCCESS
WM_ERR_ICR
WM_ERR_ICR_NOT_INITIALIZED

Related Functions

WML_ICRFree

----------

WML_ICRRecognize

Performs ICR of hand-printed text on the set of zones.

Include Files

#include "wmicr.h"

Syntax int WINAPI WML_ICRRecognize(LPCSTR *lpszImageFile*);

Parameters

*lpszImageFile* Image file name.

Usage Notes

This call performs the actual recognition of hand-printed text on an image, but assumes that the application developer has added at least one zone to the initialized ICR engine. The recognition process will replace any existing zone results.

Return Values

WM_SUCCESS
WM_ERR_ICR
WM_ERR_ICR_NOT_INITIALIZED
WM_ERR_BAD_PARAMETER
WM_ERR_ICR_NO_ZONES_WERE_FOUND
WM_ERR_ICR_IMAGE_RESOLUTION
WM_ERR_OUT_OF_MEMORY

Related Functions
WML_ICRRecognizeObject

---

WML_ICRRecognizeObject

Performs recognition of hand-printed text on a Volume Manager object using the current zone(s).

Include Files

#include "wmicr.h"

Syntax:

```
int WINAPI WML_ICRRecognizeObject(
     LPVMHOBJECT    lpObjHandle);
```

Parameters

*lpObjHandle* image file name.

Usage Notes

This call performs the actual ICR module for hand-printed text recognition on a Volume Manager object, but assumes that the application developer has added at least one zone to the initialized ICR module. The recognition process will replace any existing zone results.

Return Values

WM_SUCCESS
WM_ERR_ICR
WM_ERR_ICR_NOT_INITIALIZED
WM_ERR_BAD_PARAMETER
WM_ERR_ICR_NO_ZONES_WERE_FOUND
WM_ERR_ICR_IMAGE_RESOLUTION
WM_ERR_OUT_OF_MEMORY
WM_ERR_OBJECT
WM_ERR_OBJECTATTRIB
WM_ERR_BARCODE_INVALID_OBJECT
WM_ERR_BARCODE_COULD_NOT_LOAD_WMOBJ

Related Functions

WML_ICRRecognize

WML: OBJECT FUNCTIONS

The Object functions in the Workstation Manager Library can be grouped by their use as: general operations; creating and deleting objects; working with objects; and learning about objects. The tables that follow list each of the object functions in the Workstation Manager Library by group along with its description.

*General Operations*

| Function Name and Description |
|---|
| WML_ObjectInitialize<br>Initializes object library for the current task. |
| WML_ObjectTerminate<br>Uninitializes object library for the current task. |
| WML_ObjectReleaseResource<br>Releases the memory resource from the global heap held by the library on behalf of an application. |
| WML_ObjectOpen<br>Opens a group object. |
| WML_ObjectClose<br>Closes an opened object. |
| WML_ObjectGetObject<br>Downloads an object from the Volume Manager to a local disk. |
| WML_ObjectGetNthVolume<br>Retrieves the nth volume name from the volume list. |
| WML_ObjectGetDefaultVolume<br>Retrieves the default volume name or the family name. |
| WML_ObjectSetDefaultVolume<br>Sets the default volume name. |

*Working with Objects*

| Function Name and Description |
|---|
| WML_ObjectCreate<br>Creates a new object and returns the object handle of the newly created object. |

| |
|---|
| WML_ObjectDelete<br>Decreases the reference count for the object specified by the object handle pointed to by lpvmhObjHandle. Then deletes the object when the count reaches zero. |
| WML_ObjectExportToFile<br>Exports an object to the native file system. |
| WML_ObjectImportFromFile<br>Imports a native file system document into an open object. |
| WML_ObjectCheckOut<br>Checks an object out from the Volume Manager. |
| WML_ObjectCheckIn<br>Checks an object in to the Volume Manager. |
| WML_ObjectPutObject<br>Changes the contents of a simple object in the Volume Manager. |

*Working with Group Objects*

| **Function Name and Description** |
|---|
| WML_ObjectAddItem<br>Adds a link to an existing object to an opened group object. |
| WML_ObjectRemoveItem<br>Removes an object from a group object. |
| WML_ObjectMove<br>Moves an object from one position to another position within a group object. |
| WML_ObjectGetFamily<br>Gets the description string of an object in the group object. |
| WML_ObjectGetFieldDefinition<br>Gets the current field definition by position. |
| WML_ObjectInsertFieldDefinition<br>Inserts a new custom field definition into the default group header by position. |
| WML_ObjectRemoveFieldDefinition<br>Removes existing field definition from the default group header by position. |

| |
|---|
| WML_ObjectConvertSimpleToGroup<br>Converts a simple object to a group object. |

*Learning about Objects*

| Function Name and Description |
|---|
| WML_ObjectGetVolume<br>Retrieves the name of the volume on which the specified object is stored. |
| WML_ObjectGetCount<br>Retrieves the number of objects in a group object. |
| WML_ObjectGetPosition<br>Retrieves the position of an object in an open group object. |
| WML_ObjectFindFirst<br>Takes a snapshot of all object handles in the specified volume, stores them in cache memory, and returns the first object handle on the list to the application. |
| WML_ObjectFindNext<br>Returns the next object handle on the list to the application. |
| WML_ObjectGetNthObjectHandle<br>Retrieves the object handle for the object specified by its position in an open group object. |
| WML_ObjectGetObjectName<br>Retrieves the name associated with an object. |
| WML_ObjectSetObjectName<br>Associates a name with an object. |
| WML_ObjectGetDescription<br>Retrieves the description string of an object in a group object. |
| WML_ObjectSetDescription<br>Sets the description string of an object in a group object. |
| WML_ObjectGetDateStamp<br>Retrieves the date/time stamp of an object. |
| WML_ObjectGetProperty<br>Retrieves the property of an object. |

| |
|---|
| WML_ObjectSetProperty<br>Sets the property of an object. |
| WML_ObjectGetThumbNail<br>Retrieves the thumbnail bitmap associated with an object in a group object. |
| WML_ObjectSetThumbNail<br>Sets the thumbnail bitmap associated with an object in a group object. |
| WML_ObjectIsCheckedOut<br>Reports if the user has already checked out the object. |

*Technical Specifications*

WML_ObjectAddItem

Adds a link to an existing object to an opened group object.

Include Files

#include "wmobj.h"

Syntax

```
int FAR PASCAL WML_ObjectAddItem(
    HOBJECT         hObjHandle,
    LPVMHOBJECT     lpvmhObjHandle);
```

Parameters

*hObjHandle* Must be a valid group object handle returned from WML_ObjectOpen.

*lpvmhObjHandle* Pointer to the object handle of an existing object to be added to the opened group object specified by hObjHandle.

Usage Notes

Adding an existing object to an opened object has the effect of creating a link to an existing object into an opened object. The object must have write permission (be checked out) to add more objects to it. This function can be called only after an object is created or checked out and opened.

Return Values

WM_SUCCESS
WM_ERR_INVALID_OBJ_HANDLE

WM_ERR_NETWORK_ERROR
WM_ERR_OBJ_NOT_FOUND
WM_ERR_PERMISSION_DENIED
WM_ERR_VOLUME_MGR_ERROR
WM_ERR_VOLUME_NOT_FOUND

Related Functions

WML_ObjectRemoveItem

---

WML_ObjectCheckIn

Checks an object in to the Volume Manager.

Include Files

#include "wmobj.h"

Syntax

```
int FAR PASCAL WML_ObjectCheckIn(
    LPVMHOBJECT    lpvmhObjHandle,
    BOOL           bCommit);
```

Parameters

*bCommit* — Boolean variable that operates as follows:

- True — Adds the changes to the object permanently.
- False — Discards the changes.

*lpvmhObjHandle* — Pointer to the object handle of the object to be checked in.

Usage Notes

Performing a WML_ObjectCheckIn without commit (bCommit = FALSE) will not completely reverse all operations associated with the group. This simply reverses changes to the UNIX file representing the group on the group's volume. Consider the following example:

```
VMHOBJECT vmhGroup, vmhSimple; /* Assume initialized elsewhere */
HOBJECT hGroup;
WML_ObjectCheckOut(&vmhGroup);
WML_ObjectOpen(&vmhGroup, &hGroup);
/* This AddItem will bump the simple object's reference count */
WML_ObjectAddItem(hGroup, &vmhSimple);
WML_ObjectClose(hGroup);
WML_ObjectCheckIn(&vmhGroup, FALSE);
/* At this point, the group object no longer has the simple object as a member. */
/* Whoops, reference count for simple object is still bumped due to above AddItem call. Need to reverse. */
WML_ObjectDelete(&vmhSimple);
```

This affects other operations as well. WML_ObjectImportFromFile associates a simple object with a group much like AddItem. It also creates the simple object from a file on the workstation. If changes to the group are not committed, the simple object created by WML_ObjectImportFromFile will not be deleted. This must be done by the application.

The ramifications of checking in without committing changes should be evaluated and handled by the application software as necessary.

Return Values
WM_SUCCESS
WM_ERR_NETWORK_ERROR
WM_ERR_OBJ_NOT_CHECK_OUT
WM_ERR_OBJ_NOT_CLOSED
WM_ERR_OBJ_NOT_FOUND
WM_ERR_VOLUME_MGR_ERROR
WM_ERR_VOLUME_NOT_FOUND Related Functions
WML_ObjectCheckOut
WML_ObjectIsCheckedOut
WML_ObjectPutObject

---------

WML_ObjectCheckOut

Checks an object out from the Volume Manager.

Include Files
#include "wmobj.h"

Syntax

```
int FAR PASCAL WML_ObjectCheckOut(
    LPVMHOBJECT    lpvmhObjHandle);
```

Parameters

*lpvmhObjHandle* Pointer to the object handle.

Usage Notes
The operation fails if any object within the object is checked out.

Return Values
WM_SUCCESS
WM_ERR_NETWORK_ERROR
WM_ERR_OBJ_ALREADY_CHECK_OUT
WM_ERR_OBJ_NOT_FOUND
WM_ERR_VOLUME_MGR_ERROR
WM_ERR_VOLUME_NOT_FOUND Related Functions
WML_ObjectCheckIn
WML_ObjectIsCheckedOut
WML_ObjectPutObject

---

WML_ObjectClose

Closes an opened object.

Include Files

#include "wmobj.h"

Syntax int FAR PASCAL WML_ObjectClose(HOBJECT hObjHandle);

Parameters

*hObjHandle* Must be a valid object handle returned from WML_ObjectOpen.

Usage Notes

The resources held by an opened object are released when this function is called.

Return Values

WM_SUCCESS
WM_ERR_INVALID_OBJ_HANDLE
WM_ERR_NETWORK_ERROR
WM_ERR_VOLUME_MGR_ERROR

Related Functions

WML_ObjectOpen

---

WML_ObjectConvertSimpleToGroup

Converts a simple object to a group object.

Include Files

#include "wmobj.h"

Syntax

```
int FAR PASCAL WML_ObjectConvertSimpleToGroup(
     LPVMHOBJECT    lpvmhObjHandle);
```

Parameters

*lpvmhObjHandle* Pointer to the object handle of the object to be converted.

Usage Notes

After the conversion, the original simple object is added to the group object. The original object handle to the simple object now references the group object. To get the object handle of the simple object item just added, the application must open the group object and get the object handle of the first item.

Return Values

WM_SUCCESS
WM_ERR_INVALID_OBJ_HANDLE
WM_ERR_NETWORK_ERROR
WM_ERR_VOLUME_MGR_ERROR

---

WML_ObjectCreate

Creates a new object and returns the object handle of the newly created object.

Include Files

```
#include "wmobj.h"
```

Syntax

```
int FAR PASCAL WML_ObjectCreate(
    LPCSTR          lpszName,
    int nNameType,
    LPCSTR          lpszObjectName,
    LPCSTR          lpszPathname,
    UINT            nClass,
    UINT            nCompression,
    UINT            nEncryption,
    UINT            nSecurity,
    UINT            nFetchOperation,
    UINT            nAutoLaunch,
    UINT            nType,
    LPVMHOBJECT     lpvmhObjHandle);
```

Parameters

| | |
|---|---|
| *lpszName* | Volume name or family name. Specify null or an empty string to use the default volume name or family name. The default names are set during the Workstation library start up. Use WML_ObjectSetDefaultVolume to change them. All leading and trailing blanks will be stripped off internally before being used, but lpszName is not affected. |
| *nNameType* | NAME_VOLUME or NAME_FAMILY. |
| *lpszObjectName* | Object name to be associated with the new object. It must be specified if the object type is OBJECT_GROUP. If the object name is null or an empty string and the object type is not OBJECT_GROUP, the system uses the filename specified by lpszPathname as the object name. |
| *lpszPathname* | Full pathname of the file to be imported into the new object. It must be specified if the object type is not OBJECT_GROUP. It is ignored if the object type is OBJECT_GROUP. |
| *nClass* | Class of object being created. User defined. |
| *nCompression* | Type of compression used on the object. Valid values are between 0 and 255. User defined. |
| *nEncryption* | Type of encryption used on the object. Valid values are 0 through 255. User defined. |

| | |
|---|---|
| *nSecurity* | Security level of the object. User defined. |
| *nFetchOperation* | FETCH_ALL or FETCH_ON_DEMAND. |
| *nAutoLaunch* | LAUNCH_AUTO or LAUNCH_MANUAL. |
| *nType* | Integer that represents the viewing application that should be launched to view or update this object (for example, MS Word). Number 1, and the numbers 0–100, are reserved for group objects (OBJECT_GROUP). The rest are user defined. |
| *lpvmhObjHandle* | Pointer to an object handle used to store the object handle of the newly created object. |

Usage Notes

- Use care when naming a group object. A call to WML_ObjectGetObject to retrieve a group object creates a subdirectory on the local native file system to hold the objects in the group. The name given this subdirectory is the same as the name of the group object as defined by the lpszObjectName parameter. Therefore, group names should not duplicate the names of existing directories.
- To assign a type number to a viewing application, edit the wmcommon.ini file and add an entry for the viewing application to the [Object Type Attrib List] section. The entry must be in the following format:

ObjTypeNo.=ObjTypeName | Desc | ViewApp | ViewGlue | PrintApp | PrintGl ue

For example:

105=Word | MS Word Document | C:\WINWORD\WINWORD.EXE | WORD.WMV | C:\WINWORD\WINWORD.EXE | WORD.WMP

Return Values

WM_SUCCESS
WM_ERR_FAILED_OPEN_FILE
WM_ERR_FILE_NOT_FOUND
WM_ERR_INVALID_COMPRESSION
WM_ERR_INVALID_ENCRYPTION
WM_ER_INVALID_OBJECT_NAME
WM_ERR_INVALID_RESULT_BUFFER
WM_ERR_INVALID_NAME_TYPE
WM_ERR_NETWORK_ERROR
WM_ERR_OUT_OF_MEMORY
WM_ERR_TOO_MANY_OPEN_OBJECTS
WM_ERR_TOO_SMALL_RESULT_BUFFER
WM_ERR_VOLUME_MGR_ERROR
WM_ERR_VOLUME_NOT_FOUND
WM_ERR_VOLUME_FULL

Related Functions

WML_ObjectDelete
WML_ObjectConvertSimpleToGroup

---

WML_ObjectDelete

Decreases the reference count for the object specified by the object handle pointed to by lpvmhObjHandle. Then deletes the object when the count reaches zero.

Include Files

```
#include "wmobj.h"
```

Syntax

```
int FAR PASCAL WML_ObjectDelete(
    LPVMHOBJECT    lpvmhObjHandle,
    BOOL           bDeleteAll);
```

Parameters

*lpvmhObjHandle* — Pointer to the object handle of the object to be deleted.

*bDeleteAll* — Boolean variable that operates as follows:

- True—Deletes all objects and nested group objects in the object specified by lpvmhObjHandle.
- False—Cancels the operation if the group object is not empty.

If lpvmhObjHandle is a simple object, this parameter is ignored.

Usage Notes

If an object is a group object and bDeleteAll is True, then all objects in the group object, including nested group objects, have their reference counts decreased.

Return Values

WM_SUCCESS
WM_ERR_NETWORK_ERROR
WM_ERR_OBJ_ALREADY_CHECK_OUT
WM_ERR_OBJ_NOT_CLOSED
WM_ERR_OBJ_NOT_EMPTY
WM_ERR_OBJ_NOT_FOUND
WM_ERR_VOLUME_MGR_ERROR
WM_ERR_VOLUME_NOT_FOUND

Related Functions

WML_ObjectCreate

---

WML_ObjectExportToFile

Exports an object to the native file system.

Include Files

#include "wmobj.h"

Syntax

```
int FAR PASCAL WML_ObjectExportToFile(
    HOBJECT        hObjectHandle,
    LPVMHOBJECT    lpvmhObjHandle,
    LPCSTR         lpszDirectory,
    LPCSTR         lpszFilename,
    BOOL           bOverwrite);
```

Parameters

| | |
|---|---|
| *hObjHandle* | Must be a valid group object handle returned from WML_ObjectOpen. |
| *lpvmhObjHandle* | Pointer to the object handle of the object in the specified group object to be exported. |
| *lpszDirectory* | Directory to store the exported object. |
| *lpszFilename* | Native filename to be used as the exported file. If it is null or an empty string, the object name is used as the native filename. A filename longer than the maximum filename length imposed by the native file system is truncated. |
| *bOverwrite* | A boolean variable that operates as follows:<br>n True Overwrites an existing filename, if found.<br>n False Cancels the operation if a file exists. |

Return Values

WM_SUCCESS
WM_ERR_DISK_FULL
WM_ERR_FILE_EXIST
WM_ERR_INVALID_DIRECTORY
WM_ERR_INVALID_OBJ_HANDLE
WM_ERR_NETWORK_ERROR
WM_ERR_NOT_SIMPLE_OBJECT
WM_ERR_OBJ_NOT_FOUND
WM_ERR_VOLUME_MGR_ERROR
WM_ERR_VOLUME_NOT_FOUND

Related Functions

WML_ObjectImportFromFile

----------

WML_ObjectFindFirst

Takes a snapshot of all object handles in the specified volume, stores them in cache memory, and returns the first object handle on the list to the application.

Include Files

#include "wmobj.h"

Syntax

```
int FAR PASCAL WML_ObjectFindFirst(
    LPCSTR          lpszVolName,
    LPVMHOBJECT     lpvmhObjHandle);
```

Parameters

*lpszVolName* Must be valid volume name. If NULL or an empty string, default volume will be used.

*lpvmhObjHandle* Pointer to the result object.

Usage Notes

A subsequent call to WML_ObjectFindNext gets the next object handle from the list in the cache memory. Because this function uses cache memory from global heap to store the list, when an application no longer needs the list it should call WML_ObjectReleaseResource to free the list. The WML_ObjectReleaseResource call prevents a situation where the list will not be free until the application terminates. The order of object handles in the list is implementation dependent and not necessarily the order in which objects have been put into the system.

Return Values

WM_SUCCESS
WM_ERR_INVALID_RESULT_BUFFER
WM_ERR_NETWORK_ERROR
WM_ERR_NO_MORE_OBJECT
WM_ERR_OUT_OF_MEMORY
WM_ERR_TOO_SMALL_RESULT_BUFFER
WM_ERR_VOLUME_MGR_ERROR
WM_ERR_VOLUME_NOT_FOUND

Related Functions

WML_ObjectFindNext
WML_ObjectReleaseResource

----------

WML_ObjectFindNext

Returns the next object handle on the list to the application.

Include Files

#include "wmobj.h"

Syntax

```
int FAR PASCAL WML_ObjectFindNext(
    LPVMHOBJECT    lpvmhObjHandle);
```

Parameters

*lpvmhObjHandle* Pointer to the result object.

Usage Notes

The list is a snapshot of objects from cache memory in the WML_ObjectFindFirst call.

Return Values

WM_SUCCESS
WM_ERR_NO_MORE_OBJECT

Related Functions

WML_ObjectFindFirst

---

WML_ObjectGetCount

Retrieves the number of objects in a group object.

Include Files

```
#include "wmobj.h"
```

Syntax

```
int FAR PASCAL WML_ObjectGetCount(
    HOBJECT        hObjHandle,
    LPUINT         lpnObjectCount);
```

Parameters

*hObjHandle* Must be a valid object handle returned from WML_ObjectOpen.

*lpnObjectCount* Pointer to an object handle used to store the number of objects in the object group.

Usage Notes

The function does not recurse into nested group objects, if any, in the group.

Return Values

WM_SUCCESS
WM_ERR_INVALID_OBJ_HANDLE
WM_ERR_INVALID_RESULT_BUFFER
WM_ERR_NETWORK_ERROR
WM_ERR_VOLUME_MGR_ERROR

Related Functions

WML_ObjectGetPosition

----------

WML_ObjectGetDateStamp

Retrieves the date/time stamp of an object.

Include Files

```
#include "wmobj.h"
```

Syntax

```
int FAR PASCAL WML_ObjectGetDateStamp(
    LPVMHOBJECT    lpvmhObjHandle,
    LPSTR          lpszDateString,
    LPSTR          lpszTimeString);
```

Parameters

| | |
|---|---|
| *lpvmhObjHandle* | Pointer to an object handle. |
| *lpszDateString* | Pointer to an object handle used to store the date string of the object. Use null to prevent the date string. The date string is returned in mm/dd/yy format. |
| *lpszTimeString* | Pointer to an object handle used to store the time string of the object. Use null to prevent the time string. The time string is returned in hh:mm:ss format. |

Return Values

WM_SUCCESS
WM_ERR_INVALID_RESULT_BUFFER
WM_ERR_NETWORK_ERROR
WM_ERR_OBJ_NOT_FOUND
WM_ERR_OUT_OF_MEMORY
WM_ERR_TOO_SMALL_RESULT_BUFFER
WM_ERR_VOLUME_MGR_ERROR
WM_ERR_VOLUME_NOT_FOUND

----------

WML_ObjectGetDefaultVolume

Retrieves the default volume name or the family name.

Include Files

```
#include "wmobj.h"
```

Syntax

```
int FAR PASCAL WML_ObjectGetDefaultVolume(
    int nNameType,
    LPSTR          lpszVolumeName,
    int nBufLen);
```

Parameters

| | |
|---|---|
| *nNameType* | NAME_VOLUME or NAME_FAMILY. |
| *lpszVolumeName* | Pointer to a buffer used to store the default volume name. |

| | |
|---|---|
| *nBufLen* | Size of the returned result buffer pointed to by lpszVolumeName, including a null character. |

Usage Notes

The default volume or family name is used when an application calls an object function without specifying a volume or family name.

Return Values

- WM_SUCCESS
- WM_ERR_INVALID_NAME_TYPE
- WM_ERR_INVALID_RESULT_BUFFER
- WM_ERR_NETWORK_ERROR
- WM_ERR_TOO_SMALL_RESULT_BUFFER
- WM_ERR_VOLUME_MGR_ERROR

Related Functions

- WML_ObjectSetDefaultVolume
- WML_ObjectCreate
- WML_ObjectFindFirst

---

WML_ObjectGetDescription

Retrieves the description string of an object in a group object.

Include Files

```
#include "wmobj.h"
```

Syntax

```
int FAR PASCAL WML_ObjectGetDescription(
    HOBJECT        hObjHandle,
    LPVMHOBJECT    lpvmhObjectHandle,
    int nPosition,
    int nMode,
    int nBufLen,
    LPSTR          lpszDescription);
```

Parameters

| | | |
|---|---|---|
| *hObjHandle* | Object handle of a group object returned from WML_ObjectOpen. | |
| *lpvmhObjectHandle* | Depends on the value of the *nMode* parameter: | |
| | BY_OBJECT_HANDLE | Requires a valid object handle of an object in the specified group object. |
| | BY_POSITION | Ignored. |
| *nPosition* | Depends on the value of the *nMode* parameter: | |
| | BY_POSITION | Requires a valid position of an object in the specified group object. |

| | | |
|---|---|---|
| | BY_OBJECT_HANDLE | Ignored. |
| | The position is zero-based and ranges from 0 through N-1: | |
| | 0 | First object position in the group object. |
| | N-1 | Last object position in the group object. |
| | -1 | Last object when the total number of objects is unknown before the call. |
| *nMode* | BY_OBJECT_HANDLE or BY_POSITION. | |
| *nBufLen* | Maximum number of bytes to copy. | |
| *lpszDescription* | Pointer to the object handle used to store the description string. | |

Usage Notes

Each object in the group object has a space for storing a description string that the application uses to associate the string with that object. The application must set this description or else calls to WML_ObjectGetDescription will return an empty string.

----------

Return Values

WM_SUCCESS
WM_ERR_INVALID_OBJ_HANDLE
WM_ERR_INVALID_MODE
WM_ERR_INVALID_POSITION
WM_ERR_INVALID_RESULT_BUFFER
WM_ERR_NETWORK_ERROR
WM_ERR_OBJ_NOT_FOUND
WM_ERR_TOO_SMALL_RESULT_BUFFER
WM_ERR_VOLUME_MGR_ERROR

Related Functions

WML_ObjectSetDescription

---------

WML_ObjectGetFamily

Gets the description string of an object in the group object.

Include Files

#include "wmobj.h"

Syntax

```
int FAR PASCAL WML_ObjectGetFamily(
    LPCVMHOBJECT  lpvmhObjectHandle,
    HOBJECT       hObjHandle,
```

LPSTR *lpszFamily*);

Parameters

| | |
|---|---|
| *lpvmhObjectHandle* | If not NULL (hObjHandle must be zero), specifies an object handle to get the family name. |
| *hObjHandle* | If not zero (lpvmhObjectHandle must be null), specifies an opened group object handle to get the family name. |
| *lpszFamily* | Pointer to family name. |

Usage Notes

Each object in the group object contains a space to store a description string. The application uses the description string to associate to an object in the group object. The application must set this description to prevent an empty string result for calls to WML_ObjectGetDescription.

Return Values

WM_SUCCESS
WM_ERR_AMBIGUOUS_PARAMETERS
WM_ERR_INVALID_OBJ_HANDLE
WM_ERR_INVALID_RESULT_BUFFER
WM_ERR_NETWORK_ERROR
WM_ERR_OBJ_NOT_FOUND
WM_ERR_TOO_SMALL_RESULT_BUFFER
WM_ERR_VOLUME_MGR_ERROR

Related Functions

WML_ObjectGetDescription

---------

WML_ObjectGetFieldDefinition

Gets the current field definition by position.

Include Files

#include "wmobj.h"

Syntax

```
int FAR PASCAL WML_ObjectGetFieldDefinition(
    int nPosition,
    LPSTR       lpszFieldName,
    LPINT       lpnFieldType,
    LPINT       lpnFieldLength)
```

Parameters

| | |
|---|---|
| *nPosition* | Zero based field position where 0 is the first position and so on. Specify -1 for the last field position. |
| *lpszFieldName* | Pointer to field name. |
| *lpnFieldType* | Pointer to field type. |
| *lpnFieldLength* | Pointer to field length. |

Usage Notes

The object library maintains a header that defines the group object. An application can customize the group object by using get, insert, or remove field definition functions on the group object header. Changes to the group object header affect only new group objects. Group objects with different headers can be mixed within the system. However, after an object is created, its header cannot be changed.

Return Values

WM_SUCCESS
WM_ERR_INVALID_POSITION
WM_ERR_INVALID_RESULT_BUFFER

Related Functions

WML_ObjectInsertFieldDefinition
WML_ObjectRemoveFieldDefinition

----------

WML_ObjectGetNthObjectHandle

Retrieves the object handle for the object specified by its position in an open group object.

Include Files

```
#include "wmobj.h"
```

Syntax

```
int FAR PASCAL WML_ObjectGetNthObjectHandle(
     HOBJECT          hObjHandle,
     int nPosition,
     LPVMHOBJECT      lpvmhObjHandle);
```

Parameters

| | |
|---|---|
| *hObjHandle* | Must be a valid object handle returned from WML_ObjectOpen. |
| *nPosition* | Specifies an object by the position of the object in an open object. This value is a zero-based. Valid values are 0 through N-1. Specify -1 for the last object. |
| *lpvmhObjHandle* | Pointer to the object handle used to store the object handle. |

Return Values

WM_SUCCESS
WM_ERR_INVALID_OBJ_HANDLE
WM_ERR_INVALID_POSITION
WM_ERR_INVALID_RESULT_BUFFER
WM_ERR_NETWORK_ERROR
WM_ERR_TOO_SMALL_RESULT_BUFFER
WM_ERR_VOLUME_MGR_ERROR

Related Functions

WML_ObjectGetPosition

---

WML_ObjectGetNthVolume

Retrieves the nth volume name from the volume list.

Include Files

```
#include "wmobj.h"
```

Syntax

```
int FAR PASCAL WML_ObjectGetNthVolume(
    int nPosition,
    LPSTR       lpszVolumeName,
    int nBufLen);
```

Parameters

*nPosition* Position of the volume name in the list. It is a zero-based value specified as follows:

0 First volume name in the list.

1... Second name on the list....

N-1 Last name in the list.

-1 Last volume name in the list.

*lpszVolumeName* Pointer to a buffer used to store the default volume name.

*nBufLen* Size of the result buffer pointed to by lpszVolumeName, including a null character.

Usage Notes

To get all volume names from the list, call this function iteratively with incremental nPosition values until it returns WM_ERR_INVALID_VOLUME_POSITION.

Return Values

WM_SUCCESS
WM_ERR_INVALID_RESULT_BUFFER
WM_ERR_INVALID_VOLUME_POSITION
WM_ERR_NETWORK_ERROR
WM_ERR_TOO_SMALL_RESULT_BUFFER
WM_ERR_VOLUME_MGR_ERROR

Related Functions

WML_ObjectGetVolume
WML_ObjectGetDefaultVolume
WML_ObjectSetDefaultVolume

WML_ObjectGetObject

Downloads an object from the Volume Manager to a local disk.

Include Files

```
#include "wmobj.h"
```

Syntax

```
int FAR PASCAL WML_ObjectGetObject(
    LPVMHOBJECT     lpvmhObjHandle,
    LPCSTR          lpszDirectory,
    LPCSTR          lpszFilename,
    int nRecursiveLevel,
    BOOL            bOverwrite);
```

Parameters

| | |
|---|---|
| *lpvmhObjHandle* | Pointer to the object handle to download. |
| *lpszDirectory* | Directory to store downloaded object. |
| *lpszFilename* | Native filename to be used to download the object. If it is null or an empty string, the object filename is used as the native filename. A filename longer than the maximum filename length imposed by native file system is truncated.<br><br>This parameter is ignored when downloading a group object; all downloaded objects from the group object are stored with object name associated with each object. |
| *nRecursiveLevel* | Applies only to group objects and is ignored when applied to simple objects. It specifies how deep the function should recurse into nested group objects, as follows:<br><br>0 Get all of the simple objects.<br><br>1 Recurse one level deep into nested group objects, but no more.<br><br>-1 Recurse into all levels.<br><br>Specifying a value larger than the deepest level recurses into the deepest level. |
| *bOverwrite* | Boolean variable that operates as follows:<br><br>True Overwrites an existing file, if found.<br><br>False Aborts the operation if a file exists. |

Usage Notes

Applying this function to a simple object downloads the object from the Volume Manager to a local file system. Applying it to a group object downloads all objects in the group object, including nested group objects, to a local file system. When the group object holds nested group objects, the group object name is used to create a subdirectory to store all downloaded files from that group object. The function applies this process recursively to all nested group objects.

Return Values
WM_SUCCESS
WM_ERR_CREATE_FILE_FAILED
WM_ERR_DISK_FULL
WM_ERR_FILE_EXIST
WM_ERR_INVALID_DIRECTORY
WM_ERR_INVALID_OBJ_HANDLE
WM_ERR_INVALID_RECURSIVE_LEVEL
WM_ERR_NETWORK_ERROR
WM_ERR_NO_MORE_FILE_HANDLE
WM_ERR_OBJ_NOT_FOUND
WM_ERR_OUT_OF_MEMORY
WM_ERR_VOLUME_MGR_ERROR
WM_ERR_VOLUME_NOTFOUND

----------

WML_ObjectGetObjectName

Retrieves the name associated with an object.

Include Files

#include "wmobj.h"

Syntax

```
int FAR PASCAL WML_ObjectGetObjectName(
    LPVMHOBJECT    lpvmhObjHandle,
    LPSTR          lpszObjName,
    int nBufLen);
```

Parameters

| | |
|---|---|
| *lpvmhObjHandle* | Object handle to get an associated name. |
| *lpszObjName* | Pointer to the location to store the object name string. |
| *nBufLen* | Size of the object name buffer, including a null character. |

Return Values
WM_SUCCESS
WM_ERR_INVALID_OBJ_HANDLE
WM_ERR_INVALID_RESULT_BUFFER
WM_ERR_NETWORK_ERROR
WM_ERR_OBJ_NOT_FOUND
WM_ERR_OUT_OF_MEMORY
WM_ERR_TOO_SMALL_RESULT_BUFFER
WM_ERR_VOLUME_MGR_ERROR
WM_ERR_VOLUME_NOT_FOUND Related Functions
WML_ObjectSetObjectName

---

WML_ObjectGetPosition

Retrieves the position of an object in an open group object.

Include Files

#include "wmobj.h"

Syntax

```
int FAR PASCAL WML_ObjectGetPosition(
    HOBJECT        hObjHandle,
    LPVVMHOBJECT   lpvmhObjHandle,
    LPUINT         lpnPosition);
```

Parameters

| | |
|---|---|
| *hObjHandle* | Must be a valid group object handle returned from WML_ObjectOpen. |
| *lpvmhObjHandle* | Pointer to the handle of the object in the specified group object. |
| *lpnPosition* | Pointer to the location to store the position of lpvmhObjHandle in the hObjHandle group object. |

Return Values

WM_SUCCESS
WM_ERR_INVALID_OBJ_HANDLE
WM_ERR_INVALID_RESULT_BUFFER
WM_ERR_NETWORK_ERROR
WM_ERR_OBJ_NOT_FOUND
WM_ERR_VOLUME_MGR_ERROR
WM_ERR_VOLUME_NOT_FOUND

Related Functions

WML_ObjectFindFirst
WML_ObjectMove

---

WML_ObjectGetProperty

Retrieves the property of an object.

Include Files

#include "wmobj.h"

Syntax

```
int FAR PASCAL WML_ObjectGetProperty(
    LPVMHOBJECT    lpvmhObjHandle,
    UINT           nPropertyType,
    LPUINT         lpnProperty);
```

Parameters

| | |
|---|---|
| *lpvmhObjHandle* | Pointer to the object for which you want to retrieve properties. |
| *nPropertyType* | Type of object properties you want to retrieve:<br>PROPERTY_CLASS,<br>PROPERTY_COMPRESSION,<br>PROPERTY_ENCRYPTION,<br>PROPERTY_SECURITY,<br>PROPERTY_OBJTYPE,<br>PROPERTY_FETCH,<br>PROPERTY_LAUNCH. |
| *lpnProperty* | Pointer to the location to store the object properties. |

Return Values

WM_SUCCESS
WM_ERR_INVALID_PROPERTY_TYPE
WM_ERR_INVALID_RESULT_BUFFER
WM_ERR_NETWORK_ERROR
WM_ERR_OBJ_NOT_FOUND
WM_ERR_VOLUME_MGR_ERROR
WM_ERR_VOLUME_NOT_FOUND

Related Functions

WML_ObjectSetProperty

---

WML_ObjectGetThumbNail

Retrieves the thumbnail bitmap associated with an object in a group object.

Include Files

```
#include "wmobj.h"
```

Syntax

```
int FAR PASCAL WML_ObjectGetThumbNail(
    HOBJECT         hObjHandle,
    LPVMHOBJECT     lpvmhObjectHandle,
    int nPosition,
    int nMode,
    int nBufLen,
    LPVOID          lpResultBuf,
    LPUINT          lpnBitsPerPixel);
```

Parameters

| | |
|---|---|
| *hObjHandle* | Must be a valid group object handle returned from WML_ObjectOpen. |
| *lpvmhObjectHandle* | Depends on the value of the nMode parameter:<br>BY_OBJECT_HANDLE — Requires a valid object handle of an object in the specified group object. |

| | | |
|---|---|---|
| | BY_POSITION | Ignored. |
| *nPosition* | Depends on the value of the nMode parameter: | |
| | BY_POSITION | Requires a valid position of an object in the specified group object. |
| | BY_OBJECT_HANDLE | Ignored. |
| | The position is zero-based and ranges from 0 through N-1. | |
| | 0 | First object position in the group object. |
| | N-1 | Last object position in the group object. |
| | -1 | Last object when the total number of objects is unknown before the call. |
| *nMode* | BY_OBJECT_HANDLE or BY_POSITION. | |
| *nBufLen* | Size of result buffer. | |
| *lpResultBuf* | Pointer to a buffer used to store the bitmap. | |
| *lpnBitsPerPixel* | Pointer to an unsigned integer used to store the number of bits per pixel of the thumbnail bitmap. | |

Usage Notes

Each object in the group object has a space for storing a thumbnail bitmap that the application uses to associate the thumbnail bitmap with that object. The application must set this thumbnail bitmap or else calls to this function will return an empty bitmap.

Return Values

WM_SUCCESS
WM_ERR_INVALID_OBJ_HANDLE
WM_ERR_INVALID_MODE
WM_ERR_INVALID_POSITION
WM_ERR_INVALID_RESULT_BUFFER
WM_ERR_NETWORK_ERROR
WM_ERR_OBJ_NOT_FOUND
WM_ERR_TOO_SMALL_RESULT_BUFFER
WM_ERR_VOLUME_MGR_ERROR

Related Functions

WML_ObjectSetThumbNail

---

WML_ObjectGetVolume

Retrieves the name of the volume on which the specified object is stored.

Include Files

#include "wmobj.h"

Syntax

```
int FAR PASCAL WML_ObjectGetVolume(
    LPVMHOBJECT   lpvmhObjHandle,
    HOBJECT       hObjHandle,
    LPSTR         lpszVolumeName);
```

Parameters

| | |
|---|---|
| *lpvmhObjHandle* | Pointer to an object handle. If null, hObjhandle must specify a valid open group object handle. |
| *hObjHandle* | Object handle returned from WML_ObjectOpen. If non-zero, lpvmhObjHandle must be null. |
| *lpszVolumeName* | Pointer to an object handle used to store volume name. |

Usage Notes

If parameter lpvmhObjHandle is not null, the value for parameter hObjHandle must be zero and vice versa. It is an error if both parameters specify non-null and non-zero.

Return Values

WM_SUCCESS
WM_ERR_AMBIGUOUS_PARAMETERS
WM_ERR_INVALID_OBJ_HANDLE
WM_ERR_INVALID_RESULT_BUFFER
WM_ERR_NETWORK_ERROR
WM_ERR_OBJ_NOT_FOUND
WM_ERR_TOO_SMALL_RESULT_BUFFER
WM_ERR_VOLUME_MGR_ERROR
WM_ERR_VOLUME_NOT_FOUND

Related Functions

WML_ObjectGetDefaultVolume
WML_ObjectSetDefaultVolume

---

WML_ObjectImportFromFile
Imports a native file system document into an open object.

Include Files
#include "wmobj.h"

Syntax
```
int FAR PASCAL WML_ObjectImportFromFile(
    HOBJECT         hObjHandle,
    int nPosition,
    LPCSTR          lpszDirectory,
    LPCSTR          lpszFilename,
    UINT            nClass,
    UINT            nCompression,
    UINT            nEncryption,
    UINT            nSecurity,
    UINT            nFetchOperation,
    UINT            nAutoLaunch,
    UINT            nType,
    LPVMHOBJECT     lpvmhObjHandle);
```

Parameters

| | |
|---|---|
| *hObjHandle* | Must be a valid object handle returned from WML_ObjectOpen. |
| *nPosition* | Specifies the position of the imported object in the opened group object that it is being imported to. This value is zero-based. Valid values are 0 through N-1. Value -1 appends the imported object to the open object. The positions of all objects located after the imported position will move down by one position. |
| *lpszDirectory* | Directory where the imported native file resides. |
| *lpszFilename* | Native filename to be imported into an object. This filename will be associated with an imported object. |
| *nClass* | Class of the new object. User defined. |
| *nCompression* | Type of compression used on the new object. User defined. |
| *nEncryption* | Type of encryption used on the new object. User defined. |
| *nSecurity* | Security level of the new object. User defined. |
| *nFetchOperation* | FETCH_ALL or FETCH_ON_DEMAND. |
| *nAutoLaunch* | LAUNCH_AUTO or LAUNCH_MANUAL. |
| *nType* | Type of the new object. |
| *lpvmhObjHandle* | Returned object handle to the newly created object. |

---

Return Values
WM_SUCCESS
WM_ERR_FILE_NOT_FOUND

WM_ERR_INVALID_DIRECTORY
WM_ERR_INVALID_OBJ_HANDLE
WM_ERR_INVALID_POSITION
WM_ERR_INVALID_RESULT_BUFFER
WM_ERR_NETWORK_ERROR
WM_ERR_NOT_SIMPLE_OBJECT
WM_ERR_OUT_OF_MEMORY
WM_ERR_TOO_SMALL_RESULT_BUFFER
WM_ERR_VOLUME_MGR_ERROR

Related Functions
WML_ObjectExportToFile

---

WML_ObjectInitialize

Initializes object library for the current task.

Include Files
#include "wmobj.h"

Syntax
int FAR PASCAL WML_ObjectInitialize(void)

Parameters
None.

Usage Notes
Each application must call this function before calling any other function in the object library. Also, each application must call WML_ObjectTerminate when the application no longer needs the object library. In addition, all Fourth Generation Language applications must call SL_Init and SL_Done as the first and last calls to OM libraries.

Return Values
WM_SUCCESS
WM_ERR_NETWORK_ERROR

Related Functions
WML_ObjectTerminate
SL_Init
SL_Done

---

WML_ObjectInsertFieldDefinition

Inserts a new custom field definition into the default group header by position.

Include Files
#include "wmobj.h"

Syntax

```
int FAR PASCAL WML_ObjectInsertFieldDefinition(
    int nPosition,
    LPSTR          lpszFieldName,
    int nFieldType,
    int nFieldLength)
```

Parameters

| | |
|---|---|
| nPosition | Zero based field position where 0 is the first position and so on. Specify -1 for the last field position. Except the last position specified with -1, all fields that start from the specified position are shifted up by 1 position. |
| *lpszFieldName* | Pointer to field name. The string length must not be longer than 20 characters including a null termination character. |
| *nFieldType* | The field types are:<br>FIELD_TYPE_NUMERIC<br>FIELD_TYPE_LONG<br>FIELD_TYPE_STRING<br>FIELD_TYPE_BINARY |
| *nFieldLength* | Length of the field. |

Usage Notes

The object library maintains a header that defines the group object. An application can customize the group object by using get, insert, or remove field definition functions on the group object header. Changes to the group object header affect only new group objects created by the workstation. Other workstations might have different group object headers. Group objects with different headers can be mixed within the system. After an object is created, its header cannot be changed.

Return Values

WM_SUCCESS
WM_ERR_INVALID_FIELD_NAME
WM_ERR_INVALID_POSITION
WM_ERR_INVALID_FIELD_TYPE
WM_ERR_INVALID_FIELD_LENGTH

Related Functions

WML_ObjectGetFieldDefinition
WML_ObjectRemoveFieldDefinition

---------

WML_ObjectIsCheckedOut

Reports if the user has already checked out the object.

Include Files

#include "wmobj.h"

Syntax

```
int FAR PASCAL WML_ObjectIsCheckedOut(
    LPVMHOBJECT    lpvmhObjHandle,
    LPBOOL         lpbCheckedOut);
```

Parameters

*lpvmhObjHandle* Pointer to the object for check-out validation.

*lpbCheckedOut* Pointer to the location to store the result.

True — The user has already checked out the object.

False — The user has not checked out the object.

Return Values

WM_SUCCESS
WM_ERR_INVALID_RESULT_BUFFER
WM_ERR_NETWORK_ERROR
WM_ERR_OBJ_NOT_FOUND
WM_ERR_VOLUME_MGR_ERROR
WM_ERR_VOLUME_NOT_FOUND

Related Functions

WML_ObjectCheckIn
WML_ObjectCheckOut

---

WML_ObjectMove

Moves an object from one position to another position within a group object.

Include Files

#include "wmobj.h"

Syntax

```
int FAR PASCAL WML_ObjectMove(
    HOBJECT        hObjHandle,
    int nFromPosition,
    int nToPosition);
```

Parameters

*hObjHandle* Must be a valid object handle returned from WML_ObjectOpen.

*nFromPosition* Object position to move from. This is a zero-based value. Valid values are 0 through N-1. Value -1 specifies the last object in the object group.

*nToPosition* Object position to move to. This is a zero-based value. Valid values are 0 through N-1. Value -1 specifies the last object in the object group.

Return Values

WM_SUCCESS
WM_ERR_INVALID_OBJ_HANDLE

WM_ERR_INVALID_POSITION
WM_ERR_NETWORK_ERROR
WM_ERR_VOLUME_MGR_ERROR

Related Functions

WML_ObjectFindFirst
WML_ObjectGetPosition

---

WML_ObjectOpen

Opens a group object.

Include Files

```
#include "wmobj.h"
```

Syntax

```
int FAR PASCAL WML_ObjectOpen(
    LPVMHOBJECT   lpvmhObjHandle,
    LPHOBJECT     lphObjectHandle);
```

Parameters

| | |
|---|---|
| *lpvmhObjHandle* | Pointer to the group object you want to open. |
| *lphObjectHandle* | Pointer to the location to store the opened object handle. |

Usage Notes

This function applies only to group objects. The opened object handle is needed by functions such as WML_ObjectExportToFile, WML_ObjectGetCount, and so on.

Return Values

WM_SUCCESS
WM_ERR_FAILED_CREATE_DIR
WM_ERR_INVALID_RESULT_BUFFER
WM_ERR_NETWORK_ERROR
WM_ERR_NOT_GROUP_OBJECT
WM_ERR_OBJ_NOT_FOUND
WM_ERR_TOO_MANY_OPEN_OBJECTS
WM_ERR_VOLUME_FULL
WM_ERR_VOLUME_MGR_ERROR
WM_ERR_VOLUME_MGR_NOT_RESPOND
WM_ERR_VOLUME_NOT_FOUND

Related Functions

WML_ObjectOpen

----------

WML_ObjectPutObject

Changes the contents of a simple object in the Volume Manager.

Include Files

#include "wmobj.h"

Syntax

```
int FAR PASCAL WML_ObjectPutObject(
    LPVMHOBJECT    lpvmhObjHandle
    LPCSTR         lpszPathname);
```

Parameters

*lpvmhObjHandle* Object handle to download.

*lpszPathname* Pathname of the file to be used to replace the contents of the specified object.

Usage Notes

This function temporarily changes the contents of the object. Changing the object contents permanently on the optical drive requires a call to WML_ObjectCheckIn with bCommit set to True. Before calling this function, the application must have checked out the object using WML_ObjectCheckOut.

Return Values

WM_SUCCESS
WM_ERR_FILE_NOT_FOUND
WM_ERR_INVALID_RECURSIVE_LEVEL
WM_ERR_NETWORK_ERROR
WM_ERR_NOT_SIMPLE_OBJECT
WM_ERR_OBJ_NOT_FOUND
WM_ERR_OUT_OF_MEMORY
WM_ERR_VOLUME_MGR_ERROR
WM_ERR_VOLUME_NOT_FOUND

Related Functions

WML_ObjectCheckIn
WML_ObjectCheckOut
WML_ObjectIsCheckedOut

----------

WML_ObjectReleaseResource

Releases the memory resource from the global heap held by the library on behalf of an application.

Include Files

#include "wmobj.h"

Syntax
```
WINAPI WML_ObjectReleaseResource(void)
```

Parameters
None.

Usage Notes
When an application calls WML_ObjectFindFirst or WML_ObjectFindNext, memory resources are held by the object library in global heap. When the application repeats all of the functions until there are no object handles remaining, the memory resources are released automatically. However, if an application only needs to find a few objects from the list, the application should call this function to release memory resources. The application can call this function at any time when it no longer needs to call WML_ObjectFindNext.

Return Values
None.

Related Functions
WML_ObjectFindFirst
WML_ObjectFindNext

----------

WML_ObjectRemoveFieldDefinition

Removes existing field definition from the default group header by position.

Include Files
```
#include "wmobj.h"
```

Syntax
```
int FAR PASCAL WML_ObjectRemoveFieldDefinition(
    int                 nPosition);
```

Parameters

*nPosition* Zero based field position where 0 is the first position and so on. Specify -1 for the last field position. Except the last position specified with -1, all fields that start from the specified position are shifted down by 1 position.

Usage Notes
The object library maintains a header that defines the group object. An application can customize the group object by using get, insert, or remove field definition functions on the group object header. Changes to the group object header affect only new group objects. Group objects with different headers can be mixed within the system. However, after an object is created, its header cannot be changed. Object Manager accesses Object Manager system fields on the group object header; therefore, these fields should not be removed.

Return Values
WM_SUCCESS

WM_ERR_INVALID_POSITION

Related Functions
WML_ObjectGetFieldDefinition
WML_ObjectInsertFieldDefinition

---------

WML_ObjectRemoveItem

Removes an object from a group object.

Include Files

```
#include "wmobj.h"
```

Syntax

```
int FAR PASCAL WML_ObjectRemoveItem(
    HOBJECT          hObjHandle,
    LPVMHOBJECT      lpvmhObjHandle);
```

Parameters

| | |
|---|---|
| *hObjHandle* | Must be a valid group object handle returned from WML_ObjectOpen. |
| *lpvmhObjHandle* | Pointer to the object you want to remove from the specified group. |

Return Values
WM_SUCCESS
WM_ERR_INVALID_OBJ_HANDLE
WM_ERR_NETWORK_ERROR
WM_ERR_OBJ_NOT_FOUND
WM_ERR_VOLUME_MGR_ERROR
WM_ERR_VOLUME_NOT_FOUND Related Functions
WML_ObjectAddItem

---------

WML_ObjectSetDefaultVolume

Sets the default volume name.

Include Files

```
#include "wmobj.h"
```

Syntax

```
int FAR PASCAL WML_ObjectSetDefaultVolume(
    int nNameType,
    LPCSTR           lpszVolumeName);
```

Parameters

| | |
|---|---|
| *nNameType* | NAME_VOLUME or NAME_FAMILY. |
| *lpszVolumeName* | New volume name. It must terminate with a null character. |

Return Values

WM_SUCCESS
WM_ERR_INVALID_NAME_TYPE
WM_ERR_INVALID_VOLUME_NAME
WM_ERR_VOLUME_MGR_ERROR

Related Functions

WML_ObjectGetDefaultVolume
WML_ObjectGetNthVolume
WML_ObjectGetVolume

---

WML_ObjectSetDescription

Sets the description string of an object in a group object.

Include Files

#include "wmobj.h"

Syntax

```
int FAR PASCAL WML_ObjectSetDescription(
    HOBJECT         hObjHandle,
    LPVMHOBJECT     lpvmhObjectHandle,
    int nPosition,
    int nMode,
    LPCSTR          lpszDescription);
```

Parameters

*hObjHandle* — Must be a valid group object handle returned from WML_ObjectOpen.

*lpvmhObjectHandle* — Depends on the value of the *nMode* parameter:

| | |
|---|---|
| BY_OBJECT_HANDLE | Requires a valid object handle of an object in the specified group object. |
| BY_POSITION | Ignored. |

*nPosition* — Depends on the value of the *nMode* parameter:

| | |
|---|---|
| BY_POSITION | Requires a valid position of an object in the specified group object. |
| BY_OBJECT_HANDLE | Ignored. |

The position is zero-based and ranges from 0 through N-1.

| | |
|---|---|
| 0 | First object position in the group object. |
| N-1 | Last object position in the group object. |
| -1 | Last object when the total number of objects is unknown before the call. |

| | |
|---|---|
| *nMode* | BY_OBJECT_HANDLE or BY_POSITION. |
| *lpszDescription* | Pointer to the new description string. Specify null or an empty string to empty out the current description. |

Usage Notes

Each object in the group object has a space for storing a description string that the application uses to associate the string with that object. The application must set this description or else calls to WML_ObjectGetDescription will return an empty string.

Return Values

WM_SUCCESS
WM_ERR_INVALID_OBJ_HANDLE
WM_ERR_INVALID_MODE
WM_ERR_INVALID_POSITION
WM_ERR_NETWORK_ERROR
WM_ERR_OBJ_NOT_FOUND
WM_ERR_VOLUME_MGR_ERROR

Related Functions

WML_ObjectGetDescription

----------

WML_ObjectSetObjectName

Associates a name with an object.

Include Files

#include "wmobj.h"

Syntax

```
int FAR PASCAL WML_ObjectSetObjectName(
        LPVMHOBJECT    lpvmhObjHandle,
        LPCSTR         lpszObjName);
```

Parameters

| | |
|---|---|
| *lpvmhObjHandle* | Object handle to associated a name. |
| *lpszObjName* | Name string to associate with the object. If it is null or an empty string, the object will have no name. If name string is longer than 12 characters excluding the null character, it is truncated. |

Usage Notes

Use care when naming a group object. A call to WML_ObjectGetObject to retrieve a group object creates a subdirectory on the local native file system to hold the objects in the group. The name given this subdirectory is the same as the name of the group object as defined by the lpszObjectName parameter. Therefore, group names should not duplicate the names of existing directories.

Return Values

WM_SUCCESS
WM_ERR_INVALID_OBJ_HANDLE
WM_ERR_INVALID_OBJ_NAME
WM_ERR_NETWORK_ERROR
WM_ERR_OBJ_NOT_FOUND
WM_ERR_VOLUME_MGR_ERROR
WM_ERR_VOLUME_NOT_FOUND

Related Functions

WML_ObjectGetObjectName

----------

WML_ObjectSetProperty

Sets the property of an object.

Include Files

#include "wmobj.h"

Syntax

```
int FAR PASCAL WML_ObjectSetProperty(
    LPVMHOBJECT    lpvmhObjHandle,
    UINT           nPropertyType,
    UINT           nProperty);
```

Parameters

*lpvmhObjHandle* Specified object by object handle.

*nPropertyType* Possible values:

PROPERTY_CLASS
PROPERTY_COMPRESSION
PROPERTY_ENCRYPTION
PROPERTY_SECURITY
PROPERTY_FETCH
PROPERTY_LAUNCH

*nProperty* Property value to set.

Return Values

WM_SUCCESS
WM_ERR_INVALID_PROPERTY_TYPE
WM_ERR_NETWORK_ERROR
WM_ERR_OBJ_NOT_FOUND
WM_ERR_VOLUME_MGR_ERROR
WM_ERR_VOLUME_NOT_FOUND

Related Functions

WML_ObjectGetProperty

---

WML_ObjectSetThumbNail

Sets the thumbnail bitmap associated with an object in a group object.

Include Files

#include "wmobj.h"

Syntax

```
int FAR PASCAL WML_ObjectSetThumbNail(
    HOBJECT         hObjHandle,
    LPVMHOBJECT     lpvmhObjectHandle,
    int nPosition,
    int nMode,
    UINT            nThumbNailSize,
    LPVOID          lpThumbNailBitmap,
    UINT            nBitsPerPixel);
```

Parameters

*hObjHandle* — Must be a valid group object handle returned from WML_ObjectOpen.

*lpvmhObjectHandle* — Depends on the value of the *nMode* parameter:

| | |
|---|---|
| BY_OBJECT_HANDLE | Requires a valid object handle of an object in the specified group object. |
| BY_POSITION | Ignored. |

*nPosition* — Depends on the value of the nMode parameter:

| | |
|---|---|
| BY_POSITION | Requires a valid position of an object in the specified group object. |
| BY_OBJECT_HANDLE | Ignored. |

The position is zero-based and ranges from 0 through N-1.

| | |
|---|---|
| 0 | First object position in the group object. |
| N-1 | Last object position in the group object. |
| -1 | Last object when the total number of objects is unknown before the call. |

*nMode* — BY_OBJECT_HANDLE or BY_POSITION.

*nThumbNailSize* — Size of thumbnail bitmap in bytes.

*lpThumbNailBitmap* — Pointer to the location of the thumbnail bitmap.

*nBitsPerPixel* Specified number of bits per pixel of the thumbnail bitmap.

1 = Monochrome (i.e., black and white)

4 = Four color planes (i.e., 16 colors)

----------

Usage Notes

Each object in the group object has a space for storing a thumbnail bitmap that the application uses to associate the thumbnail bitmap with that object. The application must set this thumbnail bitmap or else calls to WML_ObjectGetThumbNail will return an empty bitmap.

Return Values

WM_SUCCESS
WM_ERR_THUMBNAIL_TOO_LARGE
WM_ERR_INVALID_OBJ_HANDLE
WM_ERR_INVALID_MODE
WM_ERR_INVALID_POSITION
WM_ERR_NETWORK_ERROR
WM_ERR_OBJ_NOT_FOUND
WM_ERR_VOLUME_MGR_ERROR

Related Functions

WML_ObjectGetThumbNail

----------

WML_ObjectTerminate

Uninitializes object library for the current task.

Include Files

#include "wmobj.h"

Syntax int FAR PASCAL WML_ObjectTerminate(void)

Parameters

None.

Usage Notes

Each application must call this function before exiting any application that called the WML_ObjectInitialize function. In addition, all Fourth Generation Language applications must call SL_Init and SL_Done as the first and last calls to Object Manager libraries.

Return Values

WM_SUCCESS
WM_ERR_NETWORK_ERROR

Related Functions
WML_ObjectInitialize
SL_Done

WML: OCR FUNCTIONS

The OCR functions in the Workstation Manager Library can be grouped by their use as: general operations; accessing zones; recognizing zones; recognizing full pages; and verifying results. The tables that follow list each of the OCR functions in the Workstation Manager Library by group along with its description.

*General Operations*

| Function Name and Description |
|---|
| WML_OCRInit<br>Initializes the OCR library. |
| WML_OCRFree<br>Uninitializes the OCR library. |
| WML_OCRPreferences<br>Displays a dialog box so that users can select their preferences for an OCR operation. |
| WML_OCRGetErrorText<br>Gets the error string from the error code. |

*Accessing Zones*

| Function Name and Description |
|---|
| WML_OCRAddZone<br>Adds a zone to be processed by the OCR engine. |
| WML_OCRClearZones<br>Clears all zones from the OCR engine including any results. |
| WML_OCRGetResult<br>Gets the OCR text results from the specified zone and returns a confidence level for those results. |

*Recognizing Zones*

| Function Name and Description |
|---|
| WML_OCRRecognize<br>Performs OCR on an image using the specified zones. |
| WML_OCRRecognizeObject<br>Performs OCR on a Volume Manager object using the current zone or zones. |

*Recognizing Full Pages*

| Function Name and Description |
|---|
| WML_OCRImagesToFile<br>Performs OCR conversion on a list of image files and saves the full page results to an output file of a particular type. |
| WML_OCRObjectToFile<br>Performs OCR on the object specified by an object handle and saves the full page results to an output file of a particular type. |

*Verifying Results*

| Function Name and Description |
|---|
| WML_OCRGetRectImage<br>Returns a bitmap copy of an area of an image file that has been defined by the specified coordinates. |
| WML_OCRGetZoneImage<br>Returns a bitmap copy of an area of an image file defined by the specified zone. |

---

*Technical Specifications*

WML_OCRAddZone

Adds a zone to be processed by the OCR engine.

Include Files

#include "wmocr.h"

Syntax

```
int FAR PASCAL WML_OCRAddZone(
    UINT        nZoneNum,
    DWORD       nZoneType,
    UINT        xOrig,
    UINT        yOrig,
    UINT        xWidth,
    UINT        yHeight);
```

Parameters

| | |
|---|---|
| *nZoneNum* | Zone number. |
| *nZoneType* | Zone type (ASCII/numeric) |
| *xOrig* | X origin. |
| *yOrig* | Y origin. |
| *xWidth* | Width of the zone. |
| *yHeight* | Height of the zone. |

Usage Notes

To be independent of image resolution, the xOrig, yOrig, xWidth, and yHeight parameters must be specified in TWIPs (1 inch = 1440 TWIPs). If the values for xOrig, yOrig, xWidth, and yHeight are all zero, the zone is assumed to be the entire page. The nZoneType parameter can be any combination of the following:

| | |
|---|---|
| OCR_TYPE_DEFAULT | ASCII and numeric text |
| OCR_TYPE_ALPHA | ASCII text |
| OCR_TYPE_NUMERIC | Numeric text |

Return Values

WM_SUCCESS
WM_ERR_OCR

Related Functions

WML_OCRClearZones
WML_OCRGetResult

----------

WML_OCRClearZones

Clears all zones from the OCR engine including any results.

Include Files

```
#include "wmocr.h"
```

Syntax

```
int FAR PASCAL WML_OCRClearZones(void);
```

Parameters
None.

Return Values
WM_SUCCESS
WM_ERR_OCR

Related Functions
WML_OCRAddZone
WML_OCRGetResult

---

WML_OCRFree

Uninitializes the OCR library.

Include Files
#include "wmocr.h"

Syntax
int WINAPI WML_OCRFree(void);

Parameters
None.

Return Values
WM_SUCCESS
WM_ERR_OCR

Related Functions
WML_OCRFree

---

WML_OCRGetErrorText

Gets the error string from the error code.

Include Files
#include "wmocr.h"

Syntax
```
LPSTR FAR PASCAL WML_OCRGetErrorText(
    int        nErrorCode,
    LPSTR      lpszErrorTextBuffer,
    int        cbErrorTextBuffer);
```

Parameters

| | |
|---|---|
| *nErrorCode* | Error code. |
| *lpszErrorTextBuffer* | Buffer to receive the error string associated with the given error code. |
| *cbErrorTextBuffer* | Size of the error text buffer. |

Usage Notes

This function will attempt to find a string associated with the passed nErrorCode parameter. The nErrorCode parameter should be an error code returned from the WML_OCR functions.

Return Values

Returns the pointer to the passed error buffer, *lpszErrorTextBuffer*. The error buffer will be filled with the error string associated with the passed error code, *nErrorCode*. If the error string does not fit into the error buffer, the string will be truncated.

----------

WML_OCRGetRectImage

Returns a bitmap copy of an area of an image file that has been defined by the specified coordinates.

Include Files

```
#include "wmocr.h"
```

Syntax

```
int FAR PASCAL WML_OCRGetRectImage
     LPCSTR          lpszImageFile,
     UINT            xOrig,
     UINT            yOrig,
     UINT            xWidth,
     UINT            yHeight,
     HBITMAP FAR *   lphDib);
```

Parameters

| | |
|---|---|
| *lpszImageFile* | Image filename to get zone image from. |
| *xOrig* | X origin of the zone. |
| *yOrig* | Y origin of the zone. |
| *xWidth* | Width of the zone. |
| *yHeight* | Height of the zone. |
| *lphDib* | Pointer to zone bitmap. |

Usage Notes

This function allows an application developer to retrieve a bitmap copy of a zone so that it can be used for verification and other visual purposes.

To be independent of image resolution, the xOrig, yOrig, xWidth, and yHeight parameters must be specified in TWIPs (1 inch = 1440 TWIPs). If the values for xOrig, yOrig, xWidth, and yHeight are all zero, the zone is assumed to be the entire page. The lphDib parameter will return a device independent bitmap (DIB) that can be freed by using the Windows SDK DeleteObject function.

Return Values

WM_SUCCESS
WM_ERR_OCR
WM_ERR_COULDNOTGETZONE
WM_ERR_INVALID_RESULT_BUFFER
WM_ERR_BAD_PARAMETER
WM_ERR_OUT_OF_MEMORY
WM_ERR_COULD_NOT_CREATE_BITMAP
WM_ERR_UNKNOWN_IMAGE_FORMAT

Related Functions

WML_OCRGetZoneImage

---

WML_OCRGetResult

Gets the OCR text results from the specified zone and returns a confidence level for those results.

Include Files

#include "wmocr.h"

Syntax

```
int FAR PASCAL WML_OCRGetResult(
    UINT        nZoneNum,
    LPSTR       lpszResultBuffer,
    UINT        cbResultBuffer,
    LPINT       lpnConfidenceLevel);
```

Parameters

| | |
|---|---|
| *nZoneNum* | Zone number. |
| *lpszResultBuffer* | Result buffer. |
| *cbResultBuffer* | Size of the result buffer. |
| *lpnConfidenceLevel* | Confidence level for this result (0%–100%). |

Usage Notes

The results for a zone will be in a string format. If the zone does not have a result, the result buffer will contain an empty string.

Return Values

WM_SUCCESS
WM_ERR_OCR
WM_ERR_INVALID_RESULT_BUFFER
WM_ERR_BAD_PARAMETER

WM_ERR_ZONE_NUMBER_OUTOFRANGE
WM_ERR_COULDNOTGETZONE
WM_ERR_ZONETYPEMISMATCH
WM_ERR_NO_RESULT_AVAILABLE
WM_ERR_BUFFER_TOO_SMALL

Related Functions
WML_OCRAddZone
WML_OCRClearZones

---

WML_OCRGetZoneImage

Returns a bitmap copy of an area of an image file defined by the specified zone.

Include Files
#include "wmocr.h"

Syntax

```
int FAR PASCAL WML_OCRGetZoneImage
    UINT            nZoneNum,
    LPCSTR          lpszImageFile,
    HBITMAP FAR *   lphDib);
```

Parameters

*nZoneNum* Zone number.

*lpszImageFile* Image file name.

*lphDib* Pointer to zone bitmap.

Usage Notes

This function allows an application developer to retrieve a bitmap copy of a zone so that it can be used for verification and other visual purposes. The lphDib parameter will return a device independent bitmap (DIB) that can be freed by using the Windows SDK DeleteObject function.

Return Values
WM_SUCCESS
WM_ERR_OCR
WM_ERR_COULDNOTGETZONE
WM_ERR_ZONE_NUMBER_OUTOFRANGE
WM_ERR_INVALID_RESULT_BUFFER
WM_ERR_BAD_PARAMETER
WM_ERR_OUT_OF_MEMORY
WM_ERR_COULD_NOT_CREATE_BITMAP
WM_ERR_UNKNOWN_IMAGE_FORMAT Related Functions
WML_OCRGetRectImage

-----------

WML_OCRImagesToFile

Performs OCR conversion on a list of image files and saves the full page results to an output file of a particular type.

Include Files

#include "wmocr.h"

Syntax

```
int FAR PASCAL WML_OCRImagesToFile
    HWND        hWndParent,
    LPCSTR      lpszImageFiles,
    LPCSTR      lpszFilename,
    WORD        wFileType,
    LPSTR       lpszResultBuffer,
    UINT        cbResultBuffer);
```

Parameters

| | |
|---|---|
| *hWndParent* | Window handle of calling application. |
| *lpszImageFiles* | List of image files to be processed. This list should contain fully qualified filenames separated by spaces. |
| *lpszFilename* | Output filename.<br>n If NULL, a Save As dialog will be will be presented and the selected filename will be stored in lpszResultBuffer. The user is prompted to supply a filename.<br>n If non-NULL, the filename can be partially specified in which the missing components will be derived from the current working directory and output file type and stored in lpszResultBuffer. |
| *wFileType* | Output file type (0 = use INI setting). |
| *lpszResultBuffer* | Buffer for resulting output filename. |
| *cbResultBuffer* | Size of the buffer used for lpszResultBuffer. |

Return Values

WM_SUCCESS
WM_ERR_INVALID_RESULT_BUFFER
WM_ERR_BAD_PARAMETER
WM_ERR_OCR
WM_ERR_OCR_INVALID_FILE_TYPE
WM_ERR_OCR_INVALID_DEVICE_NAME
WM_ERR_OUT_OF_MEMORY
WM_ERR_UNKNOWN_IMAGE_FORMAT
WM_ERR_BUFFER_TOO_SMALL

Related Functions

WML_OCRObjectToFile

----------

WML_OCRInit

Initializes the OCR library.

Include Files

```
#include "wmocr.h"
```

Syntax

```
int WINAPI WML_OCRInit(void);
```

Parameters

None.

Return Values

WM_SUCCESS
WM_ERR_OCR

Related Functions

WML_OCRInit

----------

WML_OCRObjectToFile

Performs OCR on the object specified by an object handle and saves the full page results to an output file of a particular type.

Include Files

```
#include "wmocr.h"
```

Syntax

```
int WINAPI WML_OCRObjectToFile(
        HWND            hWndParent,
        LPVMHOBJECT     lpObjHandle,
        LPCSTR          lpszFilename,
        WORD            wFileType,
        LPSTR           lpszResultBuffer,
        UINT            cbResultBuffer);
```

Parameters

| | |
|---|---|
| *hWndParent* | Handle to the parent window. |
| *lpObjHandle* | Must be valid object handle. |

| | |
|---|---|
| *lpszFilename* | Output filename.<br>n If NULL, a Save As dialog will be will be presented to the user and the selected filename will be stored in lpszResultBuffer.prompted to supply a filename.<br>n If non-NULL, the filename can be partially specified in which the missing components will be derived from the current working directory and output file type and stored in lpszResultBuffer. |
| *wFileType* | Output file type (0 = use INI setting). |
| *lpszResultBuffer* | Buffer for resulting output filename. |
| *cbResultBuffer* | Size of the buffer used for lpszResultBuffer. |

Return Values

WM_SUCCESS
WM_ERR_INVALID_OBJECT
WM_ERR_INVALID_RESULT_BUFFER
WM_ERR_BAD_PARAMETER
WM_ERR_OCR
WM_ERR_OCR_INVALID_FILE_TYPE
WM_ERR_OCR_INVALID_DEVICE_NAME
WM_ERR_OUT_OF_MEMORY
WM_ERR_UNKNOWN_IMAGE_FORMAT
WM_ERR_BUFFER_TOO_SMALL

Related Functions

WML_OCRImagesToFile

----------

WML_OCRPreferences

Displays a dialog box so that users can select their preferences for an OCR operation.

Include Files

#include "wmocr.h"

Syntax

```
int FAR PASCAL WML_OCRPreferences
    HWND            hWndParent);
```

Parameters

| | |
|---|---|
| *hWndParent* | Parent window. |

Return Values

IDOK
IDCANCEL
-1

Usage Notes

The dialog box lets users select output file format, page orientation, and other OCR engine-dependent options. The options are stored in the WMOCR.INI file.

Additionally, the user can specify options that are dependent on the OCR engine they are using. For example:

---

WML_OCRRecognize

Performs OCR on an image using the specified zones.

Include Files

```
#include "wmocr.h"
```

Syntax

```
int FAR PASCAL WML_OCRRecognize(
    LPCSTR            lpszImageFile);
```

Parameters

*lpszImageFile* Image file name.

Usage Notes

This call performs the actual OCR recognition, but assumes that the application developer has added at least one zone to the initialized OCR engine. The recognition process will replace any existing zone results.

Return Values

WM_SUCCESS
WM_ERR_OCR
WM_ERR_BAD_PARAMETER
WM_ERR_UNKNOWN_IMAGE_FORMAT

Related Functions

WML_OCRRecognizeObject

---

WML_OCRRecognizeObject

Performs OCR on a Volume Manager object using the current zone or zones.

Include Files

```
#include "wmocr.h"
```

Syntax

```
int WINAPI WML_OCRRecognizeObject(
    LPVMHOBJECT   lpObjHandle);
```

Parameters

| | |
|---|---|
| *lpObjHandle* | Object handle of image file. |

Usage Notes

This call performs the actual OCR recognition, but assumes that the application developer has added at least one zone to the initialized OCR engine. The recognition process will replace any existing zone results.

Return Values

WM_SUCCESS
WM_ERR_OCR
WM_ERR_OCR_NOT_INITIALIZED
WM_ERR_BAD_PARAMETER
WM_ERR_OBJECT
WM_ERR_OBJECTATTRIB
WM_ERR_OCR_INVALID_OBJECT

Related Functions

WML_OCRRecognize

WML: OMR FUNCTIONS

The table that follows lists each of the OMR functions in the Workstation Manager Library along with its description.

| Function Name and Description |
|---|
| WML_OMRInit<br>Initializes the OMR module. |
| WML_OMRFree<br>Uninitializes the OMR module. |
| WML_OMROpen<br>Opens an OMR form. |
| WML_OMRClose<br>Closes an OMR form. |
| WML_OMRAddZone<br>Adds a zone to be processed. |
| WML_OMRClearZones<br>Clears all zones. |

| |
|---|
| WML_OMRRecognize<br>Performs checkmark (OMR) recognition on the set of zones. |
| WML_OMRRecognizeObject<br>Performs checkmark recognition on a Volume Manager object using the current zone(s). |
| WML_OMRGetResult<br>Gets the resulting text for a zone. |
| WML_OMRGetZoneImage<br>Takes the image, lpszImageFile, and returns a bitmap copy of the area specified by the zone, nZoneNum. |
| WML_OMRGetRectImage<br>Takes the image, lpszImageFile, and returns a bitmap copy of the area specified by the xOrig, yOrig, xWidth and yHeight parameters. |
| WML_OMRGetErrorText<br>Returns a corresponding error string for the given error code. |

*Technical Specifications*

WML_OMRAddZone

Adds a zone to be processed.

Include Files

#include "wmomr.h"

Syntax

```
int WINAPI WML_OMRAddZone(
    HANDLE    hOMR,
    UINT      nZoneNum,
    long      xOrig,
    long      yOrig,
    long      xWidth,
    long      yHeight,
    int iTypes);
```

Parameters:

*hOMR* Handle to opened OMR form.

*nZoneNum* Zone number.

| | |
|---|---|
| *xOrig* | Minimum X value of zone. |
| *yOrig* | Minimum Y value of zone. |
| *xWidth* | Maximum X value of zone. |
| *yHeight* | Maximum Y value of zone. |
| *iTypes* | Type of OMR. |

Usage Notes

This function adds a zone to the checkmark (OMR) engine. To be image resolution independent the *xOrig, yOrig, xWidth,* and *yHeight* parameters are to be in TWIPs (1 inch = 1440 TWIPs). If the values for *xOrig, yOrig, xWidth,* and *yHeight* are all zero, the zone is assumed to be the entire page.

The iTypes parameter is an integer value that can contain either of the following values:

OMRZONE_TYPE_CHECKBOX
OMRZONE_TYPE_GROUP

The OMRZONE_TYPE_CHECKBOX value indicates a checkmark zone that will return 1 or 0 as a result. The OMRZONE_TYPE_GROUP value indicates a group zone that is used to group together checkbox zones that are mutually exclusive. The group zone will return a zone number representing the zone within the group zone that has the highest confidence of being checked. The group zone can also be used to verify multiple zones simultaneously.

Return Values

WM_SUCCESS
WM_ERR_OMR_NOT_INITIALIZED
WM_ERR_BAD_PARAMETER
WM_ERR_OUT_OF_MEMORY

Related Functions

WML_OCRClearZones

----------

WML_OMRClearZones

Clears all zones.

Include Files

#include "wmomr.h"

Syntax

```
int WINAPI WML_OMRClearZones(
    HANDLE          hOMR);
```

Parameters:

| | |
|---|---|
| *hOMR* | Handle to opened OMR form. |

Usage Notes
This call clears all zones from the checkmark (OMR) engine including any results.

Return Values
WM_SUCCESS
WM_ERR_OMR_NOT_INITIALIZED
WM_ERR_BAD_PARAMETER
WM_ERR_OUT_OF_MEMORY Related Functions
WML_OCRAddZone

---

WML_OMRClose

Closes an OMR form.

Include Files
#include "wmomr.h"

Syntax
```
int WINAPI WML_OMRClose(
    HANDLE          hOMR);
```

Parameters:
*hOMR* Handle to opened OMR form.

Usage Notes
This function frees the memory associated with the OMR handle. This includes any zones, zone results, and any checkmark (OMR) initialization information. If you plan to open and use the OMR form for multiple checkmark recognitions, keep the OMR handle open between recognitions and do not close the OMR form all forms are recognized.

When you open an OMR form, an initialization process occurs during the first recognition. For maximum efficiency, keep the OMR form open to avoid having to reinitialize for each new form. You may open multiple OMR forms at one time.

Return Values
WM_SUCCESS
WM_ERR_OMR_NOT_INITIALIZED
WM_ERR_BAD_PARAMETER
WM_ERR_OUT_OF_MEMORY Related Functions
WML_OMROpen

----------

WML_OMRFree

Uninitializes the OMR module.

Include Files

#include "wmomr.h"

Syntax

```
int WINAPI WML_OMRFree(void);
```

Parameters

None.

Return Values

WM_SUCCESS

Related Functions

WML_OMRInit

----------

WML_OMRGetErrorText

Returns a corresponding error string for the given error code.

Include Files

#include "wmomr.h"

Syntax

```
LPSTR WINAPI WML_OMRGetErrorText(
    int nErrorCode,
    LPSTR          lpszErrorTextBuffer,
    int cbErrorTextBuffer);
```

Parameters:

| | |
|---|---|
| *nErrorCode* | Error code. |
| *lpszErrorTextBuffer* | Error text buffer. |
| *cbErrorTextBuffer* | Size of error text buffer. |

Usage Notes

This function will attempt to find a string associated with the passed nErrorCode parameter. The nErrorCode parameter should be an error code returned from the WML_OMR functions.

Return Values

Returns the pointer to the passed error buffer, lpszErrorTextBuffer. The error buffer will be filled with the error string associated with the passed error code, nErrorCode. If the error string does not fit into the error buffer, the string will be truncated.

WML_OMRGetRectImage

Takes the image, *lpszImageFile*, and returns a bitmap copy of the area specified by the *xOrig*, *yOrig*, *xWidth* and *yHeight* parameters.

Include Files

#include "wmomr.h"

Syntax

```
int WINAPI WML_OMRGetRectImage(
    HANDLE        hOMR,
    LPCSTR        lpszImageFile,
    long          xOrig,
    long          yOrig,
    long          xWidth,
    long          yHeight,
    HBITMAP FAR   *lphDib);
```

Parameters:

| | |
|---|---|
| *hOMR* | Handle to opened OMR form. |
| *lpszImageFile* | Image file name. |
| *xOrig* | X origin of the zone. |
| *yOrig* | Y origin of the zone. |
| *xWidth* | Width of the zone. |
| *yHeight* | Height of the zone. |
| *lphDib* | Pointer to zone bitmap. |

Usage Notes

The *xOrig*, *yOrig*, *xWidth*, and *yHeight* parameters are to be in TWIPs (1 inch = 1440 TWIPs). If the values for *xOrig*, *yOrig*, *xWidth*, and *yHeight* are all zero, the zone is assumed to be the entire page. This function allows an application developer to retrieve a bitmap copy of a zone to be used for verification and other visual purposes. The *lphDib* parameter will return a device independent bitmap (DIB) that can be freed by using the Windows SDK DeleteObject function.

Return Values

WM_SUCCESS
WM_ERR_OMR_NOT_INITIALIZED
WM_ERR_BAD_PARAMETER
WM_ERR_INVALID_RESULT_BUFFER
WM_ERR_OMR_IMAGE_RESOLUTION
WM_ERR_OMR
WM_ERR_OUT_OF_MEMORY
WM_ERR_COULD_NOT_CREATE_BITMAP

Related Functions

WML_OMRGetResult
WML_OMRGetZoneImage

----------

WML_OMRGetResult

Gets the resulting text for a zone.

Include Files

#include "wmomr.h"

Syntax

```
int WINAPI WML_OMRGetResult(
    HANDLE      hOMR,
    UINT        nZoneNum,
    LPSTR       lpszResultBufferr,
    UINT        cbResultBuffer,
    UINT far    *lpnConfidenceLevel);
```

Parameters:

| | |
|---|---|
| *hOMR* | Handle to opened OMR form. |
| *nZoneNum* | Zone number. |
| *lpszResultBuffer* | Pointer to result buffer. |
| *cbResultBuffer* | Size of result buffer. |
| *lpnConfidenceLevel* | Confidence level. |

Return Values

WM_SUCCESS
WM_ERR_OMR_NOT_INITIALIZED
WM_ERR_INVALID_RESULT_BUFFER
WM_ERR_OMR_ZONE_OUTOFRANGE
WM_ERR_OMR_NO_ZONES_WERE_FOUND

Related Functions

WML_OMRGetRectImage
WML_OMRGetZoneImage

----------

WML_OMRGetZoneImage

Takes the image, *lpszImageFile*, and returns a bitmap copy of the area specified by the zone, *nZoneNum*.

Include Files

#include "wmomr.h"

Syntax

```
int WINAPI WML_OMRGetZoneImage(
    HANDLE        hOMR,
    UINT          nZoneNum,
    LPCSTR        lpszImageFile,
    HBITMAP FAR   *lphDib);
```

Parameters:

| | |
|---|---|
| *hOMR* | Handle to opened OMR form. |
| *nZoneNum* | Zone number. |
| *lpszImageFile* | Image file name. |
| *lphDib* | Pointer to zone bitmap. |

Usage Notes

This function allows an application developer to retrieve a bitmap copy of a zone to be used for verification and other visual purposes. The *lphDib* parameter will return a device independent bitmap (DIB) that can be freed by using the Windows SDK DeleteObject function.

Return Values

WM_SUCCESS
WM_ERR_OMR_NOT_INITIALIZED
WM_ERR_BAD_PARAMETER
WM_ERR_INVALID_RESULT_BUFFER
WM_ERR_OMR_ZONE_OUTOFRANGE
WM_ERR_OMR_NO_ZONES_WERE_FOUND
WM_ERR_OMR_IMAGE_RESOLUTION
WM_ERR_OMR
WM_ERR_OUT_OF_MEMORY
WM_ERR_COULD_NOT_CREATE_BITMAP

Related Functions

WML_OMRGetRectImage
WML_OMRGetResult

----------

WML_OMRInit

Initializes the OMR module.

Include Files

#include "wmomr.h"

Syntax int WINAPI WML_OMRInit(void);

Parameters

None.

Return Values

WM_SUCCESS
WM_ERR_OMR_NOT_INITIALIZED
WM_ERR_OMR

Related Functions

WML_OMRFree

----------

WML_OMROpen

Opens an OMR form.

Include Files

#include "wmomr.h"

Syntax

```
int WINAPI WML_OMROpen(
    LPCSTR          lpszImageFile,
    BOOL            fDropOutInk,
    HANDLE far      *lphOMR);
```

Parameters:

*lpszImageFile* Original form image file name.

*fDropOutInk* If TRUE, the final forms will have drop out ink.

*lphOMR* Handle to opened OMR form.

Usage Notes

This function returns an OMR handle that is used during the life cycle of the OMR form. The *lpszImageFile* parameter specifies the blank master form that is to be analyzed before the marked forms are recognized. The *fDropOutInk* parameter tells the checkmark engine whether the final forms have been printed in dropout ink. The master form should not be printed in dropout ink.

Return Values

WM_SUCCESS
WM_ERR_OMR_NOT_INITIALIZED
WM_ERR_BAD_PARAMETER
WM_ERR_OMR
WM_ERR_OUT_OF_MEMORY

Related Functions

WML_OMRClose

----------

WML_OMRRecognize

Performs checkmark (OMR) recognition on the set of zones.

Include Files

#include "wmomr.h"

Syntax

```
int WINAPI WML_OMRRecognize(
    HANDLE          hOMR,
    LPCSTR          lpszImageFile);
```

Parameters:

*hOMR* Handle to opened OMR form.

*lpszImageFile* Image file name.

Usage Notes

This call performs the actual checkmark recognition, but assumes that the application developer has added at least one zone to the initialized checkmark engine. The recognition process replaces any existing zone results.

Return Values

WM_SUCCESS
WM_ERR_OMR_NOT_INITIALIZED
WM_ERR_BAD_PARAMETER
WM_ERR_OMR_NO_ZONES_WERE_FOUND
WM_ERR_OMR_IMAGE_RESOLUTION
WM_ERR_OMR
WM_ERR_OUT_OF_MEMORY

Related Functions

WML_OMRRecognizeObject

----------

WML_OMRRecognizeObject

Performs checkmark recognition on a Volume Manager object using the current zone(s).

Include Files

#include "wmomr.h"

Syntax

```
int WINAPI WML_OMRRecognizeObject(
    LPVMHOBJECT    lpObjHandle);
```

Parameter:

*lpObjHandle* Object handle to image.

Usage Notes

This call performs the actual checkmark recognition on a Volume Manager object, but assumes that the application developer has added at least one zone to the initialized checkmark engine. The recognition process replaces any existing zone results.

Return Values

WM_SUCCESS
WM_ERR_OMR
WM_ERR_OMR_NOT_INITIALIZED
WM_ERR_BAD_PARAMETER
WM_ERR_OUT_OF_MEMORY

WM_ERR_OMR_NO_ZONES_WERE_FOUND
WM_ERR_OMR_IMAGE_RESOLUTION
WM_ERR_OBJECT
WM_ERR_OBJECTATTRIB
WM_ERR_BARCODE_INVALID_OBJECT
WM_ERR_BARCODE_COULD_NOT_LOAD_WMOBJ

Related Functions

WML_OMRRecognize

WML: PRINT FUNCTIONS

The table that follows lists each of the print functions in the Workstation Manager Library along with its description.

| Function Name and Description |
| --- |
| WML_PrintInitialize<br>Initializes the Workstation Manager Print DLL (WMPRINT.DLL). |
| WML_PrintTerminate<br>Terminates the Workstation Manager Print DLL (WMPRINT.DLL). |
| WML_PrintSelectPrintDevice<br>Displays a popup dialog that allows users to select the current and/or default print device. |
| WML_PrintSetPrintDevice<br>Sets the currently selected print device to the value specified in lpszPrintQueue. |
| WML_PrintSetDefaultPrintDevice<br>Sets the default print device to the value specified in lpszPrintQueue. |
| WML_PrintSubmitObjectJob<br>Prints the object specified by the passed object handle to the selected print device. |
| WML_PrintSubmitFileJob<br>Prints a file on the default local Windows printer using the *.WMP printer glue. |

| |
|---|
| WML_PrintJobStatus<br>Displays a popup dialog showing the status of all print jobs for the selected print queue. |
| WML_PrintCancelJob<br>Cancels the print job of the passed print job ID. |

---

*Technical Specifications*

WML_PrintCancelJob

Cancels the print job of the passed print job ID.

Include Files

#include "wmprint.h"

Syntax int WINAPI WML_PrintCancelJob(JOBID JobID);

Parameters

JobID ID of the print job to be cancelled.

Return Value

WM_SUCCESS
WM_ERR_PRINT_NOT_INITIALIZED
WM_ERR_INVALID_JOB_ID
WM_ERR_PRINTER

Related Functions

WML_PrintSetDefaultPrintDevice
WML_PrintSubmitObjectJob
WML_PrintJobStatus

---

WML_PrintInitialize

Initializes the Workstation Manager Print DLL (WMPRINT.DLL).

Include Files

#include "wmprint.h"

Syntax
int WINAPI WML_PrintInitialize(void);

Parameters
None.

Usage Notes
This function calls WML_ObjectInitialize to initialize WMOBJ.DLL and PM_Initialize to initialize PMLIB.DLL.

If you have implemented the Object Manager security features, you must invoke WML_SecurityLogin or the equivalent calls to SSLIB.DLL before you call this function.

Return Value
WM_SUCCESS
WM_ERR_PRINTER

Related Functions
WML_PrintTerminate

----------

WML_PrintJobStatus

Displays a popup dialog showing the status of all print jobs for the selected print queue.

Include Files
#include "wmprint.h"

Syntax
int WINAPI WML_PrintJobStatus (HWND hwndParent);

Parameters
*hwndParent* Window handle of the parent window of the popup dialog.

Usage Notes
On the popup dialog, which is shown below, users can suspend, resume, or cancel any print job they own.

Return Value
WM_SUCCESS
WM_ERR_PRINT_NOT_INITIALIZED
WM_ERR_INVALID_WINDOW_HANDLE
WM_ERR_PRINTER Related Functions
WML_PrintSetDefaultPrintDevice
WML_PrintSubmitObjectJob
WML_PrintCancelJob

---------

WML_PrintSelectPrintDevice

Displays a popup dialog that allows users to select the current and/or default print device.

Include Files
#include "wmprint.h"

Syntax
```
int WINAPI WML_PrintSelectPrintDevice(HWND hwndParent);
```

Parameters

*hParentHwnd* Window handle of the parent window of the popup dialog.

Usage Notes

On the popup dialog, which is shown below, users can select either local printers (the Windows default) or print queues serviced by Object Manager Print Servers.

Return Value
WM_SUCCESS
WM_ERR_PRINT_NOT_INITIALIZED
WM_ERR_INVALID_WINDOW_HANDLE
WM_ERR_PRINTER Related Functions
WML_PrintSetDefaultPrintDevice
WML_PrintSubmitObjectJob

---------

WML_PrintSetDefaultPrintDevice

Sets the default print device to the value specified in lpszPrintQueue.

Include Files
#include "wmprint.h"

Syntax
```
int WINAPI WML_PrintSetDefaultPrintDevice(
    HWND                hwndParent,
    LPCSTR              lpszPrintQueue);
```

Parameters hwndParent — Handle to the parent window.

lpszPrintQueue — Name of print queue.

Usage Notes

The lpszPrintQueue parameter can contain the name of any currently defined Object Manager print queue or the string Local for the default Windows printer.

Return Value

WM_SUCCESS
WM_ERR_PRINT_NOT_INITIALIZED

Related Functions

WML_PrintSetPrintDevice

----------

WML_PrintSetPrintDevice

Sets the currently selected print device to the value specified in lpszPrintQueue.

Include Files

#include "wmprint.h"

Syntax

```
int WINAPI WML_PrintSetPrintDevice(
    HWND        hwndParent,
    LPCSTR      lpszPrintQueue);
```

Parameters

*hwndParent* — Handle of the parent window.

*lpszPrintQueue* — Name of print queue.

Usage Notes

The lpszPrintQueue parameter can contain the name of any currently defined Object Manager print queue or the string Local for the default Windows printer.

Return Value

WM_SUCCESS
WM_ERR_PRINT_NOT_INITIALIZED

Related Functions

WML_PrintSetDefaultPrintDevice

----------

WML_PrintSubmitFileJob

Prints a file on the default local Windows printer using the *.WMP printer glue.

Include Files

#include "wmprint.h"

Syntax

```
int WINAPI WML_PrintSubmitFileJob(
    UINT        uObjectType,
    LPSTR       lpszFilename;
```

Parameters

| | |
|---|---|
| uObjectType | Object type of the file or object being printed. |
| *lpszFilename* | Full path to filename to print. |

Usage Notes

An appropriate application, such as MS Word, MS Excel, WordPerfect, or Outside In, must be installed on the user's workstation in support of the specified object type.

The value for the uObjectType parameter can be obtained from the list of object types defined in the [Object Type Attrib List] section of the wmcommon.ini file.

Return Value

WM_SUCCESS
WM_ERR_PRINT_NOT_INITIALIZED
WM_ERR_PRINTER

Related Functions

WML_PrintSubmitObjectJob
WML_PrintJobStatus
WML_PrintCancelJob

----------

WML_PrintSubmitObjectJob

Prints the object specified by the passed object handle to the selected print device.

Include Files

#include "wmprint.h"

Syntax

```
int WINAPI WML_PrintSubmitObjectJob(
    LPVMHOBJECT   lpObjHandle,
    LPJOBID       lpJobID,
    int nRecursiveLevel);
```

Parameters

| | |
|---|---|
| *lpObjHandle* | Pointer to the object handle of the object to be printed. |
| *lpJobID* | Pointer to the location where to store the job ID for subsequent reference. |
| nRecursiveLevel | If the specified object is a group object, this parameter specifies how many levels of the group hierarchy to print. The value -1 indicates all levels. |

Usage Notes

If a local print device is selected, the object is retrieved and printed locally. Otherwise, it is sent to the selected Object Manager print queue. Each object to be printed (simple or group) is also checked to see if the user has permission to access it.

Return Value

WM_SUCCESS
WM_ERR_PRINT_NOT_INITIALIZED
WM_ERR_PRINTER

Related Functions

WML_PrintSetDefaultPrintDevice
WML_PrintJobStatus
WML_PrintCancelJob

----------

WML_PrintTerminate

Terminates the Workstation Manager Print DLL (WMPRINT.DLL).

Include Files

#include "wmprint.h"

Syntax

```
int WINAPI WML_PrintTerminate(void);
```

Parameters

None.

Usage Notes

This function calls PM_Terminate to terminate PMLIB.DLL and WML_ObjectTerminate to terminate WMOBJ.DLL.

If you have implemented the Object Manager security features, you must invoke WML_SecurityLogout or the equivalent calls to SSLIB.DLL after you call this function.

Return Value

WM_SUCCESS
WM_ERR_PRINT_NOT_INITIALIZED
WM_ERR_PRINTER

Related Functions
WML_PrintInitialize

WML: IMAGE REGISTRATION FUNCTIONS

The table that follows lists each of the image registration functions in the Workstation Manager Library along with its description.

| Function Name and Description |
|---|
| WML_RegisterInit<br>Initializes the registration module. |
| WML_RegisterFree<br>Frees the registration module. |
| WML_RegisterOpen<br>Opens a registration form. |
| WML_RegisterClose<br>Closes a registration form. |
| Technical Specifications<br>Adds a zone to be processed. |
| WML_RegisterClearZones<br>Clears all registration zones. |
| WML_RegisterImage<br>Performs registration on an image using a set of zones. |
| WML_RegisterObject<br>Performs registration on an object using a set of zones. |
| WML_RegisterGetErrorText<br>Gets the error string from the error code. |

---

Technical Specifications

WML_RegisterAddZone

Adds a zone to be processed.

Include Files

#include "wmregstr.h"

Syntax

```
int WINAPI WML_RegisterAddZone(
    HANDLE      hForm,
    UINT        nZoneNum,
    long        xOrig,
    long        yOrig,
    long        xWidth,
    long        yHeight);
```

Parameters:

| | |
|---|---|
| *hForm* | Handle to opened registration form. |
| *nZoneNum* | Zone number. |
| *xOrig* | Minimum X value of zone. |
| *yOrig* | Minimum Y value of zone. |
| *xWidth* | Maximum X value of zone. |
| *yHeight* | Maximum Y value of zone. |

Usage Notes

This function adds a zone to the registration engine. To be image resolution independent the *xOrig*, *yOrig*, *xWidth*, and *yHeight* parameters are to be in TWIPs (1 inch = 1440 TWIPs). If the values for *xOrig*, *yOrig*, *xWidth*, and *yHeight* are all zero, the zone is assumed to be the entire page.

Return Value

WM_SUCCESS
WM_ERR_REGISTER_NOT_INITIALIZED
WM_ERR_BAD_PARAMETER
WM_ERR_OUT_OF_MEMORY

Related Functions

WML_RegisterClearZones

---

WML_RegisterClearZones

Clears all registration zones.

Include Files
#include "wmregstr.h"

Syntax
```
int WINAPI WML_RegisterClearZones(
    HANDLE          hForm);
```

Parameters:

*hForm* Handle to opened registration form.

Usage Notes
This call clears all zones from the registration engine.

Return Value
WM_SUCCESS
WM_ERR_REGISTER_NOT_INITIALIZED
WM_ERR_BAD_PARAMETER
WM_ERR_OUT_OF_MEMORY Related Functions
Technical Specifications

----------

WML_RegisterClose

Closes a registration form.

Include Files
#include "wmregstr.h"

Syntax
```
int WINAPI WML_RegisterClose(
    HANDLE          hForm);
```

Parameters:

*hForm* Handle to opened registration form.

Usage Notes
This function frees the memory associated with the registration handle. This includes any zones and initialization information. You may open multiple registration forms at one time.

Return Value
WM_SUCCESS
WM_ERR_REGISTER_NOT_INITIALIZED
WM_ERR_BAD_PARAMETER
WM_ERR_OUT_OF_MEMORY Related Functions
WML_RegisterOpen

----------

WML_RegisterFree

Frees the registration module.

Include Files

#include "wmregstr.h"

Syntax

```
int WINAPI WML_RegisterFree(void);
```

Parameters

None.

Return Value

WM_SUCCESS

Related Functions

WML_RegisterInit

----------

WML_RegisterGetErrorText

Gets the error string from the error code.

Include Files

#include "wmregstr.h"

Syntax

```
LPSTR WINAPI WML_RegisterGetErrorText(
    int nErrorCode,
    LPSTR          lpszErrorTextBuffer,
    int cbErrorTextBuffer);
```

Parameters:

| | |
|---|---|
| *nErrorCode* | Error code. |
| *lpszErrorTextBuffer* | Error text buffer. |
| *cbErrorTextBuffer* | Size of error text buffer. |

Usage Notes

This function will attempt to find a string associated with the passed nErrorCode parameter. The nErrorCode should be an error code returned from the WML_Register functions.

Return Value

Returns the pointer to the passed error buffer, lpszErrorTextBuffer. The error buffer will be filled with the error string associated with the passed error code, nErrorCode. If the error string does not fit into the error buffer, the string will be truncated.

---

WML_RegisterImage

Performs registration on an image using a set of zones.

Include Files

#include "wmregstr.h"

Syntax

```
int WINAPI WML_RegisterImage(
    HANDLE      hForm,
    LPCSTR      lpszInFile,
    LPCSTR      lpszOutFile);
```

Parameters:

*hForm* Handle to opened registration form.

*lpszInFile* Image file to register.

*lpszOutFile* Filename for new registered image.

Usage Notes

This call performs the actual registration on an image. If the lpszOutFile is NULL, the registration engine will overwrite the lpszInFile.

Return Value

WM_SUCCESS
WM_ERR_REGISTER_NOT_INITIALIZED
WM_ERR_BAD_PARAMETER
WM_ERR_OUT_OF_MEMORY
WM_ERR_REGISTER_NO_ZONES_WERE_FOUND
WM_ERR_REGISTER_IMAGE_RESOLUTION

Related Functions

WML_RegisterObject

---

WML_RegisterInit

Initializes the registration module.

Include Files

#include "wmregstr.h"

Syntax

```
int WINAPI WML_RegisterInit(void);
```

Parameters

None.

Return Value

WM_SUCCESS

WM_ERR_REGISTER_NOT_INITIALIZED

Related Functions
WML_RegisterFree

---

WML_RegisterObject

Performs registration on an object using a set of zones.

Include Files
#include "wmregstr.h"

Syntax
```
int WINAPI WML_RegisterObject(
     HANDLE          hForm,
     LPVMHOBJECT     lpObjHandle);
```

Parameters:

*hForm* Handle to opened registration form.

*lpObjHandle* Pointer to an object handle.

Usage Notes
This call performs the actual registration on a volume manager object, but assumes that the application developer has added at least one zone to the initialized registration engine.

Return Value
WM_SUCCESS
WM_ERR_REGISTER_NOT_INITIALIZED
WM_ERR_BAD_PARAMETER
WM_ERR_OUT_OF_MEMORY
WM_ERR_REGISTER_NO_ZONES_WERE_FOUND
WM_ERR_REGISTER_IMAGE_RESOLUTION
WM_ERR_OBJECT
WM_ERR_OBJECTATTRIB
WM_ERR_REGISTER_INVALID_OBJECT Related Functions
WML_RegisterImage

---

WML_RegisterOpen

Opens a registration form.

Include Files
#include "wmregstr.h"

Syntax

```
int WINAPI WML_RegisterOpen(
    LPCSTR          lpszImageFile,
    HANDLE far      *lphForm);
```

Parameters:

*lpszImageFile* Master form image file name.

*lphForm* Handle to opened registration form.

Usage Notes

This function returns a registration handle that is to be used during the life cycle of the registration process. The lpszImageFile parameter specifies the master form that is used to register any form passed to the WML_RegisterImage or WML_RegisterObject functions.

Return Value

WM_SUCCESS
WM_ERR_REGISTER_NOT_INITIALIZED
WM_ERR_BAD_PARAMETER
WM_ERR_OUT_OF_MEMORY

Related Functions

WML_RegisterClose

WML: SCAN FUNCTIONS

The table that follows lists each of the scan functions in the Workstation Manager Library along with its description.

| Function Name and Description |
|---|
| WML_ScanInitialize<br>Initializes the Workstation Manager Scan library (WMSCAN). |
| WML_ScanUninitialize<br>Uninitializes the Workstation Manager Scan library (WMSCAN). |
| WML_ScanGetVersion<br>Returns a string that gives the version of the Workstation Manager Scan Library (WMSCAN). |

| |
|---|
| WML_ScanSelectScanner<br>Displays a dialog that lets users select from a list of scanners that are available on the system. |
| WML_ScanConfigure<br>Displays the scanner configuration dialog box. |
| WML_ScanSetConfigure<br>Configures the current scanner to the scan parameters of the named configuration. |
| WML_ScanPage<br>Scans a single page. |
| WML_ScanMultiplePages<br>Scans multiple pages. |
| WML_ScanMultiplePagesEx<br>Scans multiple pages, and returns a string that indicates which pages, if any, were separator pages. |
| WML_ScanGetFilename<br>Retrieves the full pathname of a specific page created by WML_ScanMultiplePages or WML_ScanMultiplePagesEx. |
| WML_ScanBuildThumbnail<br>Creates the thumbnail data structure for a specified image file. |

---

*Technical Specifications*

WML_ScanBuildThumbnail

Creates the thumbnail data structure for a specified image file.

Include Files

```
#include "wmscan.h"
```

Syntax

```
int WINAPI WML_ScanBuildThumbnail(
    HANDLE        hContext,
    LPCSTR        lpszFilename,
    void FAR *    graphic);
```

Parameters

| | |
|---|---|
| *hContext* | Scan Context from WML_ScanInitialize. |
| *lpszFilename* | The pathname of the image file to thumbnail. |
| *graphic* | A 512 byte buffer to hold the thumbnail image. |

Return Value

WM_SUCCESS
WM_ERR_SCAN_NOT_INITIALIZED
WM_ERR_SCANNER

----------

WML_ScanConfigure

Displays the scanner configuration dialog box.

Include Files

```
#include "wmscan.h"
```

Syntax

```
int FAR PASCAL WML_ScanConfigure(
    HANDLE      hScanContext,
    HWND        hWnd,
    LPSTR       lpszConfigName);
```

Parameters

| | |
|---|---|
| *hScanContext* | Scanner context returned from WML_ScanInitialize. |
| *hWnd* | Window handle of the calling application. |
| *lpszConfigName* | Default configuration name to select in the dialog box upon initial display. If this is null, the current configuration is used. The function returns the selected configuration name. |

Usage Notes

The scanner configuration dialog box provides a means for the user to define new configurations or to select an existing configuration by name from a list.

- To select a configuration, the user chooses its name from the Configuration Name pull-down list and clicks on OK.
- To define a new configuration, the user types a new name in the Configuration Name field and then clicks on Define. The dialog box expands to display the configuration parameters.

Return Value

WM_SUCCESS
WM_ERR_SCAN_NOT_INITIALIZED

Related Functions

WML_ScanSetConfigure

----------

WML_ScanGetFilename

Retrieves the full pathname of a specific page created by WML_ScanMultiplePages or WML_ScanMultiplePagesEx.

Include Files

#include "wmscan.h"

Syntax

```
int FAR PASCAL WML_ScanGetFilename(
    LPCSTR          lpszFirstImage,
    UINT            nPage,
    LPCSTR          lpszResult);
```

Parameters

| | |
|---|---|
| *lpszFirstImage* | First image name (returned from WML_ScanMultiplePages or WML_ScanMultiplePagesEx). |
| *nPage* | Page number of the desired page. The first page is page 0. |
| *lpszResult* | Full pathname of the resulting image. |

Return Value

WM_SUCCESS
WM_ERR_SCAN_NOT_INITIALIZED
WM_ERR_SCANNER

Related Functions

WML_ScanMultiplePages
WML_ScanMultiplePagesEx

----------

WML_ScanGetVersion

Returns a string that gives the version of the Workstation Manager Scan Library (WMSCAN).

Include Files

#include "wmscan.h"

Syntax

```
int WINAPI WML_ScanGetVersion(
    LPSTR           lpszResultBuf,
    int cbBuffer);
```

Parameters

| *Variable* | Description |
|---|---|
| *lpszResultBuf* | Buffer to hold version string. |

*cbBuffer* Length of result buffer.

Return Value
WM_SUCCESS

---

WML_ScanInitialize
Initializes the Workstation Manager Scan library (WMSCAN).

Include Files
#include "wmscan.h"

Syntax
```
int FAR PASCAL WML_ScanInitialize(
    LPHANDLE      lphScanContext,
    HWND          hWnd);
```

Parameters

| | |
|---|---|
| lphScanContext | Scan Context value that is returned on Scan library calls. |
| hWnd | Window handle of the calling application. |

Usage Notes
This function creates a Scan Context, which is required for most other calls in the Scan library.

Return Value
WM_SUCCESS
WM_ERR_SCAN_NOT_INITIALIZED
WM_ERR_NOSCANNER

Related Functions
WML_ScanUninitialize

---------

WML_ScanMultiplePages

Scans multiple pages.

Include Files

#include "wmscan.h"

Syntax

```
int FAR PASCAL WML_ScanMultiplePages(
    HANDLE      hScanContext,
    HWND        hWnd,
    LPCSTR      lpszBaseFileName,
    UINT        nImageType,
    UINT        nCompression,
    WORD        wMaxPages,
    HWND        hPreviewWnd,
    LPSTR       lpszFirstImage,
    LPWORD      lpwImagesScanned);
```

Parameters

| | |
|---|---|
| hScanContext | ScanContext from WML_ScanInitialize. |
| hWnd | Window handle of the calling application. |
| lpszBaseFileName | Full path, plus up through four characters to use as base for naming multiple pages. Example: C:\IMAGES\PAGE will produce images named C:\IMAGES\PAGENNNN.XXX. |
| nImageType | Constant for the image type to produce. Valid values are:<br>IMAGETYPE_CALS<br>IMAGETYPE_PCX<br>IMAGETYPE_TIFF |
| nCompression | Constant for the compression type to produce.Valid values are:<br>GROUP31D<br>GROUP32D<br>GROUP4<br>RAW<br>PACKBYTES |
| wMaxPages | Maximum number of pages to scan or specify 0 to scan all pages in the sheet feeder. |
| hPreviewWnd | Window handle of the window to use for previewing images as they are scanned. Specify null for no preview. |
| *lpszFirstImage* | Returned value of the full pathname of the first image produced. |
| *lpwImagesScanned* | Returned value of the number of pages actually scanned. |

---------

Usage Notes

Note the following about image type and compression:

- For IMAGETYPE_CALS, compression must be GROUP4.
- For IMAGETYPE_PCX, compression must be PACKBYTES.
- For IMAGETYPE_TIFF, compression cannot be PACKBYTES.

Return Value

WM_SUCCESS
WM_ERR_SCAN_NOT_INITIALIZED
WM_ERR_SCANNER

Related Functions

WML_ScanMultiplePagesEx
WML_ScanGetFilename

---------

WML_ScanMultiplePagesEx

Scans multiple pages, and returns a string that indicates which pages, if any, were separator pages.

Include Files

```
#include "wmscan.h"
```

Syntax

```
int FAR PASCAL WML_ScanMultiplePages(
    HANDLE      hScanContext,
    HWND        hWnd,
    LPCSTR      lpszBaseFileName,
    UINT        nImageType,
    UINT        nCompression,
    WORD        wMaxPages,
    HWND        hPreviewWnd,
    LPSTR       lpszFirstImage,
    LPWORD      lpwImagesScanned,
    LPSTR       lpszPageSepArray);
```

Parameters

| | |
|---|---|
| hScanContext | Scan Context from WML_ScanInitialize. |
| hWnd | Window handle of the calling application. |
| lpszBaseFileName | Full path, plus up through four characters to use as base for naming multiple pages. Example: C:\IMAGES\PAGE will produce images named C:\IMAGES\PAGENNNN.XXX. |

| | |
|---|---|
| nImageType | Constant for the image type to produce. Valid values are:<br>IMAGETYPE_CALS<br>IMAGETYPE_PCX<br>IMAGETYPE_TIFF |
| nCompression | Constant for the compression type to produce.Valid values are:<br>GROUP31D<br>GROUP32D<br>GROUP4<br>RAW<br>PACKBYTES |
| wMaxPages | Maximum number of pages to scan or specify 0 to scan all pages in the sheet feeder. |
| hPreviewWnd | Window handle of the window to use for previewing images as they are scanned. Specify null for no preview. |
| *lpszFirstImage* | Returned value of the full pathname of the first image produced. |
| *lpwImagesScanned* | Returned value of the number of pages actually scanned. |
| *lpszPageSepArray* | Array that contains a character to indicate whether a given page is a separator page. Each position in the string corresponds to a page and contains one of the following:<br>NULL—Not a separator.<br>0—Document separator<br>1—Image separator |

Usage Notes

Note the following about image type and compression:

- For IMAGETYPE_CALS, compression must be GROUP4.
- For IMAGETYPE_PCX, compression must be PACKBYTES.
- For IMAGETYPE_TIFF, compression cannot be PACKBYTES.

Return Value

WM_SUCCESS
WM_ERR_SCAN_NOT_INITIALIZED
WM_ERR_SCANNER

Related Functions

WML_ScanMultiplePages
WML_ScanGetFilename

----------

WML_ScanPage

Scans a single page.

Include Files

#include "wmscan.h"

Syntax

```
int FAR PASCAL WML_ScanPage(
    HANDLE      hScanContext,
    HWND        hWnd,
    LPCSTR      lpszFileName,
    UINT        nImageType,
    UINT        nCompression,
    HWND        hPreviewWnd);
```

Parameters

| | |
|---|---|
| hScanContext | ScanContext from WML_ScanInitialize. |
| hWnd | Window handle of the calling application. |
| lpszFileName | Full path of the image to create. |
| nImageType | Constant for the image type to produce. Valid values are:<br>IMAGETYPE_CALS<br>IMAGETYPE_PCX<br>IMAGETYPE_TIFF |
| nCompression | Constant for the compression type to produce. Valid values are:<br>GROUP31D<br>GROUP32D<br>GROUP4<br>RAW<br>PACKBYTES |
| hPreviewWnd | Window handle of the window to use for previewing images as they are scanned. Specify null for no preview. |

Usage Notes

Note the following about image type and compression:

- For IMAGETYPE_CALS, compression must be GROUP4.
- For IMAGETYPE_PCX, compression must be PACKBYTES.
- For IMAGETYPE_TIFF, compression cannot be PACKBYTES.

Return Value

WM_SUCCESS
WM_ERR_SCAN_NOT_INITIALIZED
WM_ERR_SCANNER

Related Functions

WML_ScanMultiplePages
WML_ScanMultiplePagesEx

---

WML_ScanSelectScanner

Displays a dialog that lets users select from a list of scanners that are available on the system.

Include Files

#include "wmscan.h"

Syntax

```
int FAR PASCAL WML_ScanSelectScanner(
    HANDLE      hScanContext,
    HWND        hWnd);
```

Parameters

| | |
|---|---|
| *hScanContext* | Scan Context from WML_ScanInitialize. |
| *hWnd* | Window handle of the calling application. |

Usage Notes

The selected scanner will be used for all subsequent WML_Scan calls for the session. The Scanner Selection window appears when this function is called.

Return Value

WM_SUCCESS
WM_ERR_SCAN_NOT_INITIALIZED
WM_ERR_SCANNER

---

WML_ScanSetConfigure

Configures the current scanner to the scan parameters of the named configuration.

Include Files

#include "wmscan.h"

Syntax

```
int FAR PASCAL WML_ScanSetConfigure(
    HANDLE      hScanContext,
    HWND        hWnd,
    LPCSTR      lpszConfigName);
```

Parameters

| | |
|---|---|
| *hScanContext* | Scan Context from WML_ScanInitialize. |
| *hWnd* | Window handle of the calling application. |
| *lpszConfigFile* | Configuration name, as displayed on the WML_ScanConfigure dialog. |

Return Value

WM_SUCCESS

WM_ERR_SCAN_NOT_INITIALIZED

Related Functions

WML_ScanConfigure

---------

WML_ScanUninitialize

Uninitializes the Workstation Manager Scan library (WMSCAN).

Include Files

```
#include "wmscan.h"
```

Syntax

```
int FAR PASCAL WML_ScanUninitialize(
    HANDLE          hScanContext,
    HWND            hWnd);
```

Parameters

*hScanContext* Scan Context from WML_ScanInitialize.

*hWnd* Window handle of the calling application.

Return Value

WM_SUCCESS
WM_ERR_SCAN_NOT_INITIALIZED
WM_ERR_SCANNER

Related Functions

WML_ScanInitialize

WML: SECURITY FUNCTIONS

The table that follows lists each of the security functions in the Workstation Manager Library along with its description.

| Function Name and Description |
|---|
| WML_SecurityLogin<br>Logs in the current task. |
| WML_SecurityIsLoggedIn<br>Reports the login status of the current user. |

| |
|---|
| WML_SecurityWaitForLogin<br>Blocks the calling task until either the current task is logged into OBJECT MANAGER OR THE SPECIFIED TIMEOUT HAS EXPIRED. |
| WML_SecurityGetDefServer<br>Retrieves the default Security Server name. |
| WML_SecuritySetDefServer<br>Sets the default Security Server name. |
| WML_SecurityIsAssociatedTask<br>Queries if the specified task is associated with the current task. |
| WML_SecurityAssociateTask<br>Associates the specified task with the current task. |
| WML_SecurityDisassociateTask<br>Disassociates the specified task from the current task. |
| WML_SecurityLogout<br>Logs out the current task and all associated tasks (if applicable). |

*Technical Specifications*

WML_SecurityAssociateTask

Associates the specified task with the current task.

Include Files

```
#include "wmsecure.h"
```

Syntax

```
int WINAPI WML_SecurityAssociateTask(
    UINT          nTargetHandle,
    UINT          nHandleType);
```

Parameters

*nTargetHandle* Target handle of the specified task. This parameter is interpreted by the next parameter. An application can specify that a target task be granted privileges by the target task handle directly, by an instance handle of the target task, or by any window handle that belongs to the target task.

*nHandleType* nTargetHandle handle type. Available types are:

TASK_HANDLE,
INSTANCE_HANDLE,
HWND_HANDLE.

Usage Notes

Associating a task means that the current task grants its full privileges to another task. Associating the current task to an already associated task of the same user is valid. Attempting to associate the current task to an already associated task of another user produces an error.

After associating two (or more) tasks, any actions related to the access privileges of any one of the granted tasks affect all of the associated tasks; that is, if a task is logged out from the system, all other tasks associated with it are also logged out.

Return Values

WM_SUCCESS
WM_ERR_ASSOCIATED_TASK
WM_ERR_INVALID_HANDLE_TYPE
WM_ERR_NOT_LOGGED_IN
WM_ERR_TASK_NOT_FOUND

Related Functions

WML_SecurityDisassociateTask
WML_SecurityIsAssociatedTask

---

WML_SecurityDisassociateTask

Disassociates the specified task from the current task.

Include Files

#include "wmsecure.h"

Syntax

```
int WINAPI WML_SecurityDisassociateTask(
      UINT            nTargetHandle,
      UINT            NType);
```

Parameters

*nTargetHandle* Target handle of the specified task. This parameter is interpreted by the next parameter. An application can specify that a target task be granted privileges by the target task handle directly, by an instance handle of the target task, or by any window handle that belongs to the target task.

*nHandleType* nTargetHandle handle type. Available types are:

TASK_HANDLE
INSTANCE_HANDLE
HWND_HANDLE

Return Values
WM_SUCCESS
WM_ERR_ASSOCIATED_TASK
WM_ERR_INVALID_HANDLE_TYPE
WM_ERR_NOT_LOGGED_IN
WM_ERR_TASK_NOT_FOUND Related Functions
WML_SecurityAssociateTask
WML_SecurityIsAssociatedTask

---------

WML_SecurityGetDefServer
Retrieves the default Security Server name.

Include Files
#include "wmsecure.h"

Syntax
```
int WINAPI WML_SecurityGetDefServer(
    int nBufLen,
    LPSTR            lpszResultBuffer);
```

Parameters

*nBufLen* Length of the result buffer pointed to by lpszResultBuffer.

*lpszResultBuffer* Pointer to the result buffer to store the default Security Server name. This buffer must be large enough to store the whole server name string, including a null terminator.

Return Values
WM_SUCCESS
WM_ERR_INVALID_RESULT_BUFFER
WM_ERR_TOO_SMALL_RESULT_BUFFER Related Functions
WML_SecuritySetDefServer

---

WML_SecurityIsAssociatedTask

Queries if the specified task is associated with the current task.

Include Files

#include "wmsecure.h"

Syntax

```
int WINAPI WML_SecurityIsAssociatedTask(
    UINT        nTargetHandle,
    UINT        NType,
    LPBOOL      lpResult);
```

Parameters

*nTargetHandle* Target handle of the specified task. This parameter is interpreted by the next parameter. An application can specify a target task to be granted the privileges by the task handle directly or instance handle of the particular task, or any window handle that belongs to the particular task.

*nHandleType* Type of handle of nTargetHandle. Available types are:

TASK_HANDLE
INSTANCE_HANDLE
HWND_HANDLE.

*lpResult* Location to store the return result.

- True—Specified task associated with the current task.
- False—Specified task not associated with the current task.

Return Values

WM_SUCCESS
WM_ERR_INVALID_HANDLE_TYPE
WM_ERR_INVALID_RESULT_BUFFER
WM_ERR_NOT_LOGGED_IN
WM_ERR_TASK_NOT_FOUND

Related Functions

WML_SecurityAssociateTask
WML_SecurityDisassociateTask

---

WML_SecurityIsLoggedIn

Reports the login status of the current user.

Include Files

#include "wmsecure.h"

Syntax

```
BOOL WINAPI WML_SecurityIsLoggedIn(void)
```

Parameters

None.

Usage Notes

The function returns True if the current user is already logged into Object Manager. The function returns False if the user is not already logged into Object Manager.

Return Values

TRUE
FALSE

---

WML_SecurityLogin

Logs in the current task.

Include Files

```
#include "wmsecure.h"
```

Syntax

```
int WINAPI WML_SecurityLogin(
    LPSTR       lpszUserName,
    LPSTR       lpszPassword,
    BOOL        bLoginDialog,
    HWND        hwndParent);
```

Parameters

| | |
|---|---|
| *lpszUserName* | If bLoginDialog is True and this parameter is not null or an empty string, it is used to fill in the username edit box in the login dialog box. If the parameter is not null but is an empty string, it must point to the buffer that is large enough to store the username from the username edit box because this username will be copied into the buffer when the function returns. If bLoginDialog is False, both lpszUserName and lpszPassword must be specified. |
| *lpszPassword* | If *bLoginDialog* is True, this parameter is ignored. If *bLoginDialog* is False, the parameter must be specified and it will be cleared when the function returns. |
| *bLoginDialog* | If True, it always displays the popup login dialog box and the user has to press the LOGIN button to login the current task. |
| *hwndParent* | Handle to parent window. |

Usage Notes

The log in takes place by means of either the popup login dialog box or an explicitly supplied username and password.

Return Values
WM_SUCCESS
WM_ERR_INVALID_RESULT_BUFFER
WM_ERR_TOO_SMALL_RESULT_BUFFER Related Functions
WML_SecurityLogout

---------

WML_SecurityLogout
Logs out the current task and all associated tasks (if applicable).

Include Files
#include "wmsecure.h"

Syntax
int WINAPI WML_SecurityLogout(void);

Parameters
None.

Return Values
WM_SUCCESS
WM_ERR_NETWORK_ERROR
WM_ERR_INVALID_HANDLE_TYPE
WM_ERR_NOT_LOGGED_IN
WM_ERR_INVALID_RESULT_BUFFER
WM_ERR_TOO_SMALL_RESULT_BUFFER Related Functions
WML_SecurityLogin

----------

WML_SecuritySetDefServer
Sets the default Security Server name.

Include Files
#include "wmsecure.h"

Syntax
int WINAPI WML_SecuritySetDefServer(LPSTR lpszServerName);

Parameters
*lpszServerName* New default Security Server name.

Usage Notes
This is the default Security Server that will be used in authenticating users.

Return Values
WM_SUCCESS
WM_ERR_BAD_SERVER_NAME

Related Functions
WML_SecurityGetDefServer

----------

WML_SecurityWaitForLogin

Blocks the calling task until either the current task is logged into Object Manager or the specified timeout has expired.

Include Files
#include "wmsecure.h"

Syntax:
```
int WINAPI WML_SecurityWaitForLogin(
    UINT            nTimeout);
```

Parameters

*nTimeout* Unit in seconds.

Usage Notes
The calling task achieves logged in status by means of another task being associated with the current task. For example, task A begins and spawns task B for image viewing. When task B begins it calls WML_SecurityWaitForLogin(30) and waits for a maximum of 30 seconds for task A to initiate the login procedure. When task A completes a successful login, task A associates task B with the call WML_SecurityAssociateTask(hTaskB, TASK_HANDLE). In task B, the call to WML_SecurityWaitForLogin(30) returns with WM_SUCCESS.

Return Values
WM_SUCCESS
WM_ERR_TIMEOUT

Related Functions
WML_SecurityAssociateTask

WML: TEMPLATE-BASED RECOGNITION FUNCTIONS

The template-based recognition functions in the Workstation Manager Library can be grouped by their use as: general operations; accessing templates; accessing zones; working with pages; and performing recognition and storing results. The tables that follow list each of the template-based recognition functions in the Workstation Manager Library by group along with its description.

*General Operations*

| Function Name and Description |
|---|
| WML_TemplateInit<br>Initializes the Workstation Manager Template (WMTEMPLT) module. |
| WML_TemplateFree<br>Frees the Workstation Manager Template (WMTEMPLT) module. |
| WML_TemplateGetErrorText<br>Gets the error string from the error code. |

*Accessing Templates*

| Function Name and Description |
|---|
| WML_TemplateGetCount<br>Gets the number of templates in the template database. |
| WML_TemplateGetNth<br>Gets the template name for the nth template. |
| WML_TemplateGetName<br>Gets the template name from the template ID. |
| WML_TemplateGetID<br>Gets the template ID from the template name. |
| WML_TemplateSelect<br>Displays a dialog box that lets users select a template from the existing templates. |
| WML_TemplateOpen<br>Opens a template using its template ID. |
| WML_TemplateOpenByName<br>Opens a template using its name. |

| |
|---|
| WML_TemplateClose<br>Closes a template. |

*Accessing Zones*

| Function Name and Description |
|---|
| WML_TemplateGetZones<br>Returns the number of zones in the specified template. |
| WML_TemplateGetZone<br>Gets the zone data for a particular zone. |
| WML_TemplateGetZoneByName<br>Searches the current template for a zone by name and returns the zone number for the matching zone. |
| WML_TemplateGetResult<br>Gets the results for a particular zone. |
| WML_TemplateSetResult<br>Sets the results for a particular zone. |
| WML_TemplateGetImage<br>Gets a visual copy of a particular zone. |
| WML_TemplateVerify<br>Displays a verification dialog that lets users visually compare the results of a particular zone with its corresponding image and edit the results as needed. |

*Working with Pages*

| Function Name and Description |
|---|
| WML_TemplateGetPages<br>Gets the number of pages in the specified template. |
| WML_TemplateGetPageImage<br>Gets the filename of the master image for the requested page in the template. |

*Performing Recognition and Storing Results*

| Function Name and Description |
|---|

| |
|---|
| WML_TemplateRecognize<br>Performs recognition on a set of images using the specified template. |
| WML_TemplateSaveResults<br>Saves the results from recognition to a result file. |
| WML_TemplateLoadResults<br>Loads a zone results file into memory. |
| WML_TemplateRegister<br>Performs registration on a set of images using the specified template. |

---

*Technical Specifications*

WML_TemplateClose

Closes a template.

Include Files

#include "wmtemplt.h"

Syntax int WINAPI WML_TemplateClose(HANDLE hTemplate);

Parameters

*hTemplate* Template handle.

Usage Notes

This function frees any memory associated with the template handle, including any results.

Return Values

WM_SUCCESS
WM_ERR_BAD_PARAMETER
WM_ERR_OUT_OF_MEMORY

Related Functions

WML_TemplateOpen
WML_TemplateOpenByName

---

WML_TemplateFree

Frees the Workstation Manager Template (WMTEMPLT) module.

Include Files

#include "wmtemplt.h"

Syntax int WINAPI WML_TemplateFree(void);

Parameters

None.

Return Values

WM_SUCCESS

Related Functions

WML_TemplateInit

---

WML_TemplateGetCount

Gets the number of templates in the template database.

Include Files

#include "wmtemplt.h"

Syntax int WINAPI WML_TemplateGetCount(LPWORD lpwTemplates);

Parameters

*lpwTemplates* Pointer to a WORD that contains the number of available templates in the template database on output.

Return Values

WM_SUCCESS
WM_ERR_INVALID_RESULT_BUFFER
WM_ERR_TEMPLATE_NOT_INITIALIZED
WM_ERR_TEMPLATE

Related Functions

WML_TemplateGetNth

---

WML_TemplateGetErrorText

Gets the error string from the error code.

Include Files

```
#include "wmtemplt.h"
```

Syntax

```
LPSTR FAR PASCAL WML_TemplateGetErrorText(
    int             nErrorCode,
    LPSTR           lpszErrorTextBuffer,
    int             cbErrorTextBuffer);
```

Parameters

| | |
|---|---|
| *nErrorCode* | Error code. |
| *lpszErrorTextBuffer* | Buffer to receive the error string associated with the given error code. |
| *cbErrorTextBuffer* | Size of the error text buffer. |

Usage Notes

This function will attempt to find a string associated with the passed nErrorCode parameter. The nErrorCode parameter should be an error code returned from the WML_Template functions.

Return Values

Returns the pointer to the passed error buffer, lpszErrorTextBuffer. The error buffer will be filled with the error string associated with the passed error code, nErrorCode. If the error string does not fit into the error buffer, the string will be truncated.

---

WML_TemplateGetID

Gets the template ID from the template name.

Include Files

```
#include "wmtemplt.h"
```

Syntax

```
int WINAPI WML_TemplateGetID(
    LPSTR           lpszTemplate,
    LPDWORD         lpdwID);
```

Parameters

| | |
|---|---|
| *lpszTemplate* | Pointer to a buffer that contains the template name. |
| *lpdwID* | Pointer to a buffer that contains the template ID for the requested template on output. |

Usage Notes

This function returns the template ID for the template with the name specified in the lpszTemplate parameter.

Return Values

WM_SUCCESS

WM_ERR_BAD_PARAMETER
WM_ERR_INVALID_RESULT_BUFFER
WM_ERR_TEMPLATE_NOT_INITIALIZED
WM_ERR_COULD_NOT_GET_TEMPLATE_NAME

Related Functions

WML_TemplateGetName

---

WML_TemplateGetImage

Gets a visual copy of a particular zone.

Include Files

#include "wmtemplt.h"

Syntax

```
int FAR PASCAL WML_TemplateGetImage(
    HANDLE          hTemplate,
    UINT            nZoneNum,
    LPSTR           lpszImageFiles,
    HBITMAP FAR *   lphDib);
```

Parameters

| | |
|---|---|
| *hTemplate* | Template handle. |
| *nZoneNum* | Zone number. |
| *lpszImageFiles* | Pointer to a list of files to be applied to the current template. |
| *lphDib* | Pointer to zone bitmap. |

Usage Notes

This function lets you retrieve a bitmap copy of a zone, so that it can be used in a verification operation.

The list pointed to by lpszImageFiles must include the exact number of image files that the current template expects to receive. The list of files must include fully qualified filenames separated by a single space(' '). The last filename should be immediately followed by a NULL terminator(0). The *lphDib* parameter will return a device independent bitmap (DIB) that can be freed by using the Windows SDK DeleteObject function.

Return Values

WM_SUCCESS
WM_ERR_INVALID_RESULT_BUFFER
WM_ERR_BAD_PARAMETER
WM_ERR_INVALID_TEMPLATE_HANDLE
WM_ERR_ZONE_NUMBER_OUTOFRANGE
WM_ERR_ZONE_NOT_FOUND
WM_ERR_IMAGELIST_MISSING_FILES

Related Functions
WML_TemplateVerify

----------

WML_TemplateGetName

Gets the template name from the template ID.

Include Files
#include "wmtemplt.h"

Syntax
```
int WINAPI WML_TemplateGetName(
    DWORD         dwID,
    LPSTR         lpszTemplate);
```

Parameters

*dwID* The template ID.

*lpszTemplate* Pointer to a buffer that contains the name of the requested template on output.

Usage Notes
The buffer for the template name must equal at least MAX_TEMPLATE_TITLE +1. (MAX_TEMPLATE_TITLE is defined in the WMTEMPLT.h header file).

Return Values
WM_SUCCESS
WM_ERR_INVALID_RESULT_BUFFER
WM_ERR_TEMPLATE_NOT_INITIALIZED
WM_ERR_COULD_NOT_GET_TEMPLATE_NAME Related Functions
WML_TemplateGetID

----------

WML_TemplateGetNth

Gets the template name for the nth template.

Include Files
#include "wmtemplt.h"

Syntax
```
int WINAPI WML_TemplateGetNth(
    WORD          wNthTemplate,
    LPSTR         lpszTemplate);
```

Parameters

| | |
|---|---|
| *wNthTemplate* | The offset into the available templates for the requested template. |
| *lpszTemplate* | Pointer to a buffer that contains the name of the requested template on output. |

Usage Notes

The wNthTemplate parameter must contain a value between 0 and the number of available templates minus one.

The buffer for the template name must equal at least MAX_TEMPLATE_TITLE +1. (MAX_TEMPLATE_TITLE is defined in the WMTEMPLT.h header file).

Return Values

WM_SUCCESS
WM_ERR_INVALID_RESULT_BUFFER
WM_ERR_TEMPLATE_NOT_INITIALIZED
WM_ERR_COULD_NOT_GET_TEMPLATE_NAME

Related Functions

WML_TemplateGetCount

---

WML_TemplateGetPageImage

Gets the filename of the master image for the requested page in the template.

Include Files

```
#include "wmtemplt.h"
```

Syntax

```
int WINAPI WML_TemplateGetPageImage(
    HANDLE      hTemplate,
    UINT        iPage,
    LPSTR       lpszFilename);
```

Parameters

| | |
|---|---|
| *hTemplate* | Template handle. |
| *iPage* | Index to the page whose image filename is to be retrieved. |
| *lpszFilename* | Pointer to a buffer that contains the filename of the image on output. |

Usage Notes

This function retrieves the filename of the image used to define the template. This image is the master image that should be used when a point of reference or an evaluation is required.

This function returns the filename of the image for the page specified by the iPage parameter. The index must be between 0 and the number of pages in the file minus 1. To obtain the number of pages, you can call tne WML_TemplateGetPages function.

Return Values

WM_SUCCESS
WM_ERR_BAD_PARAMETER
WM_ERR_INVALID_RESULT_BUFFER
WM_ERR_PAGE_NOT_FOUND
WM_ERR_TEMPLATE_NOT_INITIALIZED
WM_ERR_INVALID_TEMPLATE_HANDLE

Related Functions

WML_TemplateGetPages

---

WML_TemplateGetPages

Gets the number of pages in the specified template.

Include Files

#include "wmtemplt.h"

Syntax

```
int WINAPI WML_TemplateGetPages(
    HANDLE        hTemplate,
    LPINT         lpiNum);
```

Parameters

*hTemplate* Template handle.

*lpiNum* Pointer to an integer that contains the number of pages in the template on output.

Usage Notes

Templates can contain multiple pages, and each page is associated with an image file. Before you retrieve an image filename, you may need to retrieve the total number of pages in the template. This value can be used to ensure that a valid index is passed for the iPage parameter when calling the WML_TemplateGetPageImage function.

Return Values

WM_SUCCESS
WM_ERR_BAD_PARAMETER
WM_ERR_INVALID_RESULT_BUFFER
WM_ERR_TEMPLATE_NOT_INITIALIZED
WM_ERR_INVALID_TEMPLATE_HANDLE

Related Functions

WML_TemplateGetPageImage

---

WML_TemplateGetResult

Gets the results for a particular zone.

Include Files

#include "wmtemplt.h"

Syntax

```
int FAR PASCAL WML_TemplateGetResult(
    HANDLE      hTemplate,
    UINT        nZoneNum,
    LPSTR       lpszResultBuffer,
    UINT        cbResultBuffer,
    LPINT       lpnConfidenceLevel);
```

Parameters

| | |
|---|---|
| *hTemplate* | Template handle. |
| *nZoneNum* | Zone number. |
| *lpszResultBuffer* | Buffer to receive the zone's results. |
| *cbResultBuffer* | Size of lpszResultBuffer. |
| *lpnConfidenceLevel* | Receives the confidence level for the zone's results. |

Usage Notes

The results for a zone will be in string format. If the zone does not have results, the result buffer lpszResultBuffer will contain an empty string.

Return Values

WM_SUCCESS
WM_ERR_BAD_PARAMETER
WM_ERR_ZONE_NUMBER_OUTOFRANGE
WM_ERR_ZONE_NOT_FOUND
WM_ERR_OUT_OF_MEMORY

Related Functions

WML_TemplateSetResult
WML_TemplateSaveResults

---

WML_TemplateGetZone

Gets the zone data for a particular zone.

Include Files

#include "wmtemplt.h"

Syntax

```
int FAR PASCAL WML_TemplateGetZone(
    HANDLE      hTemplate,
```

```
UINT        nZoneNum,
LPZONE      lpZone);
```

Parameters

*hTemplate* Template handle.

*nZoneNum* Number of the specified zone.

*lpZone* Pointer to the ZONE buffer to receive the zone information.

Structures

This function will use the ZONE structure to return information about the requested zone. The ZONE structure is shown below.

```
typedef struct _ZONE
{
    char    szName[ MAX_ZONE_NAME + 2 ];    /* Zone name */
    UINT    nPageNum;                       /* 0..n */
    UINT    nZoneNum;                       /* 0..n */
    UINT    nZoneType;                      /* OCR, Barcode, Hand-Printing, OMR */
    long    xOrig;                          /* Minimum point, x (TWIPS) */
    long    yOrig;                          /* Minimum point, y (TWIPS) */
    long    Width;                          /* Width (TWIPS) */
    long    Height;                         /* Height (TWIPS) */
    long    dwZoom;                         /* Zoom ratio; i.e., 1:2 = MAKELPARAM(1,2) */
    UINT    nScroll;                        /* Scroll factor */

    union
    {
     OCRATTRIB          ocr;
     BARCODEATTRIB      bc;
     HANDPRINTATTRIB    hp;
     OMRATTRIB          omr;
    }ZoneAttrib;                            /* Zone attributes */

} ZONE, FAR *LPZONE;
```

The ZoneAttrib union contains the structures specific for each zone type; that is, OCR Attributes, Barcode Attributes, Hand-Printing Attributes, and Checkmark (OMR, or Optical Character Mark) Attributes. These structures are shown below.

```
/* OCR Attribute Structure */
typedef struct OCRATTRIB
{
    int iTypes;
}OCRATTRIB, far *LPOCRATTRIB;


/* Barcode Attribute Structure */
typedef struct _BARCODEATTRIB
{
    int iTypes;
    int iOrientation;
    int iQuality;
    int iCheckSum;
}BARCODEATTRIB, far *LPBARCODEATTRIB;


/* Hand-Printing Attribute Structure */
typedef struct _HANDPRINTATTRIB
{
    int iTypes;
    int iSegmentation;
    int iContext;
    int iVar4;
    float fCPI;
}HANDPRINTATTRIB, far *LPHANDPRINTATTRIB;


/* Checkmark(OMR) Attribute Structure */
typedef struct _OMRATTRIB
{
    int iTypes;
}OMRATTRIB, far *LPOMRATTRIB;
```

Return Values

WM_SUCCESS
WM_ERR_BAD_PARAMETER
WM_ERR_INVALID_RESULT_BUFFER
WM_ERR_INVALID_TEMPLATE_HANDLE
WM_ERR_ZONE_NUMBER_OUTOFRANGE
WM_ERR_ZONE_NOT_FOUND

Related Functions

WML_TemplateGetZones
WML_TemplateGetZoneByName

---

WML_TemplateGetZoneByName

Searches the current template for a zone by name and returns the zone number for the matching zone.

Include Files

#include "wmtemplt.h"

Syntax

```
int FAR PASCAL WML_TemplateGetZoneByName(
    HANDLE      hTemplate,
    LPCSTR      lpstrName,
    LPINT       lpiNum);
```

Parameters

*hTemplate* Template handle.

*lpstrName* Zone name to look for.

*lpiNum* Zone number that matches lpstrName.

Usage Notes

If lpiNum has a return value of -1, lpstrName is not the name of any of the zones in the currently opened template.

Return Values

WM_SUCCESS
WM_ERR_BAD_PARAMETER
WM_ERR_INVALID_RESULT_BUFFER
WM_ERR_INVALID_TEMPLATE_HANDLE
WM_ERR_ZONE_NOT_FOUND

Related Functions

WML_TemplateGetZone
WML_TemplateGetZones

---

WML_TemplateGetZones

Returns the number of zones in the specified template.

Include Files

#include "wmtemplt.h"

Syntax

```
int FAR PASCAL WML_TemplateGetZones(
    HANDLE      hTemplate,
    LPINT       lpiNum);
```

Parameter

*hTemplate* Template handle.

*lpiNum* Pointer to a buffer that contains the number of zones in the specified template on output.

Return Values

WM_SUCCESS
WM_ERR_BAD_PARAMETER
WM_ERR_INVALID_RESULT_BUFFER
WM_ERR_INVALID_TEMPLATE_HANDLE

Related Functions
WML_TemplateGetZone
WML_TemplateGetZoneByName

----------

WML_TemplateInit

Initializes the Workstation Manager Template (WMTEMPLT) module.

Include Files
#include "wmtemplt.h"

Syntax
int WINAPI WML_TemplateInit(void);

Parameters
None.

Return Values
WM_SUCCESS
WM_ERR_COULD_NOT_OPEN_DB

Related Functions
WML_TemplateFree

----------

WML_TemplateLoadResults

Loads a zone results file into memory.

Include Files
#include "wmtemplt.h"

Syntax
```
int FAR PASCAL WML_TemplateLoadResults(
    LPCSTR        lpszResultFile,
    LPHANDLE      lphTemplate);
```

Parameters

| | |
|---|---|
| *lpszResultFile* | Pointer to a buffer that contains the filename for the results file. |
| *lphTemplate* | Pointer to a handle to a template. |

Usage Notes
This function opens a template and sets the corresponding zone results buffers, thus restoring the template module to the state when the results file was saved.

The result file will contain the template name and the results and confidence levels for each zone. However, the result file does not retain the image file(s) or their filenames; therefore, you must maintain the images in your application, if more recognition is required or verification is necessary.

Return Values
WM_SUCCESS
WM_ERR_INVALID_RESULT_BUFFER
WM_ERR_BAD_PARAMETER
WM_ERR_INVALID_RESULT_FILE
WM_ERR_RESULT_FILE_VER_NOT_SUPPORTED
WM_ERR_INVALID_TEMPLATE_HANDLE
WM_ERR_ZONE_NOT_FOUND
WM_ERR_OUT_OF_MEMORY Related Functions
WML_TemplateRegister
WML_TemplateSaveResults

---

WML_TemplateOpen

Opens a template using its template ID.

Include Files
#include "wmtemplt.h"

Syntax
```
int FAR PASCAL WML_TemplateOpen(
    DWORD        dwTemplateID,
    LPHANDLE     lphTemplate);
```

Parameters

*dwTemplateID* Template ID of the template to be opened.

*lphTemplate* Pointer to the template handle.

Usage Notes
This function returns the template handle that you must use to identify a template when making a call to any of the WML_Template functions that require a template handle. The handle remains valid until WML_TemplateClose is called with this handle.

Return Values
WM_SUCCESS
WM_ERR_BAD_PARAMETER
WM_ERR_INVALID_RESULT_BUFFER
WM_ERR_OUT_OF_MEMORY
WM_ERR_COULD_NOT_GET_TEMPLATE Related Functions WML_TemplateFree
WML_TemplateOpenByName

----------

WML_TemplateOpenByName

Opens a template using its name.

Include Files

#include "wmtemplt.h"

Syntax

```
int WINAPI WML_TemplateOpenByName(
    LPSTR           lpstrTemplate,
    LPHANDLE        lphTemplate);
```

Parameters

*lpszTemplate* Name of the template to be opened.

*lphTemplate* Pointer to the template handle.

Usage Notes

This function returns the template handle that you must use to identify a template when making a call to any of the WML_Template functions that require a template handle. The handle remains valid until WML_TemplateClose is called with this handle.

Return Values

WM_SUCCESS
WM_ERR_BAD_PARAMETER
WM_ERR_INVALID_RESULT_BUFFER
WM_ERR_OUT_OF_MEMORY
WM_ERR_COULD_NOT_GET_TEMPLATE

Related Functions

WML_TemplateClose
WML_TemplateOpen

----------

WML_TemplateRecognize

Performs recognition on a set of images using the specified template.

Include Files

#include "wmtemplt.h"

Syntax

```
int FAR PASCAL WML_TemplateRecognize(
```

```
HANDLE       hTemplate,
LPCSTR       lpszImageFiles);
```

Parameters

*hTemplate* — Handle of template.

*lpszImageFiles* — Pointer to a list of files to be applied to the specified template.

Usage Notes

The lpszImageFiles parameter must include full paths for all the files passed. Use a space to separate filenames from each other.

Since a template can have more than one page, the number of files passed needs to equal the number of pages in the template. You can verify the number of pages required by a template by calling the WML_TemplateGetPages function.

Return Values

WM_SUCCESS
WM_ERR_BAD_PARAMETER
WM_ERR_INVALID_TEMPLATE_HANDLE
WM_ERR_IMAGELIST_MISSING_FILES
WM_ERR_ZONE_NOT_FOUND
WM_ERR_OUT_OF_MEMORY

----------

WML_TemplateRegister

Performs registration on a set of images using the specified template.

Include Files

#include "wmtemplt.h"

Syntax

```
int WINAPI WML_TemplateRegister(
      HANDLE       hTemplate,
      LPCSTR       lpszSourceFiles,
      LPCSTR       lpszTargetFiles);
```

Parameters

*hTemplate* — Handle to a template.

*lpszSourceFiles* — Pointer to a list of source image filenames.

*lpszTargetFiles* — Pointer to a list of target image filenames.

Usage Notes

If the lpszTargetFiles parameter is NULL, the source file(s) will be overwritten with the registered images.

Return Values

WM_SUCCESS
WM_ERR_BAD_PARAMETER
WM_ERR_INVALID_RESULT_BUFFER

WM_ERR_COULD_NOT_LOAD_WMREGISTER
WM_ERR_TEMPLATE_NOT_INITIALIZED
WM_ERR_INVALID_TEMPLATE_HANDLE
WM_ERR_OUT_OF_MEMORY

Related Functions

WML_TemplateLoadResults

----------

WML_TemplateSaveResults

Saves the results from recognition to a result file.

Include Files

#include "wmtemplt.h"

Syntax

```
int FAR PASCAL WML_TemplateSaveResults(
    HANDLE        hTemplate,
    LPCSTR        lpszResultFile);
```

Parameters

*hTemplate* Handle to a template.

*lpszResultFile* Pointer to a buffer that contains the filename to use for the results file.

Usage Notes

The results file will contain the template name and the results and confidence levels for each zone. However, the results file does not retain any information about the image files used to produce the results; therefore you must maintain the images elsewhere, if more recognition is required or verification is necessary at a later stage.

Return Values

WM_SUCCESS
WM_ERR_BAD_PARAMETER
WM_ERR_INVALID_TEMPLATE_HANDLE
WM_ERR_FAILED_OPEN_FILE
WM_ERR_ZONE_NOT_FOUND
WM_ERR_WRITE_FILE

Related Functions

WML_TemplateLoadResults

----------

WML_TemplateSelect

Displays a dialog box that lets users select a template from the existing templates.

Include Files
#include "wmtemplt.h"

Syntax

```
int FAR PASCAL WML_TemplateSelect(
    HWND            hWndParent,
    DWORD FAR *     lpdwID,
    LPSTR           lpszTemplateName,
    UINT            cbTemplateName);
```

Parameters

| | |
|---|---|
| *hWndParent* | Parent window. |
| *lpdwID* | Buffer that receives the selected template id. |
| *lpszTemplateName* | Buffer that receives the selected template name. |
| *cbTemplateName* | Size of lpszTemplateName. |

Usage Notes
This function only passes back the name of the selected template. It does not open the template.

The template selection dialog is shown below.

Return Values
WM_SUCCESS
WM_ERR_INVALID_RESULT_BUFFER
WM_ERR_TOO_SMALL_RESULT_BUFFER
WM_ERR_NO_TEMPLATE_SELECTED

----------

WML_TemplateSetResult
Sets the results for a particular zone.

Include Files
#include "wmtemplt.h"

Syntax

```
int FAR PASCAL WML_TemplateSetResult(
    HANDLE          hTemplate,
    UINT            nZoneNum,
    LPSTR           lpszResultBuffer);
```

Parameters

| | |
|---|---|
| *hTemplate* | Template handle. |
| *nZoneNum* | Zone number. |
| *lpszResultBuffer* | Buffer that contains the new zone's results. |

Usage Notes

This function copies the string data passed in the lpszResultBuffer parameter into the internal results buffer for the specified zone.

Return Values

WM_SUCCESS
WM_ERR_BAD_PARAMETER
WM_ERR_INVALID_TEMPLATE_HANDLE
WM_ERR_ZONE_NUMBER_OUTOFRANGE
WM_ERR_ZONE_NOT_FOUND
WM_ERR_OUT_OF_MEMORY

Related Functions

WML_TemplateGetResult

---

WML_TemplateVerify

Displays a verification dialog that lets users visually compare the results of a particular zone with its corresponding image and edit the results as needed.

Include Files

```
#include "wmtemplt.h"
```

Syntax

```
int FAR PASCAL WML_TemplateVerify(
    HWND        hwndParent,
    HANDLE      hTemplate,
    UINT        nZoneNum,
    LPCSTR      lpszImageFiles,
    LPSTR       lpszResultBuffer,
    UINT        cbResultBuffer);
```

Parameters

| | |
|---|---|
| *hwndParent* | Handle of parent window. |
| *hTemplate* | Template handle. |
| *nZoneNum* | Zone number. |
| *lpszImageFiles* | Pointer to a list of files to be applied to the current template. Note: the list must include the exact number of image files that the current template expects to receive. |
| *lpszResultBuffer* | Buffer to receive the zone's edited results. |
| *cbResultBuffer* | Size of lpszResultBuffer. |

Usage Notes

Since a template can have more than one page, the number of files passed needs to equal the number of pages in the template. You can verify the number of pages required by a template by calling the WML_TemplateGetPages function.

Any changes made to the results in the verification dialog (shown below) are copied to the internal results buffer for the zone when the user selects OK. If the user selects Cancel, the changes are discarded.

Return Values

WM_SUCCESS
WM_ERR_BAD_PARAMETER
WM_ERR_INVALID_RESULT_BUFFER
WM_ERR_VALIDATE_IN_PROGRESS
WM_ERR_INVALID_TEMPLATE_HANDLE

Related Functions

WML_TemplateGetImage

WML: VIEW FUNCTIONS

The table that follows lists each of the view functions in the Workstation Manager Library along with its description.

| Function Name and Description |
| --- |
| WML_ViewInitialize<br>Initializes the Workstation Manager View library (WMVIEW). |
| WML_ViewUninitialize<br>Uninitializes the Workstation Manager View library (WMVIEW). |
| WML_ViewGetVersion<br>Returns a string that gives the version of the current Workstation Manager View library (WMVIEW). |
| WML_ViewGetApplication<br>Returns the name of the "viewer glue" for the application required to view an object. |
| WML_ViewObject<br>Retrieves an object and launches a viewing application to display the object. |
| WML_ViewFetchObject<br>Retrieves an object but does not launch the viewing application. |

*Technical Specifications*

WML_ViewFetchObject

Retrieves an object but does not launch the viewing application.

Include Files

```
#include "wmview.h"
```

Syntax

```
int WINAPI WML_ViewFetchObject(
    LPVMHOBJECT    lpObject,
    int nEdit,
    int nLevels);
```

Parameters

| | |
|---|---|
| *lpObject* | The object handle of the object to fetch. |
| *nEdit* | The desired edit level. |
| *nLevels* | If the object being fetched is a group, this specifies the number of levels deep in the object hierarchy to fetch. |

Return Values

WM_SUCCESS

Related Functions

WML_ViewObject

WML_ViewGetApplication

Returns the name of the "viewer glue" for the application required to view an object.

Include Files

```
#include "wmview.h"
```

Syntax

```
int FAR PASCAL WML_ViewGetApplication(
    LPVMHOBJECT    hObjHandle,
    LPSTR          lpszApplication,
    UINT           nBufSize);
```

Parameters

| | |
|---|---|
| *hObjHandle* | Object handle. |
| *lpszApplication* | Pointer to the memory location to store the application string. |

*nBufSize* Length of the buffer pointed to by lpszApp...ation, including the NULL terminator.

Return Values
WM_SUCCESS
WM_ERR_TOO_SMALL_RESULT_BUFFER
WM_ERR_INVALID_OBJ_HANDLE
WM_ERR_VIEWER_NOT_FOUND Related Functions
WML_ViewObject

----------

WML_ViewGetVersion

Returns a string that gives the version of the current Workstation Manager View library (WMVIEW).

Include Files

```
#include "wmview.h"
```

Syntax

```
int WINAPI WML_ViewGetVersion(
    LPSTR          lpszResultBuf,
    int cbBuffer);
```

Parameters

*lpszResultBuf* Buffer to hold version string.

*cbBuffer* Length of result buffer.

Return Values
WM_SUCCESS

----------

WML_ViewInitialize

Initializes the Workstation Manager View library (WMVIEW).

Include Files

```
#include "wmview.h"
```

Syntax

```
int FAR PASCAL WML_ViewInitialize(HWND hWnd);
```

Parameters

*hWnd* Window handle of the calling application.

Return Values
WM_SUCCESS

Related Functions
WML_ViewUninitialize

---------

WML_ViewObject

Retrieves an object and launches a viewing application to display the object.

Include Files
#include "wmview.h"

Syntax
```
int FAR PASCAL WML_ViewObject(
    LPVMHOBJECT    hObjHandle,
    LPCSTR         szDescription,
    int nEdit);
```

Parameters

*hObjHandle* Must be a valid object handle.

*szDescription* Description string used for the window title of the group object display.

*nEdit* Indicates the level of access desired:

- 0—Opens the object in view mode.
- 1—Opens the object in edit mode.
- 2—For the ImagEdit application, indicates redaction mode.

Usage Notes

For a simple object, the function opens the appropriate viewing application and displays the object. For a group object, it reads the contents of the object, pops up the thumbnail view window, and displays icons that represent each object entry in the group object. When the user double-clicks on an icon representing a simple object, the function opens the appropriate viewing application and displays the object.

The object's type, as specified in WML_ObjectImportFromFile or WML_ObjectCreate, indicates which viewing application will be opened. The mapping from object type to viewing application is in the [Object Type Attrib List] section of the wmcommon.ini file. See WML_ObjectCreate for more information.

The user's DOS search path must include the location of the Object Manager WMV files (the "viewer glue"), which are usually found in C:\OM\BIN. If this directory is not in the search path, the system tells the user that it cannot find the *.WMV files.

Return Values
WM_SUCCESS
WM_ERR_OUT_OF_MEMORY
WM_ERR_INVALID_OBJ_HANDLE
WM_ERR_VIEWER_NOT_FOUND
WM_ERR_INVALID_DIRECTORY Related Functions
WML_ObjectCreate

----------

WML_ViewUninitialize

Uninitializes the Workstation Manager View library (WMVIEW).

Include Files
#include "wmview.h"

Syntax
int FAR PASCAL WML_ViewUninitialize(HWND hWnd);

Parameters
*hWnd* Window handle of the calling application.

Return Values
WM_SUCCESS

Related Functions
WML_ViewInitialize

Referring still to FIG. 1, in the operation of system 100, a user of a workstation 101 seeks access to an information object. Initially, the user logs on and requests a security ticket from security server 121. After security server 121 grants the ticket, workstation 101 initiates a request to domain server 122 for a map of objects. As mentioned above, system 100 may include multiple volume managers, e.g., 123, on multiple server computers, e.g., 120. In one possible embodiment, several "object server" computers each implement one or more volume managers, and each volume manager controls one or more classes of objects. The map that is initially provided by domain server 122 indicates which volume manager is responsible for each class of objects in system 100. Specifically, the map associates an object class with a server namer and further associates a server name with a network address.

Using the map initially provided by domain server 122, client workstation 101 calls for an object. Typically, the object requested is represented on the map provided by domain server 122. However, in some circumstances the location of an object may only be established after domain server 122 has provided client workstation 101 with the map. In such instances, client workstation 101 issues a request to domain server 122 to determine the location of the desired object. In response, domain server 122 provides the requested location and instructs workstation 101 to add the location to the version of the map stored by workstation 101. Once an object's location is determined, workstation 101 requests the object directly from the corresponding volume manager, e.g., 123, and, if workstation 101 has also sent an appropriate security ticket, volume manager 123 provides workstation 101 with the object. When a user desires input-output functions such as printing or faxing of information from an object, workstation 101 issues a request to queue manager 124, which acknowledges the request, checks that the appropriate security ticket has been provided, and sees to it that the requested action is performed.

In a preferred embodiment, client workstation 101 automatically determines the type of application program required to view or otherwise access information in an object. Specifically, this is achieved by associating with each object a unique global identifier, or "object handle". In a preferred embodiment, a 28-byte object handle is used, with 20 bytes providing a system-wide identifier for the volume and 8 bytes providing a volume-wide identifier for the object. The object handle is also used by the volume manager 123 to identify the object and allow association of the object with an application class, which indicates the type of the object with sufficient specificity that an appropriate viewer application (or other application) may be identified for use with the object. For example, an object containing text information will have an object handle indicating that fact so that when access to that object is sought, workstation 101 automatically launches a word processing program as opposed to a graphics program that might be used for a graphics object. Thus, the object handle permits objects to be retrieved automatically from their actual storage location and accessed automatically using an appropriate application program.

In order to maximize efficiency of storage, processing, and retrieval, data of similar classes are kept on similar storage mechanisms. Each object is associated with a particular class based on the way the object was created (e.g., by a spreadsheet application program or a graphics application). Accordingly, each object inherits certain properties inherent in its class, including the volume on which it is stored. Related objects are grouped according to the way that each will be used. For example, an object representing an engineering drawing may be grouped with an associated parts list, a video simulation of the item in the drawing, or documentation of the corresponding engineering change notices. In one embodiment, a class or "family" of related objects is stored on one or more mass storage devices, e.g., 132, each of which is under the control of a volume manager, 123, responsible for that family.

One benefit of storing objects in the same family in storage locations controlled by a single volume manager is increased access speed. Specifically, mass storage devices, e.g., 132, typically include optical disks that provide relatively slow access. To improve performance, when a first object from a particular family is requested, conventional data caching techniques are used to copy other objects from that family into interim storage areas (e.g., high-speed magnetic disk drives) that will provide faster response if any of those other objects are requested. Depending on the user's object requests, related objects are constantly transferred to more efficient storage areas as it appears more likely that they will be requested. In an alternative embodiment, the particular application to which system 100 is being put may call for certain objects in different families to be called up on a regular basis, and caching those objects is then used to achieve performance gains. In general, objects may be migrated to the type of storage device that provides the best cost-performance balance for the desired application.

Figure 2:
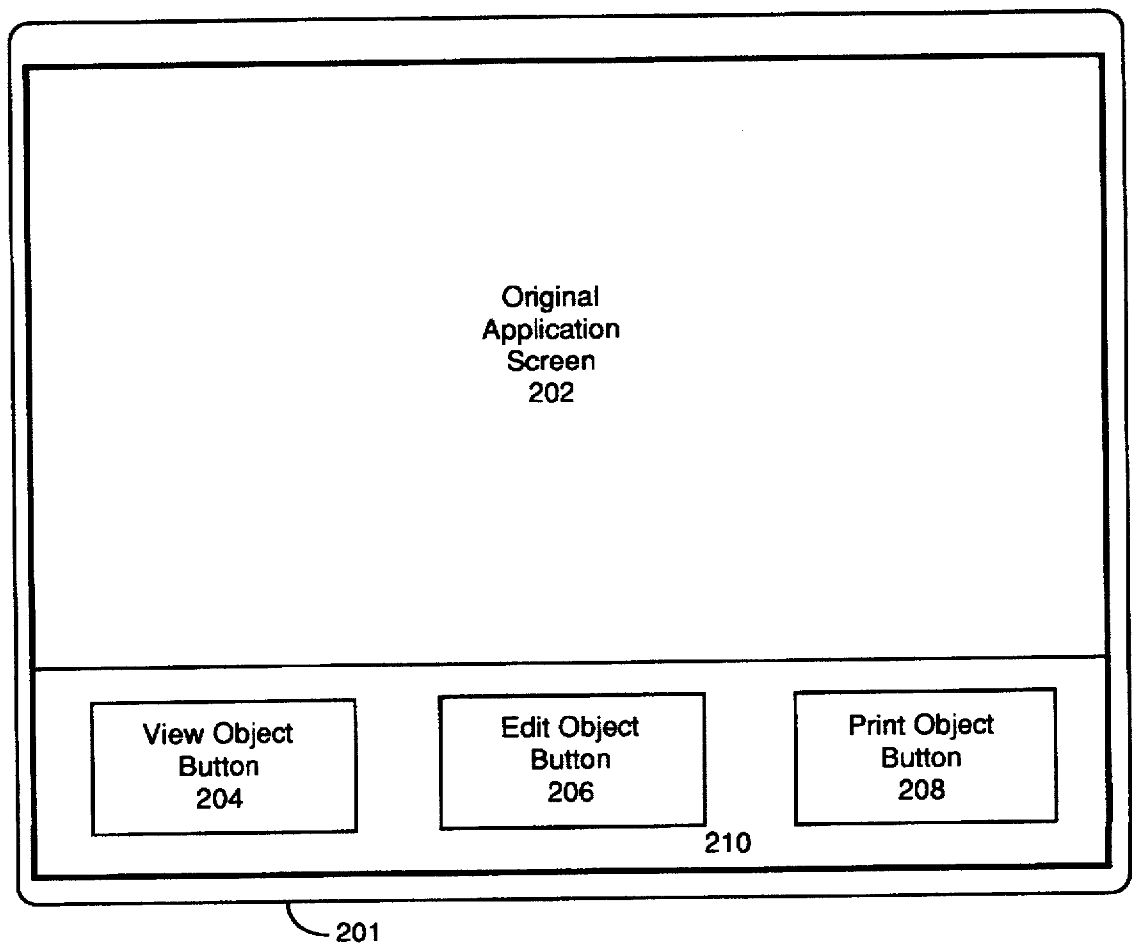
FIG. 2 is a display screen provided by a client workstation shown in FIG. 1.

Referring now to FIG. 2, there is shown a display screen 201 of a client workstation, e.g., 101, operating in accordance with system 100. Display screen 201 includes an original application screen area 202 providing a user interface for a legacy application, i.e., an existing application program operated using mainframe computer 110. Display screen 201 also includes an object area 210 that contains user interface elements representing objects that are related to the original application presented in original application screen area 202. In the example shown in FIG. 2, user interface buttons for three such objects are provided. A view object button permits a user to view an objects currently selected in original application screen 202. For instance, if original application screen area 202 is the user interface of a relational database that presents the user with a list of employee names and allows selection among those names, a user selects a desired employee from original application screen area 202 and then selects view object button 204 to view objects related the selected employee. Such objects might include a digitized picture, a personnel file, a performance spreadsheet, and other documents related to the employee. In this manner an application that is not object-oriented is bridged to the object environment of system 100. If a user wishes to make changes to objects relating to a selected item in the legacy application, the user selects the edit object button 206. If a user wishes to print objects relating to a selected item in the legacy application, the user selects the print object button 206. In a preferred embodiment, the original application screen 202 and object area 210 do not take up the entire area of display screen 201, but are presented in a single window of a windows-based graphical user environment. Upon selection of buttons 204, 206, 208, iconic representations of objects that correspond to the selected item (e.g., employee) are then presented in another window for selection to allow the user to respectively view, edit, or print whichever of such objects are desired.

This functionality is implemented by associating each item in a legacy application, for instance each record of a relational database, with corresponding objects. The creation, retrieval, updating, and deleting of objects in this regard is provided by the WML_ObjectCreate, WML_ObjectGetObject, WML_ObjectPutObject, and WML_ObjectDelete object functions described above.

From the above description, it will be apparent that the invention disclosed herein provides a novel and advantageous method and system providing access to and control of diverse information objects. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A client-server data processing system comprising:

a client workstation;

a mass storage subsystem;

an input/output peripheral subsystem;

a server computer subsystem, operatively coupled to the client workstation, to the mass storage subsystem, and to the input/output peripheral subsystem, the server computer subsystem including:

(a) a security server adapted to accept user information from the client workstation and to grant a security ticket to the workstation in response to predetermined user authorization level;

(b) a volume manager adapted to control object storage to, and retrieval from, a volume portion of the mass storage subsystem in response to presentation of the security ticket and an object access request for a first object corresponding to the volume portion, the volume manager further caching additional objects related to the first object;

(c) a queue manager adapted to process input-output requests; and (d) a domain server adapted to maintain a server map relating server names to physical network addresses, a volume map relating volume names to the volume manager, and a family map relating volume family names to the volume manager.

2. A system as in claim 1, further comprising a mainframe computer subsystem operatively connected to the client workstation and the server computer subsystem, the mainframe computer system providing an application program with a plurality of information elements to the client workstation, the client workstation associating a plurality of objects with each of said information elements, the client workstation further providing an interface permitting user manipulation of said plurality of objects in response to user selection of one of said information elements.

3. A system as in claim 1, wherein said first object and said additional objects each includes an object handle, said object handle uniquely identifying each object and providing correspondence among said objects.

4. A method of storing and accessing information on a plurality of storage devices, comprising:

creating an object by combining a first element of information with an object handle;

identifying the object by assigning a unique object identifier to the object handle;

establishing a correspondence between the object and other objects by assigning a family identifier to the object handle;

providing, based on the object handle, a map of correspondences between objects and storage devices; and storing and accessing the first element of information by storing and accessing the object through reference to the object handle.

5. A method as in claim 4, further comprising caching other objects having object handles including the family identifier in response to storing and accessing the object.

* * * * *